United States Patent
Yoshida et al.

(10) Patent No.: US 10,638,039 B2
(45) Date of Patent: Apr. 28, 2020

(54) APPARATUS, SYSTEM, AND METHOD OF CONTROLLING IMAGE CAPTURING, AND RECORDING MEDIUM

(71) Applicant: Ricoh Company, Ltd., Tokyo (JP)

(72) Inventors: Kazuhiro Yoshida, Kanagawa (JP); Takahiro Asai, Kanagawa (JP); Keiichi Kawaguchi, Kanagawa (JP); Hiroshi Suitoh, Kanagawa (JP); Eichi Koizumi, Kanagawa (JP); Tomohiro Ikeda, Kanagawa (JP); Yoshiyuki Toda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 21 days.

(21) Appl. No.: 15/856,848

(22) Filed: Dec. 28, 2017

(65) Prior Publication Data
US 2018/0184001 A1    Jun. 28, 2018

(30) Foreign Application Priority Data

Dec. 28, 2016 (JP) .................. 2016-256573
Mar. 30, 2017 (JP) .................. 2017-068681
(Continued)

(51) Int. Cl.
*H04N 5/232* (2006.01)
*H04N 5/247* (2006.01)
(Continued)

(52) U.S. Cl.
CPC .......... *H04N 5/23238* (2013.01); *H04N 1/00* (2013.01); *H04N 5/232* (2013.01);
(Continued)

(58) Field of Classification Search
CPC ...... H04N 5/23238; H04N 1/00; H04N 5/232; H04N 5/23293; H04N 5/247; H04N 9/045; H04N 9/64
See application file for complete search history.

(56) References Cited

U.S. PATENT DOCUMENTS

2006/0028548 A1 * 2/2006 Salivar ............. G08B 13/19643
348/143
2008/0122928 A1 * 5/2008 Hutton ............. G08B 13/19619
348/143
(Continued)

FOREIGN PATENT DOCUMENTS

CN    101707671    5/2010
CN    104483983    4/2015
(Continued)

OTHER PUBLICATIONS

Office Action dated Nov. 5, 2019, issued in corresponding Chinese Patent Application No. 201711458852.5, 10 pages.

*Primary Examiner* — Huy T Nguyen
(74) *Attorney, Agent, or Firm* — Xsensus LLP

(57) ABSTRACT

An apparatus for controlling image capturing, includes circuitry to control image capturing operation of each one of a first image capturing device and a second image capturing device, so as to cause the first image capturing device and the second image capturing device to cooperate with each other to perform linked image capturing, the first image capturing device capable of capturing an image with an angle of view wider than that of the second image capturing device. The circuitry controls one of the first image capturing device and the second image capturing device to start image capturing in response to starting of image capturing by other one of the first image capturing device and the second image capturing device.

20 Claims, 71 Drawing Sheets

(30) Foreign Application Priority Data

Dec. 21, 2017 (JP) .................................. 2017-245477
Dec. 21, 2017 (JP) .................................. 2017-245495

(51) Int. Cl.
*H04N 9/04* (2006.01)
*H04N 1/00* (2006.01)
*H04N 9/64* (2006.01)

(52) U.S. Cl.
CPC ......... *H04N 5/23293* (2013.01); *H04N 5/247*
(2013.01); *H04N 9/045* (2013.01); *H04N 9/64*
(2013.01)

(56) References Cited

U.S. PATENT DOCUMENTS

| | | |
|---|---|---|
| 2016/0050369 A1 | 2/2016 | Takenaka et al. |
| 2016/0212336 A1 | 7/2016 | Takenaka et al. |
| 2016/0227173 A1* | 8/2016 | Yamaguchi ............ H04N 7/185 |
| 2017/0094169 A1 | 3/2017 | Yoshikawa et al. |
| 2019/0014263 A1 | 1/2019 | Zhao et al. |

FOREIGN PATENT DOCUMENTS

| | | |
|---|---|---|
| CN | 105657233 | 6/2016 |
| JP | 2004-280644 | 10/2004 |
| JP | 2010-239416 | 10/2010 |
| JP | 2014-041258 | 3/2014 |
| JP | 2016-096487 | 5/2016 |

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

FIG. 4B
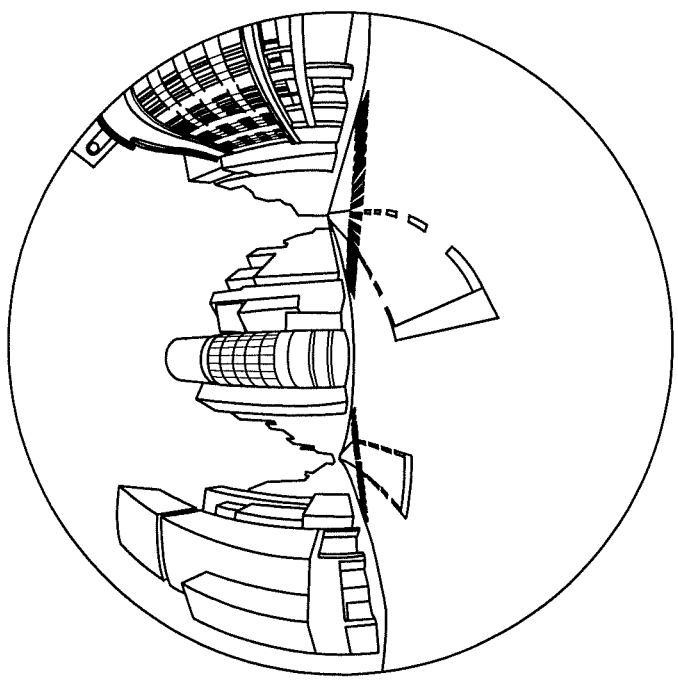
SPHERICAL IMAGE CE
FIG. 4A
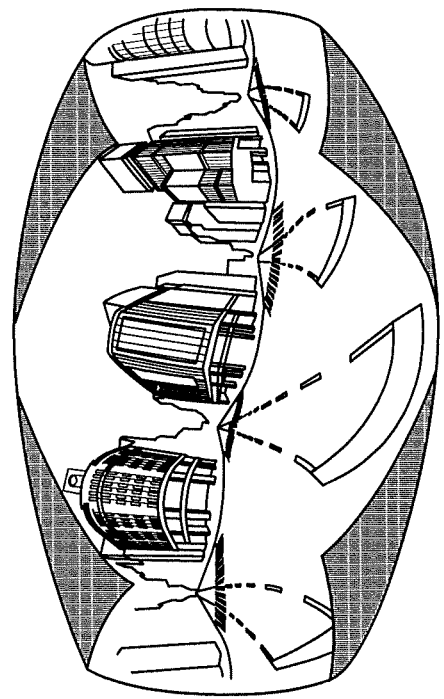
EQUIRECTANGULAR PROJECTION IMAGE EC
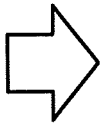
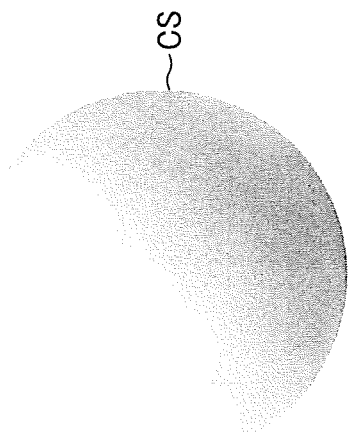
CS

VIRTUAL CAMERA IC
SPHERE CS
PREDETERMINED-AREA IMAGE Q
(PREDETERMINED AREA T)

PREDETERMINED-AREA IMAGE Q

| LINKING INFORMATION | IP ADDRESS | DEVICE NAME |
|---|---|---|
| MAIN | 1.2.3.4 | k1-camera1 |
| SUB 1 | 1.2.3.5 | theta-camera1 |
| – | 1.2.3.6 | theta-camera2 |
| ⋮ | ⋮ | ⋮ |

FIG. 17

| | | | |
|---|---|---|---|
| EQUIRECTANGULAR PROJECTION IMAGE INFORMATION | ATTRIBUTE DATA | IMAGE ID | ./IMAGE001.JPG |
| | | POSITIONING CORRECTION (Pitch, Yaw, Roll) | (−2.8, −2.1, 0) |
| PALANAR IMAGE INFORMATION | ATTRIBUTE DATA | IMAGE ID | ./IMAGE111.JPG |
| | | 35 mm EQUIVALENT FOCAL LENGTH | 28 |
| | AREA DIVISION NUMBER INFORMATION | HORIZONTAL (LONGITUDE) DIVISION NUMBER | 30 |
| | | VERTICAL (LATITUDE) DIVISION NUMBER | 20 |
| SUPERIMPOSED DISPLAY INFORMATION | | COORDINATE OF GRID IN GRID AREA (LOCATION PARAMETER) | $(LO'_{00,00}, LA'_{00,00}), (LO'_{01,00}, LA'_{01,00}), \ldots,$ $(LO'_{30,20}, LA'_{30,20})$ |
| | | CORRECTION VALUE OF BRIGHTNESS AND COLOR (CORRECTION PARAMETER) | $(R_{00,00}, G_{00,00}, B_{00,00}), (R_{01,00}, G_{01,00}, B_{01,00}),$ $\ldots, (R_{30,20}, G_{30,20}, B_{30,20})$ |
| | | LOCATION OF POINT OF GAZE OF PREDETERMINED-AREA IMAGE | $(LO1'_{15,10}, LA1'_{15,10})$ |
| | | MAGNIFICATION PARAMETER | 2.0 |
| METADATA GENERATION INFORMATION | | VERSION INFORMATION | 0.1.1 |

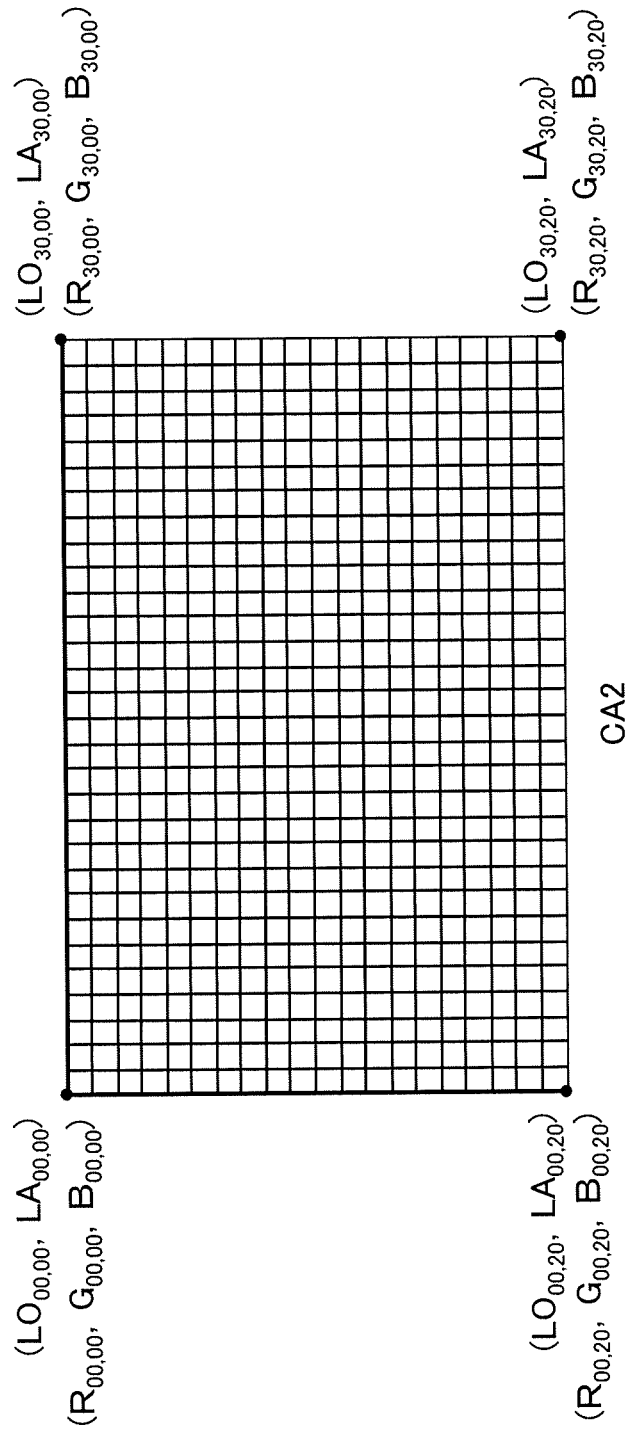

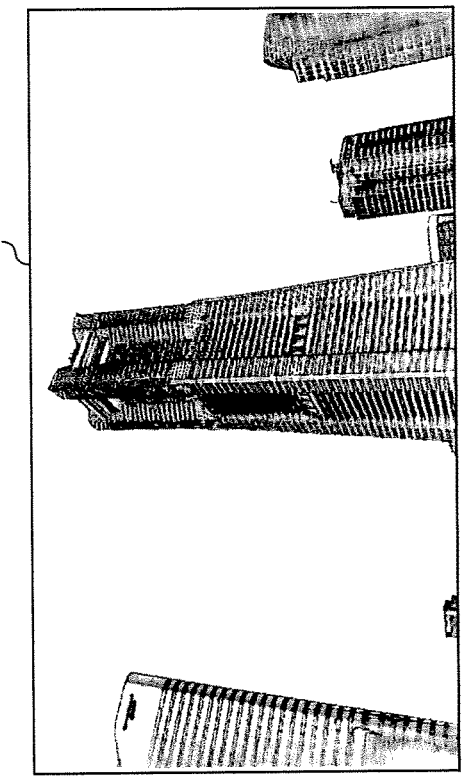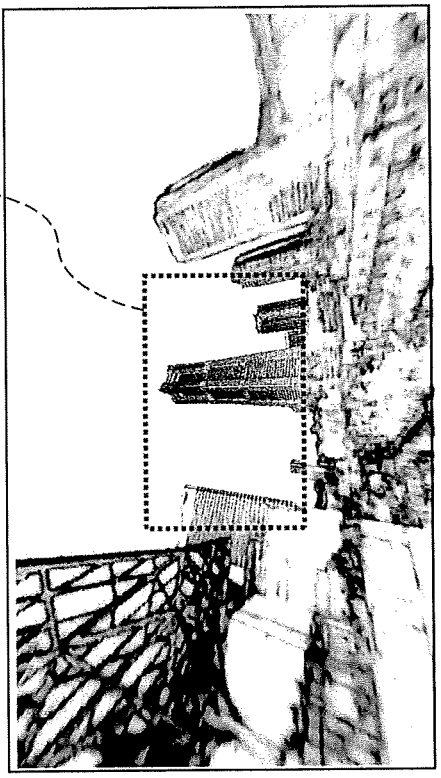

| IP ADDRESS | DEVICE NAME |
|---|---|
| 1.2.3.4 | k1-camera1 |
| 1.2.3.5 | theta-camera1 |
| 1.2.3.6 | theta-camera2 |
| ⋮ | ⋮ |

FIG. 37
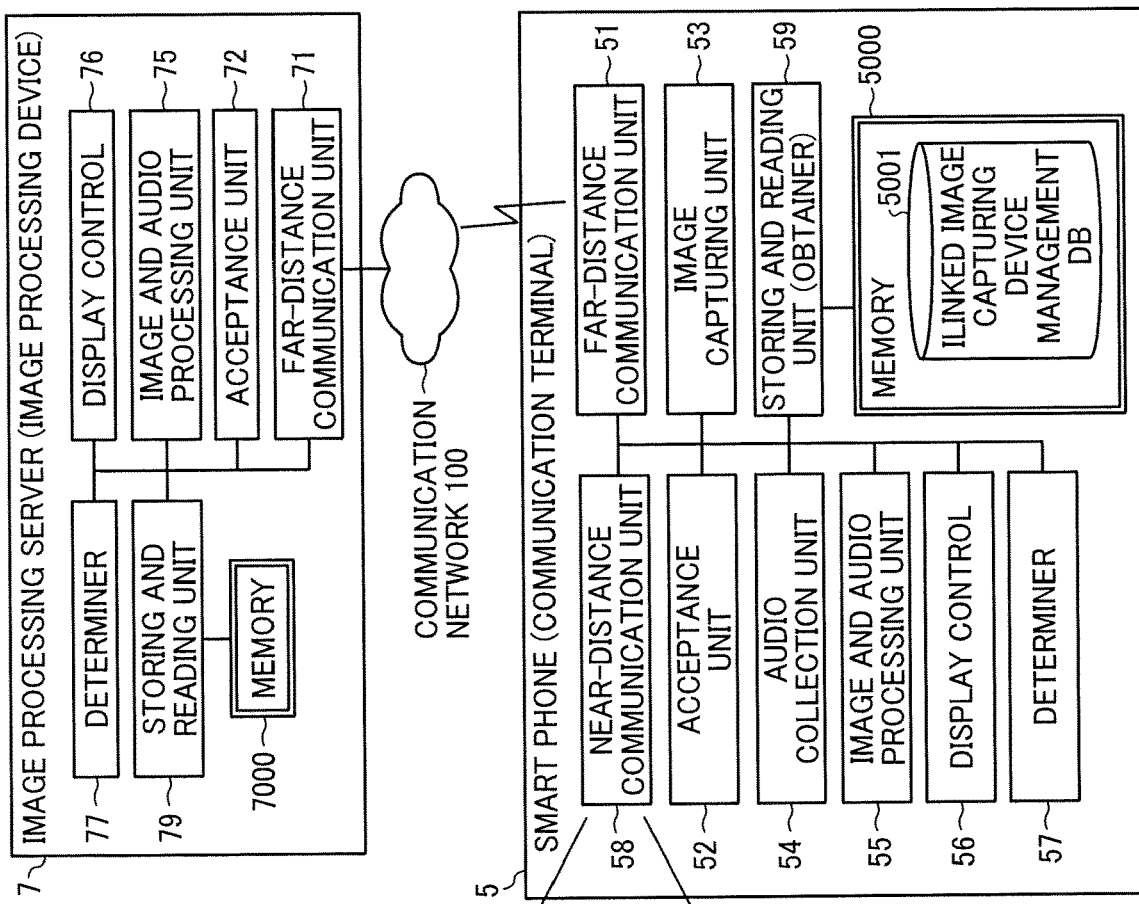
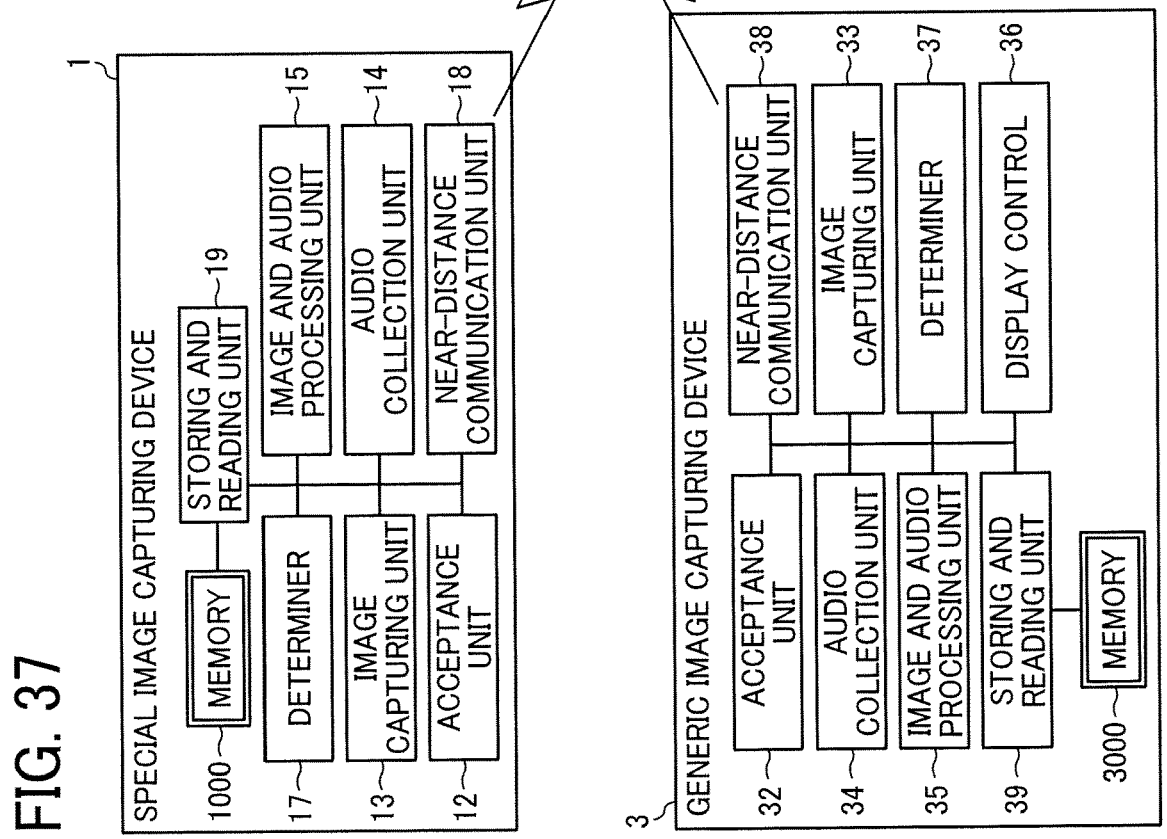

FIG. 40

| File Header |
|---|
| Entry Info<br>SUPERIMPOSED DISPLAY INFORMATION<br>  AREA DIVISION NUMBER INFORMATION<br>  COORDINATE OF GRID IN GRID AREA (LOCATION PARAMETER)<br>  CORRECTION VALUE OF BRIGHTNESS AND COLOR (CORRECTION PARAMETER)<br>  METADATA GENERATION INFORMATION<br>  VERSION INFORMATION<br>  ATTRIBUTE DATA OF EQUIRECTANGULAR PROJECTION IMAGE INFORMATION<br>  ATTRIBUTE DATA OF PALANAR IMAGE INFORMATION |
| EQUIRECTANGULAR PROJECTION IMAGE INFORMATION<br>  SPHERICAL IMAGE DATA |
| PALANAR IMAGE INFORMATION<br>  PLANAR IMAGE DATA |
| ... |

FIG. 49A
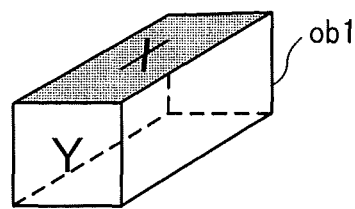
FIG. 49B
FIG. 49C

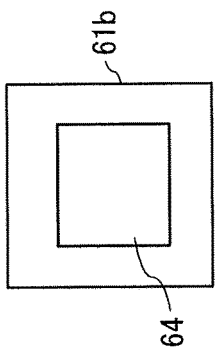
FIG. 57C
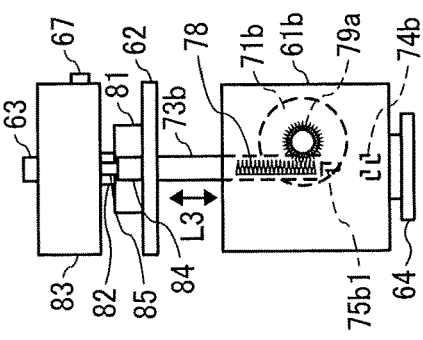
FIG. 57B
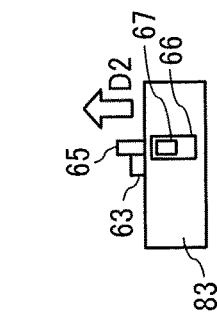
FIG. 57E
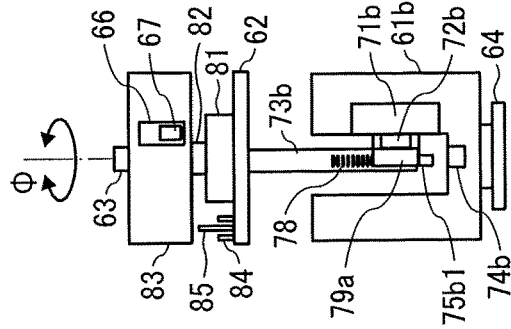
FIG. 58
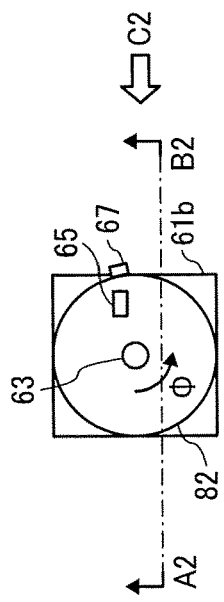
FIG. 57A
FIG. 57D

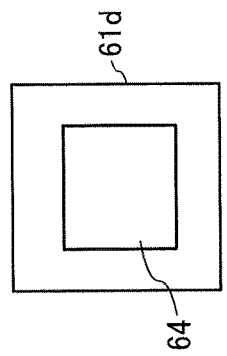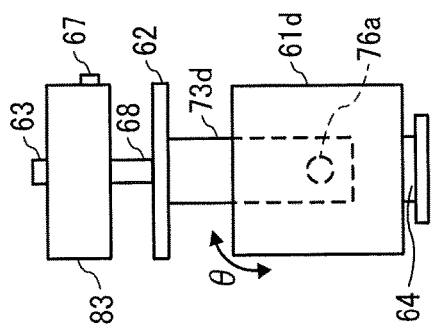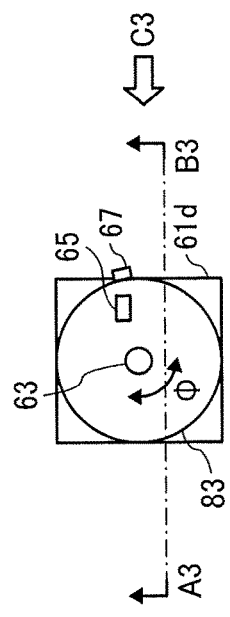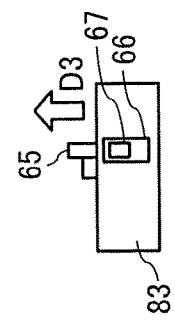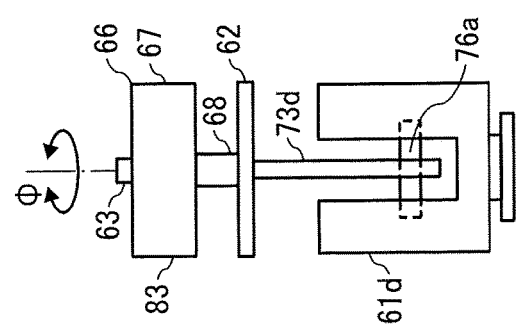

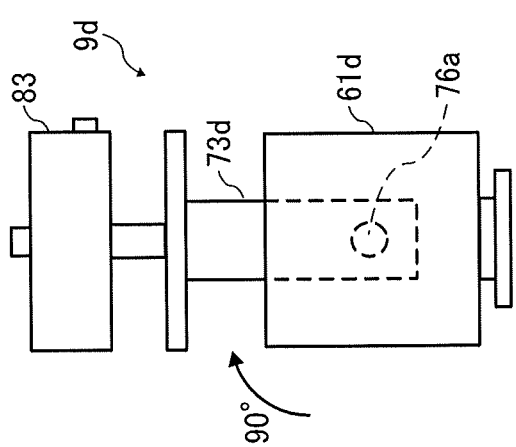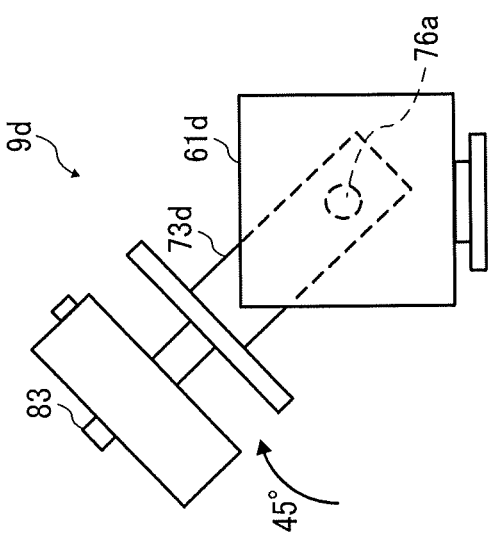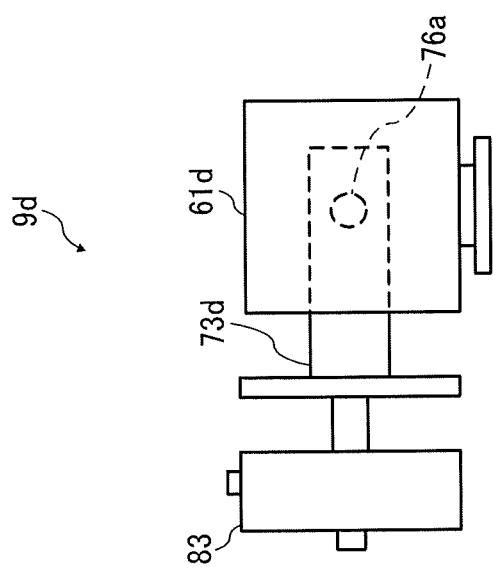

APPARATUS, SYSTEM, AND METHOD OF CONTROLLING IMAGE CAPTURING, AND RECORDING MEDIUM

CROSS-REFERENCE TO RELATED APPLICATIONS

This patent application is based on and claims priority pursuant to 35 U.S.C. § 119(a) to Japanese Patent Application Nos. 2016-256573, filed on Dec. 28, 2016, 2017-068681, filed on Mar. 30, 2017, 2017-245495, filed on Dec. 21, 2017, and 2017-245477, filed on Dec. 21, 2017, in the Japan Patent Office, the entire disclosure of which is hereby incorporated by reference herein.

BACKGROUND

Technical Field

The present invention relates to an image processing apparatus, an image capturing system, an image processing method, and a recording medium.

Description of the Related Art

The wide-angle image, taken with a wide-angle lens, is useful in capturing such as landscape, as the image tends to cover large areas. For example, there is an image capturing system, which captures a wide-angle image of a target object and its surroundings, and an enlarged image of the target object. The wide-angle image is combined with the enlarged image such that, even when a part of the wide-angle image showing the target object is enlarged, that part embedded with the enlarged image is displayed in high resolution.

On the other hand, a digital camera that captures two hemispherical images from which a 360-degree, spherical image is generated, has been proposed. Such digital camera generates an equirectangular projection image based on two hemispherical images, and transmits the equirectangular projection image to a communication terminal, such as a smart phone, for display to a user.

SUMMARY

Example embodiments of the present invention include an apparatus for controlling image capturing, including circuitry to control image capturing operation of each one of a first image capturing device and a second image capturing device, so as to cause the first image capturing device and the second image capturing device to cooperate with each other to perform linked image capturing, the first image capturing device capable of capturing an image with an angle of view wider than that of the second image capturing device. The circuitry controls one of the first image capturing device and the second image capturing device to start image capturing in response to starting of image capturing by other one of the first image capturing device and the second image capturing device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4A and FIG. 4B are views respectively illustrating the image in equirectangular projection covering a surface of a sphere, and a spherical image, according to an embodiment;

FIG. 17 is an illustration of a data structure of superimposed display metadata according to the first embodiment;

FIGS. 18A and 18B are conceptual diagrams respectively illustrating a plurality of grid areas in a second area, and a plurality of grid areas in a third area, according to the first embodiment;

FIGS. 30A, 30B, 30C, and 30D are illustrations of a wide-angle image without superimposed display, a telephoto image without superimposed display, a wide-angle image with superimposed display, and a telephoto image with superimposed display, according to the first embodiment;

FIG. 37 is a schematic block diagram illustrating a functional configuration of the image capturing system of FIG. 35 according to the second embodiment;

FIG. 40 is a conceptual diagram illustrating a data structure of a management file, which may be applied to any one of the first and second embodiments;

FIGS. 41A and 41B are schematic diagrams of an image capturing system according to a third embodiment of the present invention, in which FIG. 41A illustrates a case where parallax reduction is prioritized, and FIG. 41B illustrates a case where a reduction in unexpected appearance of a portion of a generic image capturing device in a high-quality area in an image captured using a special image capturing device is prioritized;

FIGS. 42A to 42E illustrate a mechanical hardware configuration of an adapter according to the third embodiment, in which FIG. 42A is a plan view of the adapter, FIG. 42B is a side sectional view of the adapter taken along line A1-B1 in FIG. 42A, FIG. 42C is a bottom view of the adapter, FIG. 42D is a side view of the adapter as viewed along arrow C1 in FIG. 42A, and FIG. 42E is a side view of the adapter having a terminal that projects from a rotating table in a direction indicated by arrow D1;

FIGS. 49A to 49C illustrate a relationship between a tilt angle and a device-to-object distance and illustrate how an object is viewed;

FIGS. 57A to 57E illustrate a mechanical hardware configuration of an adapter according to the sixth embodiment, in which FIG. 57A is a plan view of the adapter, FIG. 57B is a side sectional view of the adapter taken along line A2-B2 in FIG. 57A, FIG. 57C is a bottom view of the adapter, FIG. 57D is a side view of the adapter as viewed along arrow C2 in FIG. 57A, and FIG. 57E is a side view of the adapter having a terminal that projects from a rotating table in a direction indicated by arrow D2;

FIG. 58 is a schematic block diagram illustrating a functional configuration of a drive unit in the adapter in the image capturing system according to the sixth embodiment;

FIGS. 61A to 61E illustrate a mechanical hardware configuration of an adapter according to an eighth embodiment, in which FIG. 61A is a plan view of the adapter, FIG. 61B is a side sectional view of the adapter taken along line A3-B3 in FIG. 61A, FIG. 61C is a bottom view of the adapter, FIG. 61D is a side view of the adapter as viewed along arrow C3 in FIG. 61A, and FIG. 61E is a side view of the adapter having a terminal that projects from a rotating table in a direction indicated by arrow D3;

FIGS. 62A to 62C are views illustrating an example of driving of an linking device according to the eighth embodiment;

Figure 1A:
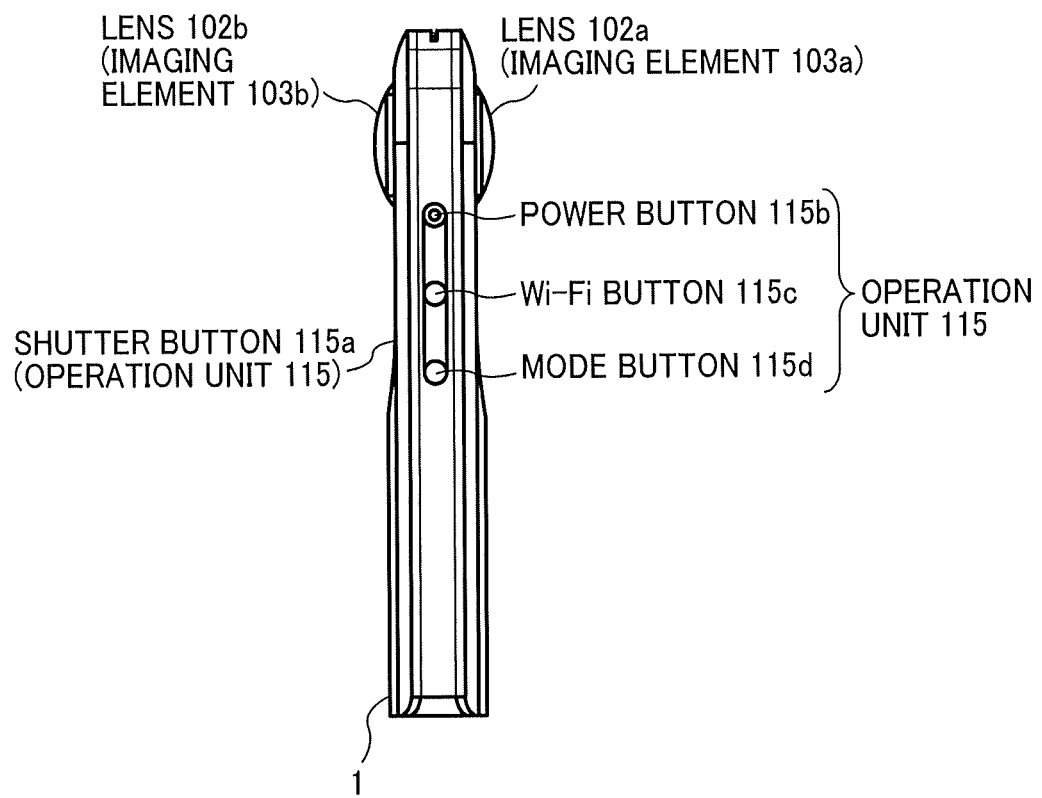
FIGS. 1A, 1B, 1C, and 1D are a left side view, a rear view, a plan view, and a bottom side view of a special image capturing device, according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The inventors of the present invention have realized that, the spherical image of a target object and its surroundings, can be combined with such as a planar image of the target object, in a similar manner as described above. However, if the spherical image is to be displayed with the planar image of the target object, these images may not look as one image, as these images are taken with separate devices.

For example, if the times at which the first image (for example, spherical image) and the second image (for example, planar image) are captured largely differ, the captured objects and their surroundings do not likely to match between the first image and the second image.

For example, the first image includes a pedestrian and their surroundings. It is assumed that the second image including the same pedestrian is taken several seconds after the first image is taken. In such case, if the second image is placed in an area where the pedestrian appears in the first image, the position of the pedestrian changes after several seconds and thus the corresponding objects and their surroundings in the first and second images do not match.

In another example, as a distance between the lens positions of two image capturing devices increases, parallax becomes more likely to occur between the first image and second image. As a result, a change in position of the object or inaccurate positioning of the object may occur in the first and second images when the second image is superimposed on the first image.

In this disclosure, a first image is an image superimposed with a second image, and a second image is an image to be superimposed on the first image. For example, the first image is an image covering an area larger than that of the second image. In another example, the first image and the second image are images expressed in different projections. In another example, the second image is an image with image quality higher than that of the first image, for example, in terms of image resolution. However, the definition of "high image quality" differs depending on the image, and therefore, may vary depending on the user's purpose of viewing. In general, "high image quality" means an image faithfully representing a scene. For example, "high image quality" means an image having a high resolution, a wide dynamic range, high color reproducibility, or less noise. Examples of the first image include a spherical image, an equirectangular projection image, and a low-definition image. Examples of the second image include a planar image, a perspective projection image, and a high-definition image.

Further, in this disclosure, the spherical image does not have to be the spherical image. For example, the spherical image may be the wide-angle view image having an angle of about 180 to 360 degrees in the horizontal direction. As described below, it is desirable that the spherical image is image data having at least a part that is not entirely displayed in the predetermined area T.

Referring to the drawings, embodiments of the present invention are described below.

First, referring to FIGS. 1 to 7, operation of generating a spherical image is described according to an embodiment.

First, referring to FIGS. 1A to 1D, an external view of a special-purpose (special) image capturing device 1, is described according to the embodiment. The special image capturing device 1 is a digital camera for capturing images from which a 360-degree spherical image is generated. FIGS. 1A to 1D are respectively a left side view, a rear view, a plan view, and a bottom view of the special image capturing device 1.

Figure 1B:
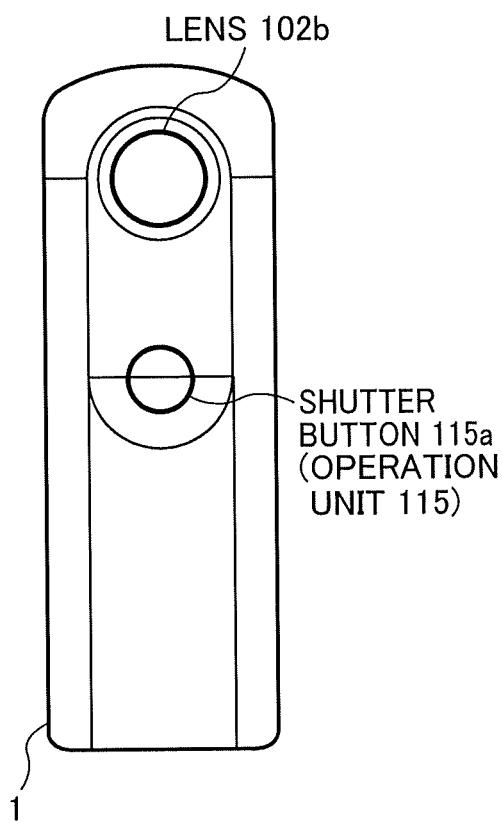
Figure 1C:
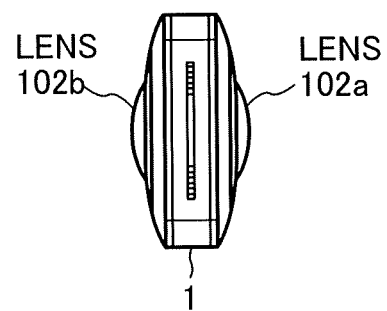

As illustrated in FIGS. 1A to 1D, the special image capturing device 1 has an upper part, which is provided with a fish-eye lens 102a on a front side (anterior side) thereof, and a fish-eye lens 102b on a back side (rear side) thereof. The special image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 1B, the special image capturing device 1 further includes a shutter button 115a on a rear side of the special image capturing device 1, which is opposite of the front side of the special image capturing device 1. As illustrated in FIG. 1A, the left side of the special image capturing device 1 is provided with a power button 115b, a Wireless Fidelity (Wi-Fi) button 115c, and an image capturing mode button 115d. Any one of the power button 115b and the Wi-Fi button 115c switches between ON and OFF, according to selection (pressing) by the user. The image capturing mode button 115d switches between a still-image capturing mode and a moving image capturing mode, according to selection (pressing) by the user. The shutter button 115a, power button 115b, Wi-Fi button 115c, and image capturing mode button 115d are a part of an operation unit 115. The operation unit 115 is any section that receives a user instruction, and is not limited to the above-described buttons or switches.

Figure 1D:
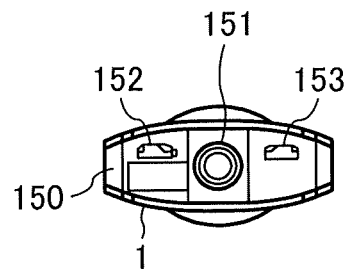

As illustrated in FIG. 1D, the special image capturing device 1 is provided with a tripod mount hole 151 at a center of its bottom face 150. The tripod mount hole 151 receives a screw of a tripod, when the special image capturing device 1 is mounted on the tripod. In this embodiment, the tripod mount hole 151 is where the generic image capturing device 3 is attached via an adapter 9, described later referring to FIG. 9. The bottom face 150 of the special image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Figure 2:
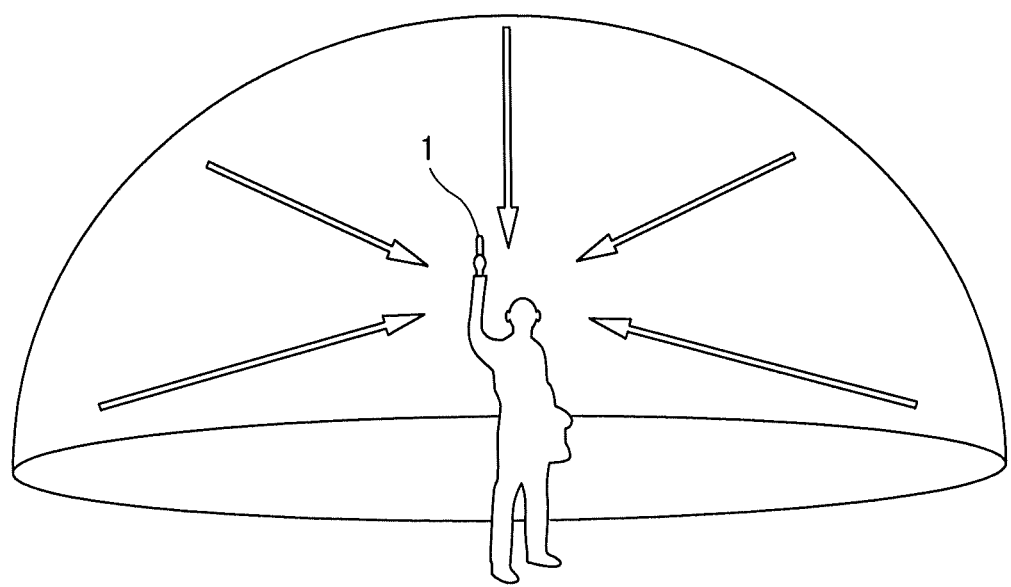
FIG. 2 is an illustration for explaining how a user uses the image capturing device, according to an embodiment.

Next, referring to FIG. 2, a description is given of a situation where the special image capturing device 1 is used. FIG. 2 illustrates an example of how the user uses the special image capturing device 1. As illustrated in FIG. 2, for example, the special image capturing device 1 is used for capturing objects surrounding the user who is holding the special image capturing device 1 in his or her hand. The imaging elements 103a and 103b illustrated in FIGS. 1A to 1D capture the objects surrounding the user to obtain two hemispherical images.

Figure 3A:
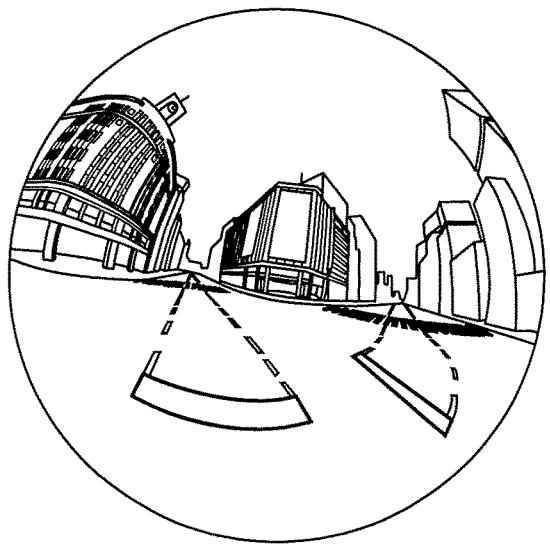
FIGS. 3A, 3B, and 3C are views illustrating a front side of a hemispherical image, a back side of the hemispherical image, and an image in equirectangular projection, respectively, captured by the image capturing device, according to an embodiment.
Figure 3B:
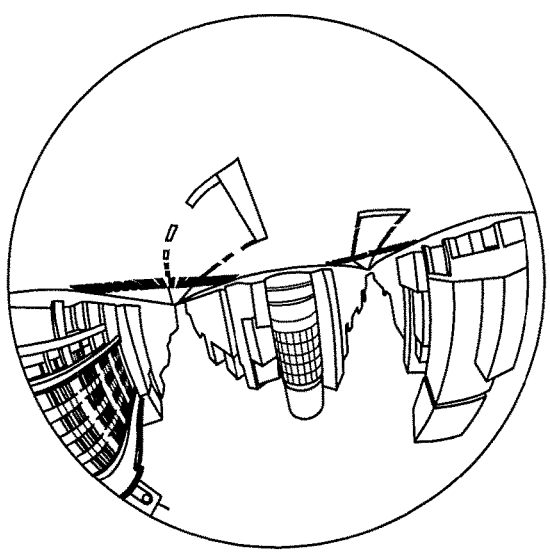
Figure 3C:
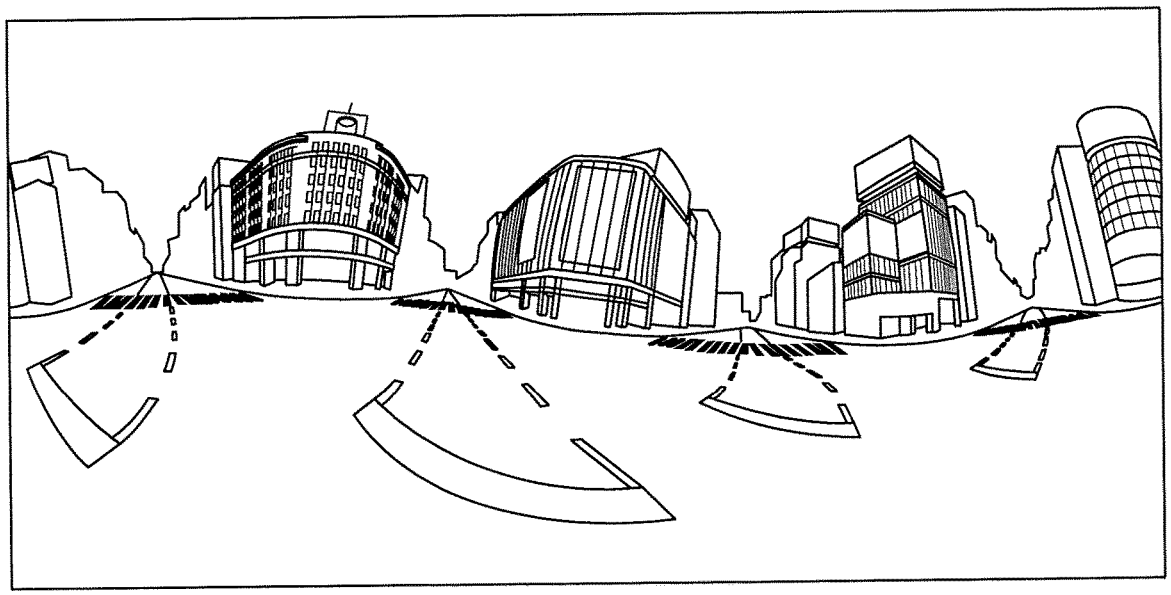

Next, referring to FIGS. 3A to 3C and FIGS. 4A and 4B, a description is given of an overview of an operation of generating an equirectangular projection image EC and a spherical image CE from the images captured by the special image capturing device 1. FIG. 3A is a view illustrating a hemispherical image (front side) captured by the special image capturing device 1. FIG. 3B is a view illustrating a hemispherical image (back side) captured by the special image capturing device 1. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image maps to a surface of a sphere. FIG. 4B is a view illustrating the spherical image.

As illustrated in FIG. 3A, an image captured by the imaging element 103a is a curved hemispherical image (front side) taken through the fish-eye lens 102a. Also, as illustrated in FIG. 3B, an image captured by the imaging element 103b is a curved hemispherical image (back side) taken through the fish-eye lens 102b. The hemispherical image (front side) and the hemispherical image (back side), which are reversed by 180-degree from each other, are combined by the special image capturing device 1. This results in generation of the equirectangular projection image EC as illustrated in FIG. 3C.

The equirectangular projection image is mapped on the sphere surface using Open Graphics Library for Embedded Systems (OpenGL ES) as illustrated in FIG. 4A. This results in generation of the spherical image CE as illustrated in FIG. 4B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Since the spherical image CE is an image attached to the sphere surface, as illustrated in FIG. 4B, a part of the image may look distorted when viewed from the user, providing a feeling of strangeness. To resolve this strange feeling, an image of a predetermined area, which is a part of the spherical image CE, is displayed as a flat image having fewer curves. The predetermined area is, for example, a part of the spherical image CE that is viewable by the user when displayed on a display. In this disclosure, the image of the predetermined area is referred to as a "predetermined-area image" Q. Hereinafter, a description is given of displaying the predetermined-area image Q with reference to FIG. 5 and FIGS. 6A and 6B.

Figure 5:
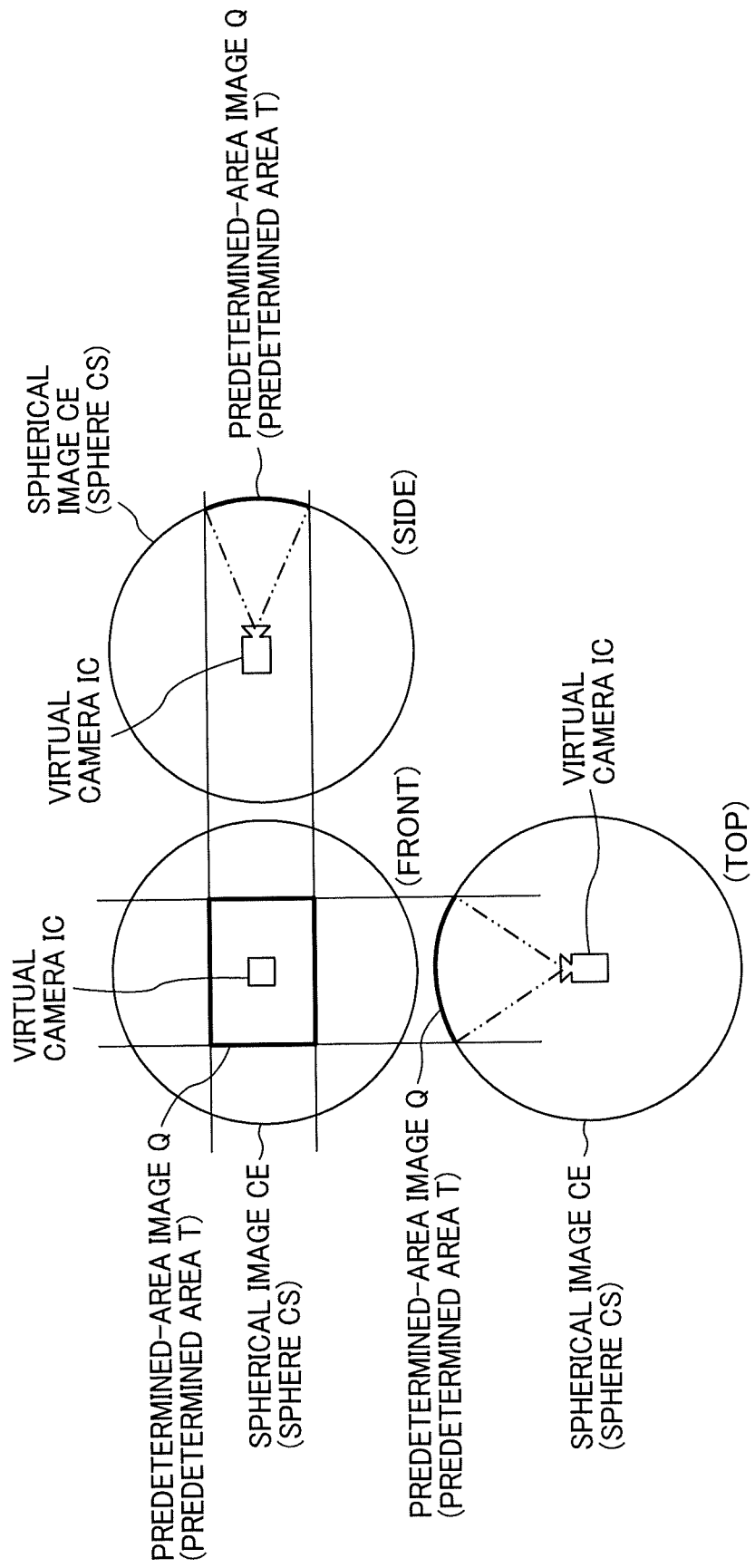
FIG. 5 is a view illustrating positions of a virtual camera and a predetermined area in a case in which the spherical image is represented as a three-dimensional solid sphere according to an embodiment.
Figure 6A:
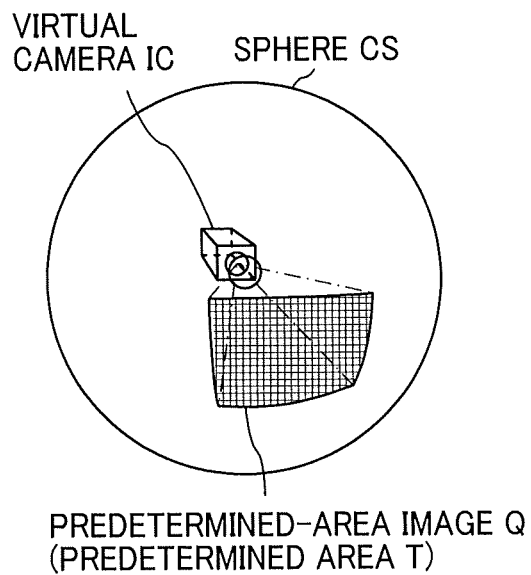
FIGS. 6A and 6B are respectively a perspective view of FIG. 5, and a view illustrating an image of the predetermined area on a display, according to an embodiment.
Figure 6B:
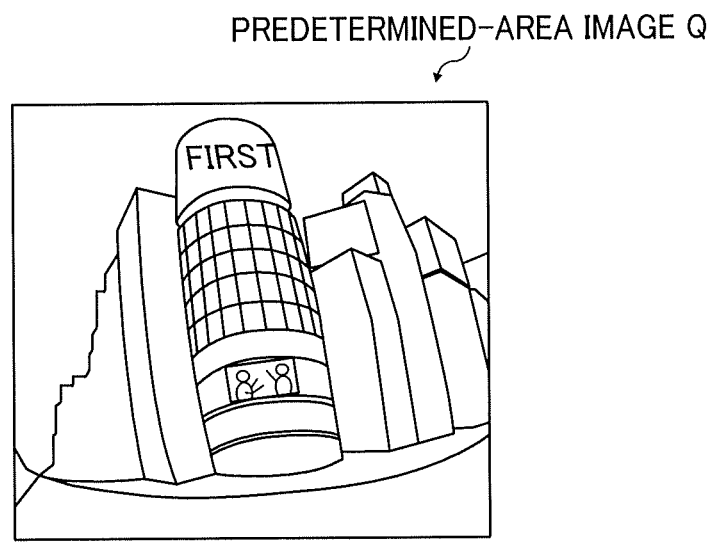

FIG. 5 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is inside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. The following explains the position of the virtual camera IC, using an imaging direction (ea, aa) and an angle of view $\alpha$ of the virtual camera IC.

Figure 7:
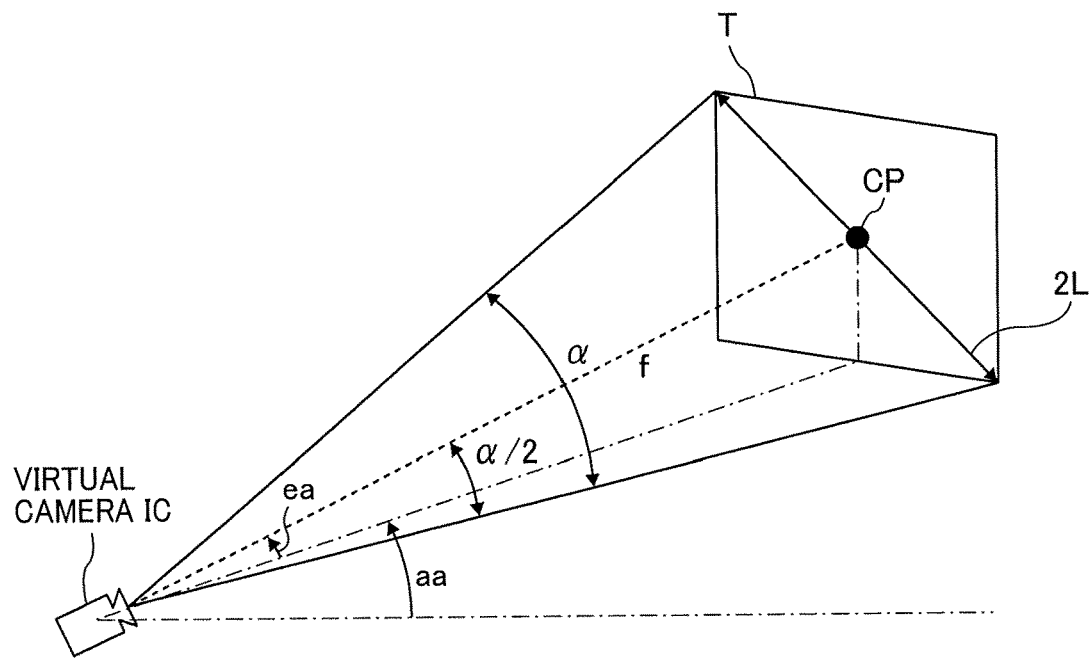
FIG. 7 is a view illustrating a relation between predetermined-area information and a predetermined-area image according to an embodiment.

Referring to FIG. 7, a relation between the predetermined-area information and the image of the predetermined area T is described according to the embodiment. FIG. 7 is a view illustrating a relation between the predetermined-area information and the image of the predetermined area T. As illustrated in FIG. 7, "ea" denotes an elevation angle, "aa" denotes an azimuth angle, and "$\alpha$" denotes an angle of view, respectively, of the virtual camera IC. The position of the virtual camera IC is adjusted, such that the point of gaze of the virtual camera IC, indicated by the imaging direction (ea, aa), matches the central point CP of the predetermined area T as the imaging area of the virtual camera IC. The predetermined-area image Q is an image of the predetermined area T, in the spherical image CE. "f" denotes a distance from the virtual camera IC to the central point CP of the predetermined area T. "L" denotes a distance between the central point CP and a given vertex of the predetermined area T (2 L is a diagonal line). In FIG. 7, a trigonometric function equation generally expressed by the following Equation 1 is satisfied.

$$L/f = \tan(\alpha/2) \quad \text{(Equation 1)}$$

First Embodiment

Referring to FIGS. 8 to 30D, the image capturing system according to a first embodiment of the present invention is described.

<Overview of Image Capturing System>

Figure 8:
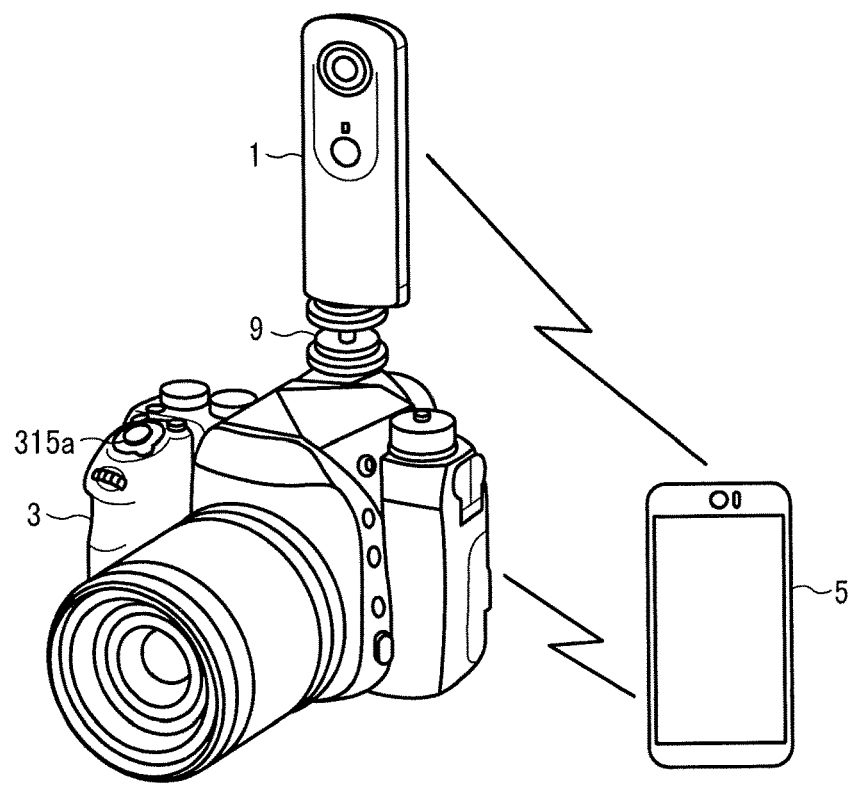
FIG. 8 is a schematic view illustrating an image capturing system according to a first embodiment.

First, referring to FIG. 8, an overview of the image capturing system is described according to the first embodiment. FIG. 8 is a schematic diagram illustrating a configuration of the image capturing system according to the embodiment.

As illustrated in FIG. 8, the image capturing system includes the special image capturing device 1, a general-purpose (generic) capturing device 3, a smart phone 5, and an adapter 9. The special image capturing device 1 is connected to the generic image capturing device 3 via the adapter 9.

The special image capturing device 1 is a special digital camera, which captures an image of an object or surroundings such as scenery to obtain two hemispherical images, from which a spherical (panoramic) image is generated, as described above referring to FIGS. 1 to 7.

The generic image capturing device 3 is a digital single-lens reflex camera, however, it may be implemented as a compact digital camera. The generic image capturing device 3 is provided with a shutter button 315a, which is a part of an operation unit 315 described below. The generic image capturing device 3 is provided with a shutter button 315a, which is a part of an operation unit 315 described below.

The smart phone 5 is wirelessly communicable with the special image capturing device 1 and the generic image capturing device 3 using near-distance wireless communication, such as Wi-Fi, Bluetooth (Registered Trademark), and Near Field Communication (NFC). The smart phone 5 is capable of displaying the images obtained respectively from the special image capturing device 1 and the generic image capturing device 3, on a display 517 provided for the smart phone 5 as described below.

The smart phone 5 may communicate with the special image capturing device 1 and the generic image capturing device 3, without using the near-distance wireless communication, but using wired communication such as a cable. The smart phone 5 is an example of an image processing apparatus capable of processing images being captured. Other examples of the image processing apparatus include, but not limited to, a tablet personal computer (PC), a notebook PC, a desktop PC, and a PDA. Further, in some embodiments, the smart phone 5 may operate as the linking device described below.

The smart phone 5 is wirelessly communicable with the special image capturing device 1 and the generic image capturing device 3 using near-distance wireless communication, such as Wi-Fi, Bluetooth (Registered Trademark), and Near Field Communication (NFC). The smart phone 5 is capable of displaying the images obtained respectively from the special image capturing device 1 and the generic image capturing device 3, on a display 517 provided for the smart phone 5 as described below.

The smart phone 5 may communicate with the special image capturing device 1 and the generic image capturing device 3, without using the near-distance wireless communication, but using wired communication such as a cable. The smart phone 5 is an example of an image processing apparatus capable of processing images being captured. Other examples of the image processing apparatus include, but not limited to, a tablet personal computer (PC), a note PC, and a desktop PC. The smart phone 5 may operate as a communication terminal described below.

Figure 9:
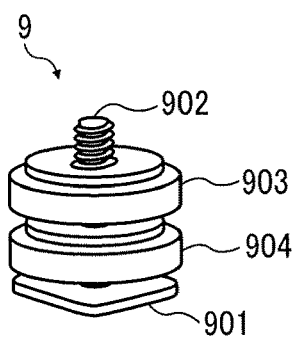
FIG. 9 is a perspective view illustrating an adapter, according to the first embodiment.

FIG. 9 is a perspective view illustrating the adapter 9 according to the embodiment. As illustrated in FIG. 9, the adapter 9 includes a shoe adapter 901a, a bolt 902, an upper adjuster 903, and a lower adjuster 904. The shoe adapter 901a is attached to an accessory shoe of the generic image capturing device 3 as it slides. The bolt 902 is provided at a center of the shoe adapter 901a, which is to be screwed into the tripod mount hole 151 of the special image capturing device 1. The bolt 902 is provided with the upper adjuster 903 and the lower adjuster 904, each of which is rotatable around the central axis of the bolt 902. The upper adjuster 903 secures the object attached with the bolt 902 (such as the special image capturing device 1). The lower adjuster 904 secures the object attached with the shoe adapter 901a (such as the generic image capturing device 3).

Figure 10:
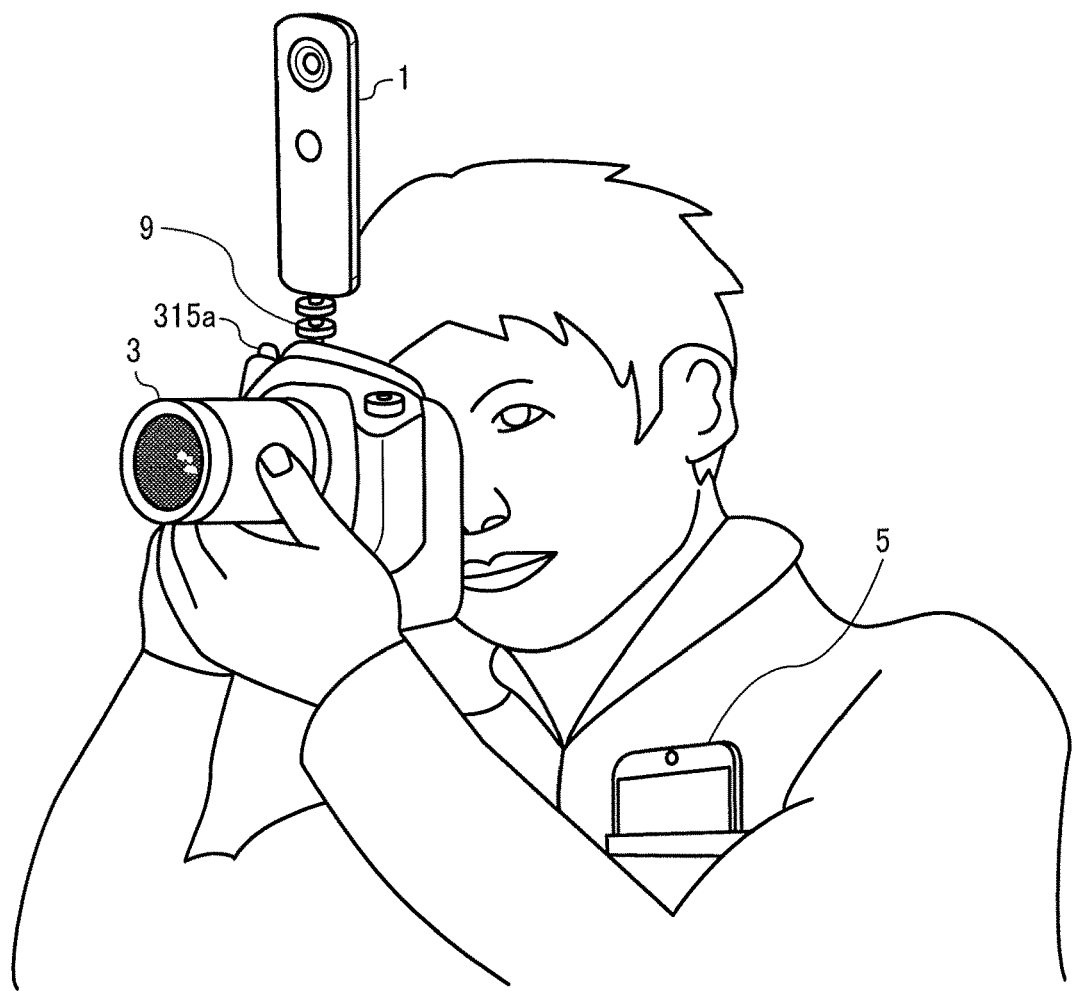
FIG. 10 illustrates how a user uses the image capturing system, according to the first embodiment.

FIG. 10 illustrates how a user uses the image capturing device, according to the embodiment. As illustrated in FIG. 10, the user puts his or her smart phone 5 into his or her pocket. The user captures an image of an object using the generic image capturing device 3 to which the special image capturing device 1 is attached by the adapter 9. While the smart phone 5 is placed in the pocket of the user's shirt, the smart phone 5 may be placed in any area as long as it is wirelessly communicable with the special image capturing device 1 and the generic image capturing device 3.

Hardware Configuration

Figure 11:
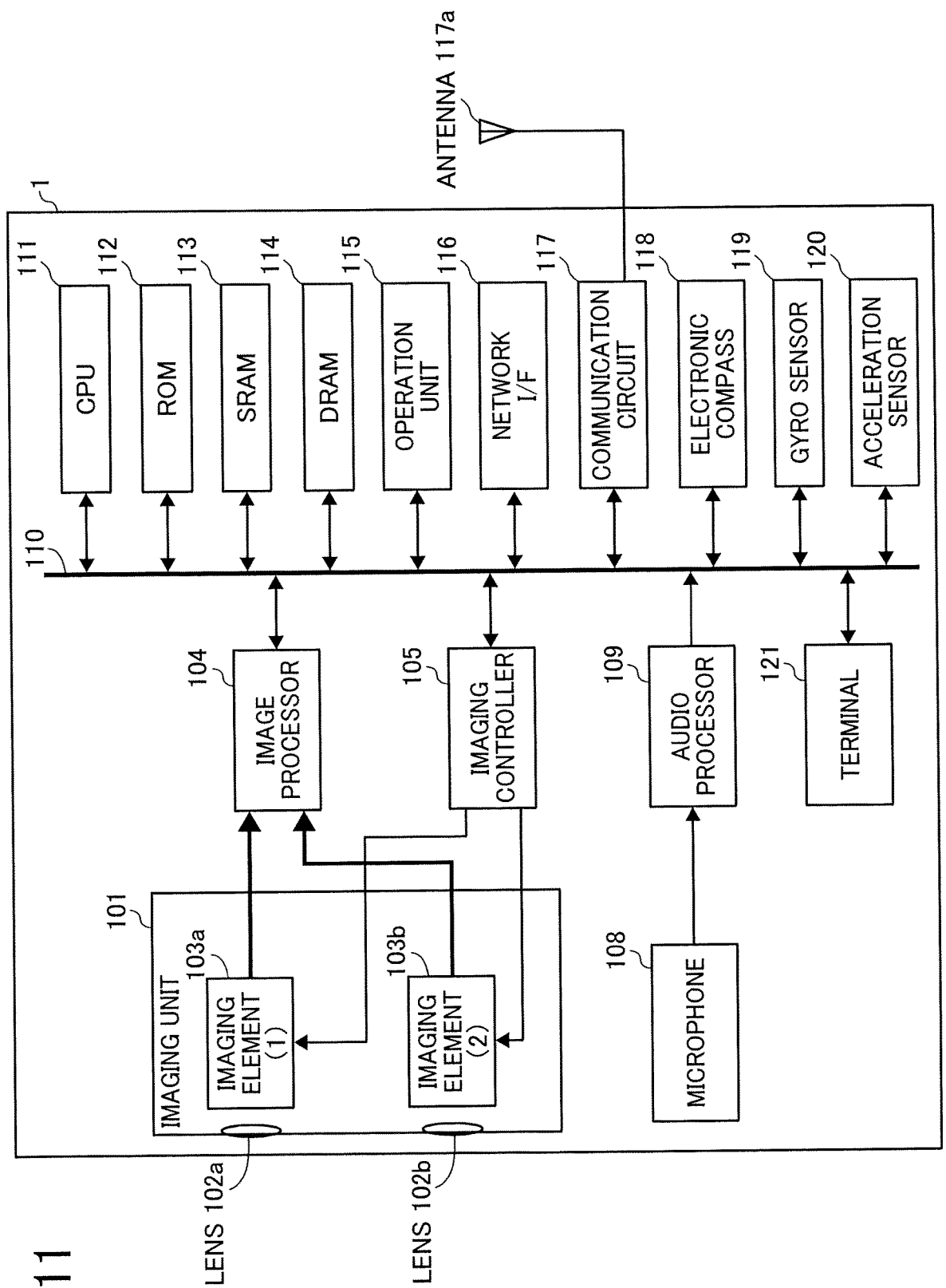
FIG. 11 is a schematic block diagram illustrating a hardware configuration of a special-purpose image capturing device according to the first embodiment.
Figure 12:
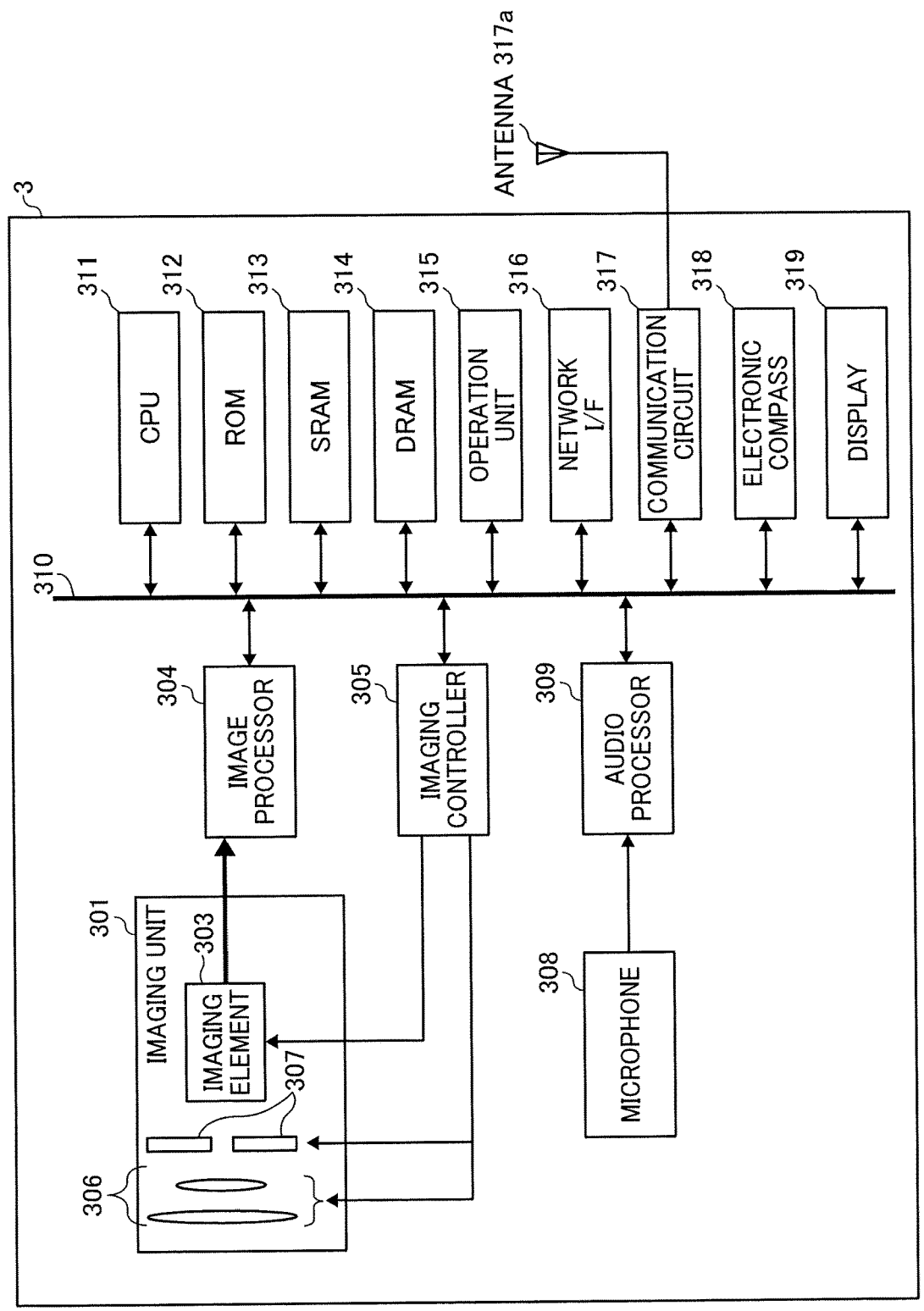
FIG. 12 is a schematic block diagram illustrating a hardware configuration of a general-purpose image capturing device according to the first embodiment.
Figure 13:
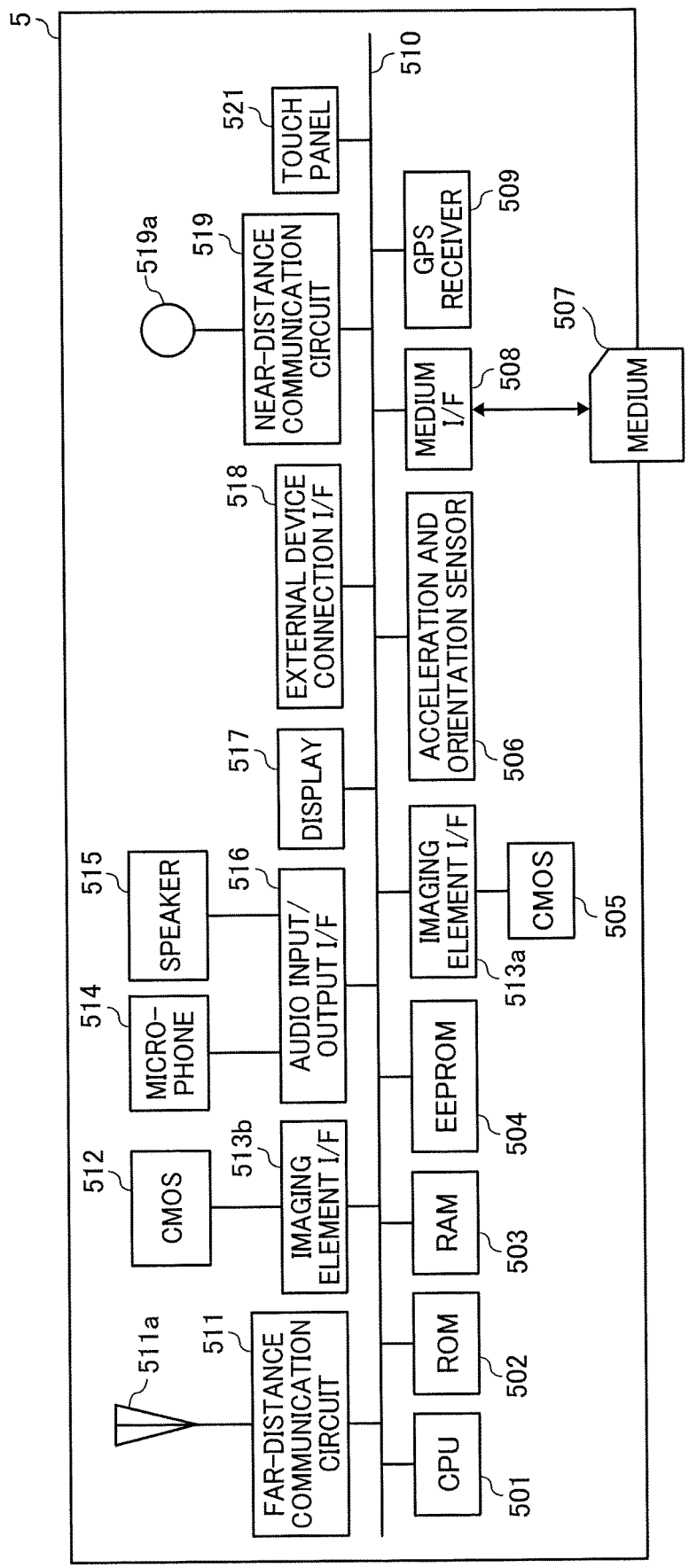
FIG. 13 is a schematic block diagram illustrating a hardware configuration of a smart phone, according to the first embodiment.

Next, referring to FIGS. 11 to 13, hardware configurations of the special image capturing device 1, generic image capturing device 3, and smart phone 5 are described according to the embodiment.

<Hardware Configuration of Special Image Capturing Device>

First, referring to FIG. 11, a hardware configuration of the special image capturing device 1 is described according to the embodiment. FIG. 11 illustrates the hardware configuration of the special image capturing device 1. The following describes a case in which the special image capturing device 1 is a spherical (omnidirectional) image capturing device having two imaging elements. However, the special image capturing device 1 may include any suitable number of imaging elements, providing that it includes at least two imaging elements. In addition, the special image capturing device 1 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the special image capturing device 1.

As illustrated in FIG. 11, the special image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, an acceleration sensor 120, and a Micro USB terminal 121.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network I/F 116, the communication circuit 117, the electronic compass 118, and the terminal 121 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when the shutter button 115a of the operation unit 115 is pressed. In some cases, the special image capturing device 1 is capable of displaying a preview image on a display (e.g., the display of the smart phone 5) or displaying a moving image (movie). In case of displaying movie, the image data are continuously output from the imaging elements 103a and 103b at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the special image capturing device 1 does not include a display in this embodiment, the special image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the special image capturing device 1, for example, by performing predetermined processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as the shutter button 115a. In addition to the hardware keys, the operation unit 115 may also include a touch panel. The user operates the operation unit 115 to input various image capturing (photographing) modes or image capturing (photographing) conditions.

The network I/F 116 collectively refers to an interface circuit such as a USB I/F that allows the special image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 5 via the network I/F 116, at any desired time.

The communication circuit 117 communicates data with the external device such as the smart phone 5 or the adapter 9 via the antenna 117a of the special image capturing device 1 by near-distance wireless communication such as Wi-Fi, NFC, and Bluetooth. The communication circuit 117 is also capable of transmitting the data of equirectangular projection image to the external device such as the smart phone 5.

The electronic compass 118 calculates an orientation of the special image capturing device 1 from the Earth's magnetism to output orientation information. This orientation information is an example of related information, which is metadata described in compliance with Exif. This information is used for image processing such as image correction of captured images. The related information also includes a date and time when the image is captured by the special image capturing device 1, and a size of the image data.

The gyro sensor 119 detects the change in tilt of the special image capturing device 1 (roll, pitch, yaw) with movement of the special image capturing device 1. The change in angle is one example of related information (metadata) described in compliance with Exif. This information is used for image processing such as image correction of captured images.

The acceleration sensor 120 detects acceleration in three axial directions. The position (an angle with respect to the direction of gravity) of the special image capturing device 1 is determined, based on the detected acceleration. With the gyro sensor 119 and the acceleration sensor 120, accuracy in image correction improves.

The Micro USB terminal 121 is a connector to be connected with such as a Micro USB cable, or other electronic device.

<Hardware Configuration of Generic Image Capturing Device>

Next, referring to FIG. 12, a hardware configuration of the generic image capturing device 3 is described according to the embodiment. FIG. 12 illustrates the hardware configuration of the generic image capturing device 3. As illustrated in FIG. 12, the generic image capturing device 3 includes an imaging unit 301, an image processor 304, an imaging controller 305, a microphone 308, an audio processor 309, a bus 310, a CPU 311, a ROM 312, a SRAM 313, a DRAM 314, an operation unit 315, a network I/F 316, a communication circuit 317, an antenna 317a, an electronic compass 318, and a display 319. The image processor 304 and the imaging controller 305 are each connected to the CPU 311 via the bus 310.

The elements 304, 310, 311, 312, 313, 314, 315, 316, 317, 317a, and 318 of the generic image capturing device 3 are substantially similar in structure and function to the elements 104, 110, 111, 112, 113, 114, 115, 116, 117, 117a, and 118 of the special image capturing device 1, such that the description thereof is omitted.

Further, as illustrated in FIG. 12, in the imaging unit 301 of the generic image capturing device 3, a lens unit 306 having a plurality of lenses, a mechanical shutter button 307, and the imaging element 303 are disposed in this order from a side facing the outside (that is, a side to face the object to be captured).

The imaging controller 305 is substantially similar in structure and function to the imaging controller 105. The imaging controller 305 further controls operation of the lens unit 306 and the mechanical shutter button 307, according to user operation input through the operation unit 315.

The display 319 is capable of displaying an operational menu, an image being captured, or an image that has been captured, etc.

<Hardware Configuration of Smart Phone>

Referring to FIG. 13, a hardware configuration of the smart phone 5 is described according to the embodiment. FIG. 13 illustrates the hardware configuration of the smart phone 5. As illustrated in FIG. 13, the smart phone 5 includes a CPU 501, a ROM 502, a RAM 503, an EEPROM 504, a Complementary Metal Oxide Semiconductor (CMOS) sensor 505, an imaging element I/F 513a, an acceleration and orientation sensor 506, a medium I/F 508, and a GPS receiver 509.

The CPU 501 controls entire operation of the smart phone 5. The ROM 502 stores a control program for controlling the CPU 501 such as an IPL. The RAM 503 is used as a work area for the CPU 501. The EEPROM 504 reads or writes various data such as a control program for the smart phone 5 under control of the CPU 501. The CMOS sensor 505 captures an object (for example, the user operating the smart phone 5) under control of the CPU 501 to obtain captured image data. The imaging element I/F 513a is a circuit that controls driving of the CMOS sensor 505. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The smart phone 5 further includes a far-distance communication circuit 511, an antenna 511a for the far-distance communication circuit 511, a CMOS sensor 512, an imaging element I/F 513b, a microphone 514, a speaker 515, an audio input/output I/F 516, a display 517, an external device connection I/F 518, a near-distance communication circuit 519, an antenna 519a for the near-distance communication circuit 519, and a touch panel 521.

The far-distance communication circuit 511 is a circuit that communicates with other device through the communication network 100. The CMOS sensor 512 is an example of a built-in imaging device capable of capturing a subject under control of the CPU 501. The imaging element I/F 513a is a circuit that controls driving of the CMOS sensor 512. The microphone 514 is an example of built-in audio collecting device capable of inputting audio under control of the CPU 501. The audio I/O I/F 516 is a circuit for inputting or outputting an audio signal between the microphone 514 and the speaker 515 under control of the CPU 501. The display 517 may be a liquid crystal or organic electro luminescence (EL) display that displays an image of a subject, an operation icon, or the like. The external device connection I/F 518 is an interface circuit that connects the smart phone 5 to various external devices. The near-distance communication circuit 519 is a communication circuit that communicates in compliance with the Wi-Fi, NFC, Bluetooth, and the like. The touch panel 521 is an example of input device that enables the user to input a user instruction through touching a screen of the display 517.

The smart phone 5 further includes a bus line 510. Examples of the bus line 510 include an address bus and a data bus, which electrically connects the elements such as the CPU 501.

It should be noted that a recording medium such as a CD-ROM or HD storing any of the above-described programs may be distributed domestically or overseas as a program product.

<Functional Configuration of Image Capturing System>

Figure 14:
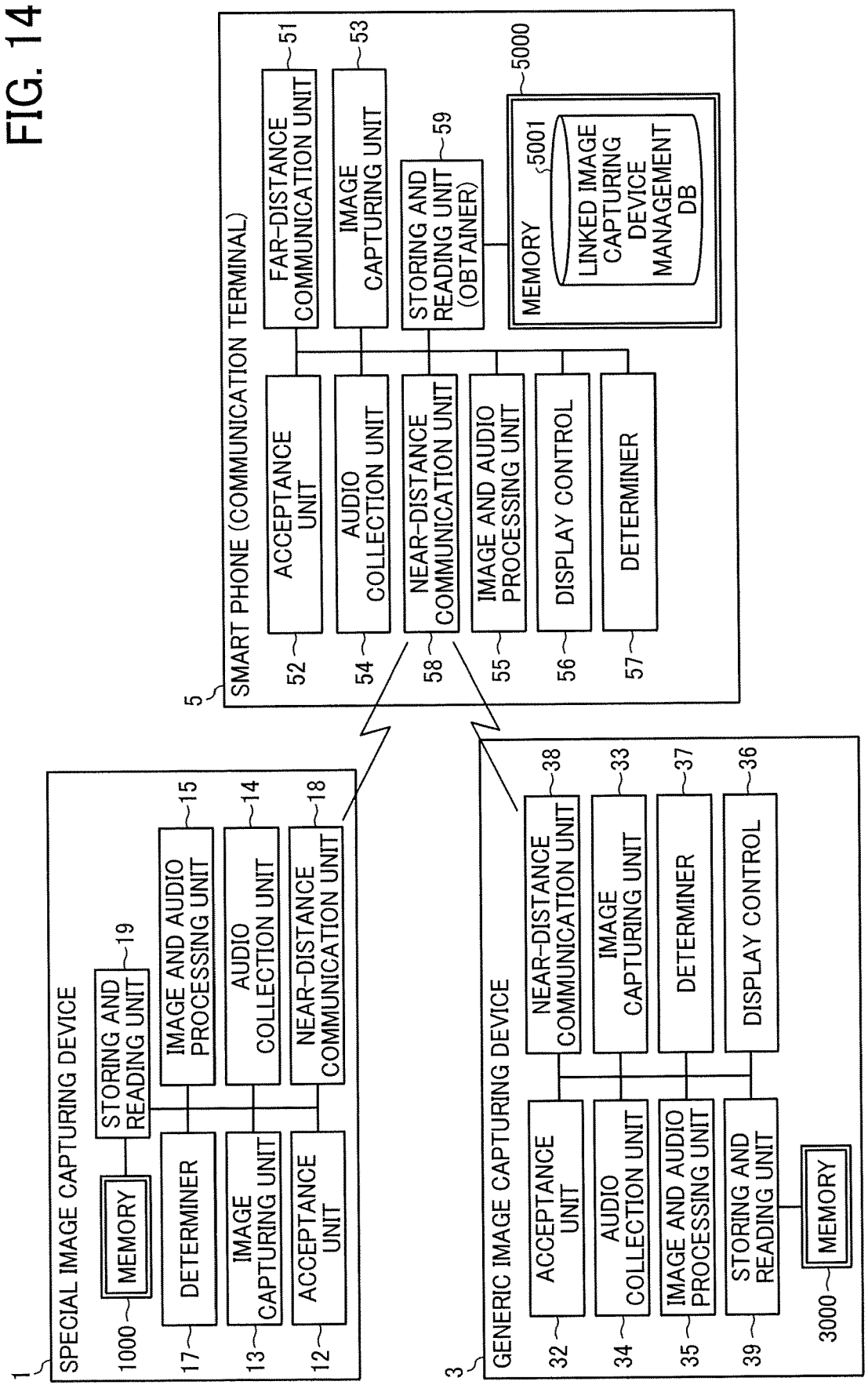
FIG. 14 is a functional block diagram of the image capturing system according to the first embodiment.

Referring now to FIGS. 11 to 14, a functional configuration of the image capturing system is described according to the embodiment. FIG. 14 is a schematic block diagram illustrating functional configurations of the special image capturing device 1, generic image capturing device 3, and smart phone 5, in the image capturing system, according to the embodiment.

<Functional Configuration of Special Image Capturing Device>

Referring to FIGS. 11 and 14, a functional configuration of the special image capturing device 1 is described according to the embodiment. As illustrated in FIG. 14, the special image capturing device 1 includes an acceptance unit 12, an image capturing unit 13, an audio collection unit 14, an image and audio processing unit 15, a determiner 17, a near-distance communication unit 18, and a storing and reading unit 19. These units are functions that are implemented by or that are caused to function by operating any of the elements illustrated in FIG. 11 in cooperation with the instructions of the CPU 111 according to the special image capturing device control program expanded from the SRAM 113 to the DRAM 114.

The special image capturing device 1 further includes a memory 1000, which is implemented by the ROM 112, the SRAM 113, and the DRAM 114 illustrated in FIG. 11.

Still referring to FIGS. 11 and 14, each functional unit of the special image capturing device 1 is described according to the embodiment.

The acceptance unit 12 of the special image capturing device 1 is implemented by the operation unit 115 illustrated in FIG. 11, which operates under control of the CPU 111. The acceptance unit 12 receives an instruction input from the operation unit 115 according to a user operation.

The image capturing unit 13 is implemented by the imaging unit 101, the image processor 104, and the imaging controller 105, illustrated in FIG. 11, each operating under control of the CPU 111. The image capturing unit 13 captures an image of the object or surroundings to obtain captured image data. As the captured image data, the two hemispherical images, from which the spherical image is generated, are obtained as illustrated in FIGS. 3A and 3B.

The audio collection unit 14 is implemented by the microphone 108 and the audio processor 109 illustrated in FIG. 11, each of which operates under control of the CPU 111. The audio collection unit 14 collects sounds around the special image capturing device 1.

The image and audio processing unit 15 is implemented by the instructions of the CPU 111, illustrated in FIG. 11. The image and audio processing unit 15 applies image processing to the captured image data obtained by the image capturing unit 13. The image and audio processing unit 15 applies audio processing to audio obtained by the audio collection unit 14. For example, the image and audio processing unit 15 generates data of the equirectangular projection image (FIG. 3C), using two hemispherical images (FIGS. 3A and 3B) respectively obtained by the imaging elements 103a and 103b.

The determiner 17, which is implemented by instructions of the CPU 111, performs various determinations.

The near-distance communication unit 18, which is implemented by instructions of the CPU 111, and the communication circuit 117 with the antenna 117a, communicates data with a near-distance communication unit 58 of the smart phone 5 using the near-distance wireless communication in compliance with such as Wi-Fi.

The storing and reading unit 19, which is implemented by instructions of the CPU 111 illustrated in FIG. 11, stores various data or information in the memory 1000 or reads out various data or information from the memory 1000.

<Functional Configuration of Generic Image Capturing Device>

Next, referring to FIGS. 12 and 14, a functional configuration of the generic image capturing device 3 is described according to the embodiment. As illustrated in FIG. 14, the generic image capturing device 3 includes an acceptance unit 32, an image capturing unit 33, an audio collection unit 34, an image and audio processing unit 35, a display control 36, a determiner 37, a near-distance communication unit 38, and a storing and reading unit 39. These units are functions that are implemented by or that are caused to function by operating any of the elements illustrated in FIG. 12 in cooperation with the instructions of the CPU 311 according to the image capturing device control program expanded from the SRAM 313 to the DRAM 314.

The generic image capturing device 3 further includes a memory 3000, which is implemented by the ROM 312, the SRAM 313, and the DRAM 314 illustrated in FIG. 12.

The acceptance unit 32 of the generic image capturing device 3 is implemented by the operation unit 315 illustrated in FIG. 12, which operates under control of the CPU 311. The acceptance unit 32 receives an instruction input from the operation unit 315 according to a user operation.

The image capturing unit 33 is implemented by the imaging unit 301, the image processor 304, and the imaging controller 305, illustrated in FIG. 12, each of which operates under control of the CPU 311. The image capturing unit 13 captures an image of the object or surroundings to obtain captured image data. In this example, the captured image data is planar image data, captured with a perspective projection method.

The audio collection unit 34 is implemented by the microphone 308 and the audio processor 309 illustrated in FIG. 12, each of which operates under control of the CPU 311. The audio collection unit 34 collects sounds around the generic image capturing device 3.

The image and audio processing unit 35 is implemented by the instructions of the CPU 311, illustrated in FIG. 12. The image and audio processing unit 35 applies image processing to the captured image data obtained by the image capturing unit 33. The image and audio processing unit 35 applies audio processing to audio obtained by the audio collection unit 34.

The display control 36, which is implemented by the instructions of the CPU 311 illustrated in FIG. 12, controls the display 319 to display a planar image P based on the captured image data that is being captured or that has been captured.

The determiner 37, which is implemented by instructions of the CPU 311, performs various determinations. For example, the determiner 37 determines whether the shutter button 315a has been pressed by the user.

The near-distance communication unit 38, which is implemented by instructions of the CPU 311, and the communication circuit 317 with the antenna 317a, communicates data with the near-distance communication unit 58 of the smart phone 5 using the near-distance wireless communication in compliance with such as Wi-Fi.

The storing and reading unit 39, which is implemented by instructions of the CPU 311 illustrated in FIG. 12, stores various data or information in the memory 3000 or reads out various data or information from the memory 3000.

<Functional Configuration of Smart Phone>

Referring now to FIGS. 13 to 16, a functional configuration of the smart phone 5 is described according to the embodiment. As illustrated in FIG. 14, the smart phone 5 includes a far-distance communication unit 51, an acceptance unit 52, an image capturing unit 53, an audio collection unit 54, an image and audio processing unit 55, a display control 56, a determiner 57, the near-distance communication unit 58, and a storing and reading unit 59. These units are functions that are implemented by or that are caused to function by operating any of the hardware elements illustrated in FIG. 13 in cooperation with the instructions of the CPU 501 according to the control program for the smart phone 5, expanded from the EEPROM 504 to the RAM 503.

Figures 15A, 15B:
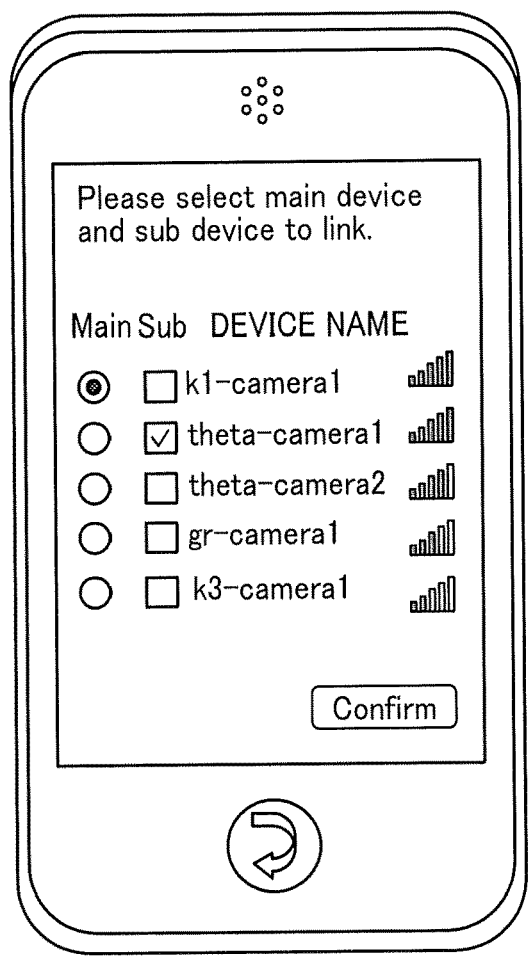
FIGS. 15A and 15B are conceptual diagrams respectively illustrating a linked image capturing device management table, and a linked image capturing device configuration screen, according to the first embodiment.

The smart phone 5 further includes a memory 5000, which is implemented by the ROM 502, RAM 503 and EEPROM 504 illustrated in FIG. 13. The memory 5000 stores a linked image capturing device management DB 5001. The linked image capturing device management DB 5001 is implemented by a linked image capturing device management table illustrated in FIG. 15A. FIG. 15A is a conceptual diagram illustrating the linked image capturing device management table, according to the embodiment.

Referring now to FIG. 15A, the linked image capturing device management table is described according to the embodiment. As illustrated in FIG. 15A, the linked image capturing device management table stores, for each image capturing device, linking information indicating a relation to the linked image capturing device, an IP address of the image capturing device, and a device name of the image capturing device, in association with one another. The linking information indicates whether the image capturing device is "main" device or "sub" device in performing the linking function. The image capturing device as the "main" device, starts capturing the image in response to pressing of the shutter button provided for that device. The image capturing device as the "sub" device, starts capturing the image in response to pressing of the shutter button provided for the "main" device. The IP address is one example of destination information indicating a destination to which information is transmitted to communicate with the image capturing device. The IP address is used in case the image capturing device communicates using Wi-Fi. Alternatively, a manufacturer's identification (ID) or a product ID may be used in case the image capturing device communicates using a wired USB cable. Alternatively, a Bluetooth Device (BD) address is used in case the image capturing device communicates using wireless communication such as Bluetooth.

The far-distance communication unit 51 of the smart phone 5 is implemented by the far-distance communication circuit 511 that operates under control of the CPU 501, illustrated in FIG. 13, to transmit or receive various data or information to or from other device (for example, other smart phone or server) through a communication network such as the Internet.

The acceptance unit 52 is implement by the touch panel 521, which operates under control of the CPU 501, to receive various selections or inputs from the user. While the touch panel 521 is provided separately from the display 517 in FIG. 13, the display 517 and the touch panel 521 may be integrated as one device. Further, the smart phone 5 may include any hardware key, such as a button, to receive the user instruction, in addition to the touch panel 521.

The image capturing unit 53 is implemented by the CMOS sensors 505 and 512, which operate under control of the CPU 501, illustrated in FIG. 13. The image capturing unit 13 captures an image of the object or surroundings to obtain captured image data.

In this example, the captured image data is planar image data, captured with a perspective projection method.

The audio collection unit 54 is implemented by the microphone 514 that operates under control of the CPU 501. The audio collecting unit 14a collects sounds around the smart phone 5.

The image and audio processing unit 55 is implemented by the instructions of the CPU 501, illustrated in FIG. 13. The image and audio processing unit 55 applies image processing to an image of the object that has been captured by the image capturing unit 53. The image and audio processing unit 15 applies audio processing to audio obtained by the audio collection unit 54.

The display control 56, which is implemented by the instructions of the CPU 501 illustrated in FIG. 13, controls the display 517 to display the planar image P based on the captured image data that is being captured or that has been captured by the image capturing unit 53. The display control 56 superimposes the planar image P, on the spherical image CE, using superimposed display metadata, generated by the image and audio processing unit 55. With the superimposed display metadata, each grid area LA0 of the planar image P is placed at a location indicated by a location parameter, and is adjusted to have a brightness value and a color value indicated by a correction parameter. The planar image P is not previously combined with the spherical image CE, but the planar image P is superimposed on the spherical image CE for display to the user. This enables the planar image P to be displayed in various display forms, for example, by changing a zoom ratio or a projection method.

In this example, the location parameter is one example of location information. The correction parameter is one example of correction information.

The determiner 57 is implemented by the instructions of the CPU 501, illustrated in FIG. 13, to perform various determinations.

The near-distance communication unit 58, which is implemented by instructions of the CPU 501, and the near-distance communication circuit 519 with the antenna 519a, communicates data with the near-distance communication unit 18 of the special image capturing device 1, and the near-distance communication unit 38 of the generic image capturing device 3, using the near-distance wireless communication in compliance with such as Wi-Fi.

The storing and reading unit 59, which is implemented by instructions of the CPU 501 illustrated in FIG. 13, stores various data or information in the memory 5000 or reads out various data or information from the memory 5000. For example, the superimposed display metadata may be stored in the memory 5000. In this embodiment, the storing and reading unit 59 functions as an obtainer that obtains various data from the memory 5000.

Figure 16:
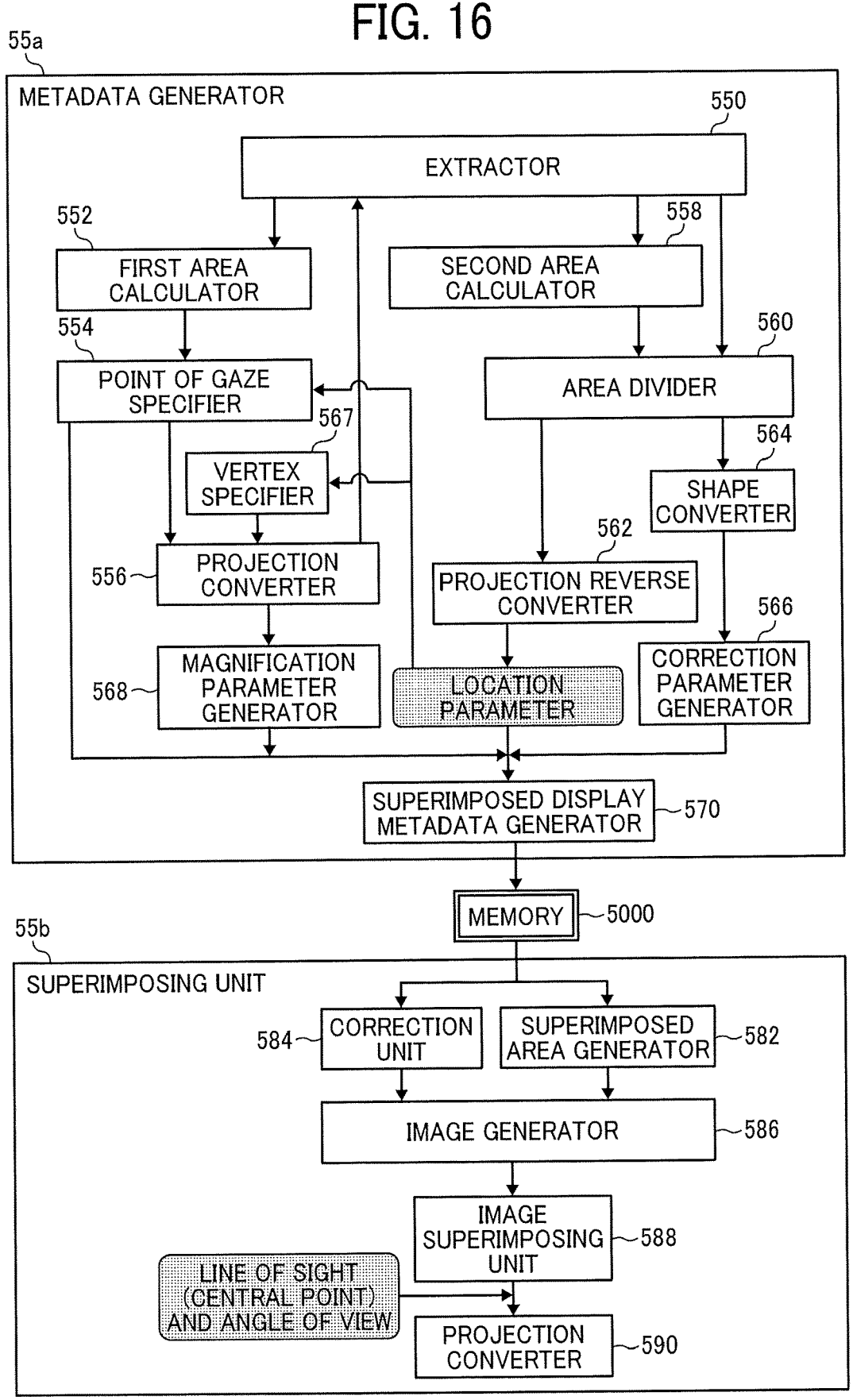
FIG. 16 is a block diagram illustrating a functional configuration of an image and audio processing unit according to the first embodiment.

Referring to FIG. 16, a functional configuration of the image and audio processing unit 55 is described according to the embodiment. FIG. 16 is a block diagram illustrating the functional configuration of the image and audio processing unit 55 according to the embodiment.

Figure 19:
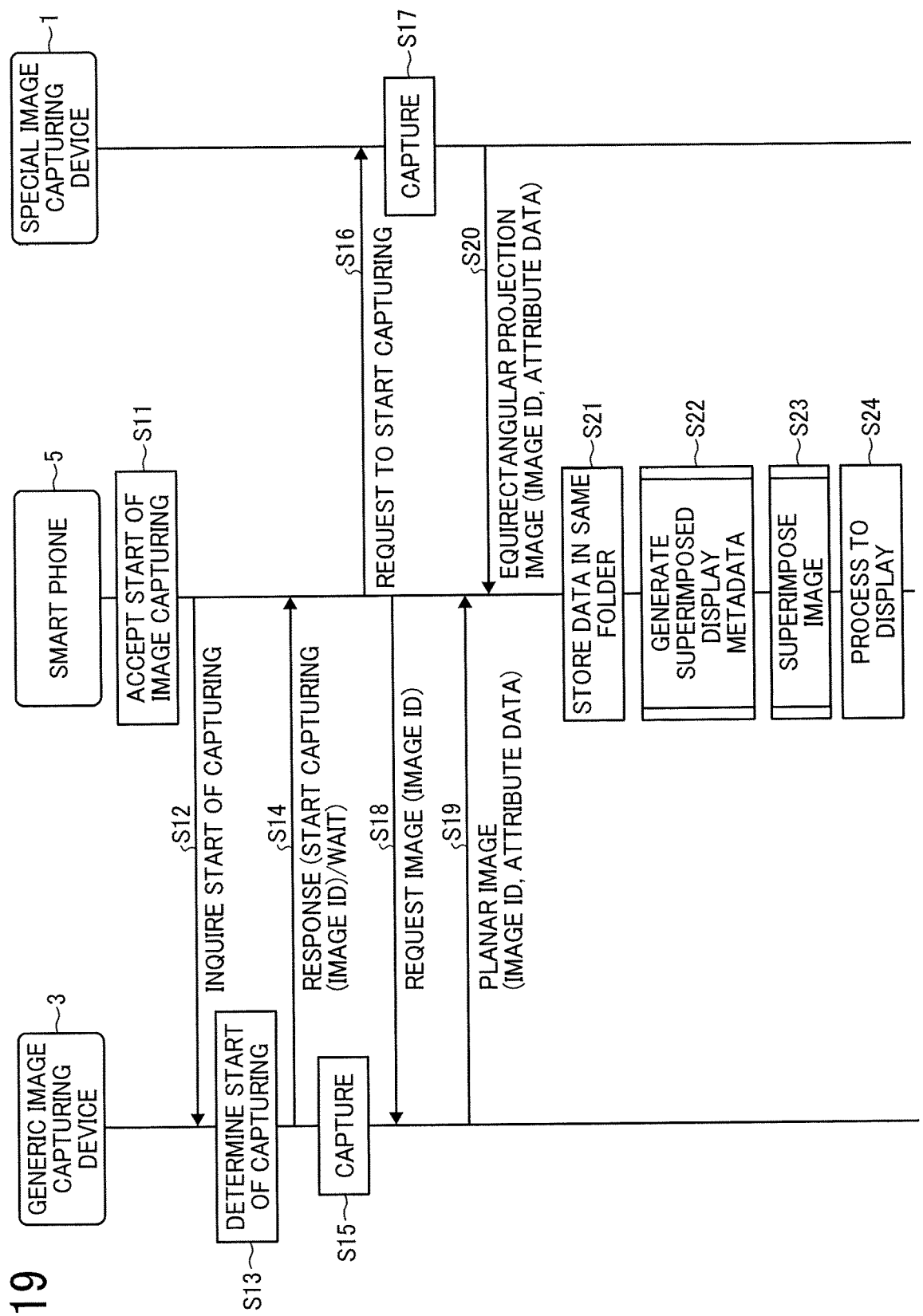
FIG. 19 is a data sequence diagram illustrating operation of capturing the image, performed by the image capturing system, according to the first embodiment.

The image and audio processing unit 55 mainly includes a metadata generator 55a that performs encoding, and a superimposing unit 55b that performs decoding. In this example, the encoding corresponds to processing to generate metadata to be used for superimposing images for display ("superimposed display metadata"). Further, in this example, the decoding corresponds to processing to generate images for display using the superimposed display metadata. The metadata generator 55a performs processing of S22, which is processing to generate superimposed display metadata, as illustrated in FIG. 19. The superimposing unit 55b performs processing of S23, which is processing to superimpose the images using the superimposed display metadata, as illustrated in FIG. 19.

Figure 20:
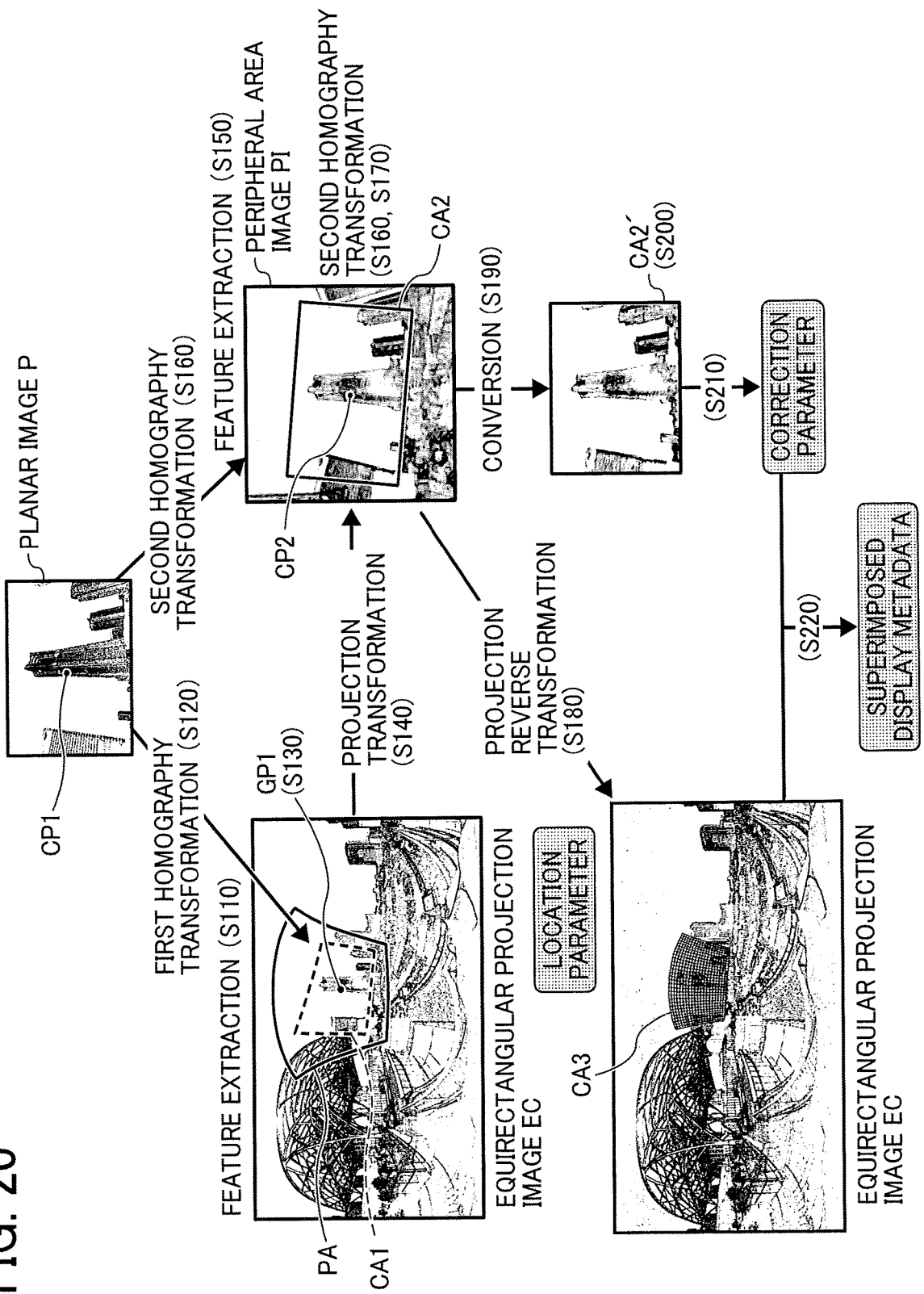
FIG. 20 is a conceptual diagram illustrating operation of generating a superimposed display metadata, according to the first embodiment.

First, a functional configuration of the metadata generator 55a is described according to the embodiment. The metadata generator 55a includes an extractor 550, a first area calculator 552, a point of gaze specifier 554, a projection converter 556, a second area calculator 558, an area divider 560, a projection reverse converter 562, a shape converter 564, a correction parameter generator 566, and a superimposed display metadata generator 570. In case the brightness and color is not to be corrected, the shape converter 564 and the correction parameter generator 566 do not have to be provided. FIG. 20 is a conceptual diagram illustrating operation of generating the superimposed display metadata, with images processed or generated in such operation.

The extractor 550 extracts feature points according to local features of each of two images having the same object. The feature points are distinctive keypoints in both images. The local features correspond to a pattern or structure detected in the image such as an edge or blob. In this embodiment, the extractor 550 extracts the features points for each of two images that are different from each other. These two images to be processed by the extractor 550 may be the images that have been generated using different image projection methods. Unless the difference in projection methods cause highly distorted images, any desired image projection methods may be used. For example, referring to FIG. 20, the extractor 550 extracts feature points from the rectangular, equirectangular projection image EC in equirectangular projection (S110), and the rectangular, planar image P in perspective projection (S110), based on local features of each of these images including the same object. Further, the extractor 550 extracts feature points from the rectangular, planar image P (S110), and a peripheral area image PI converted by the projection converter 556 (S150), based on local features of each of these images having the same object. In this embodiment, the equirectangular projection method is one example of a first projection method, and the perspective projection method is one example of a second projection method. The equirectangular projection image is one example of the first projection image, and the planar image P is one example of the second projection image.

The first area calculator 552 calculates the feature value fv1 based on the plurality of feature points fp1 in the equirectangular projection image EC. The first area calculator 552 further calculates the feature value fv2 based on the plurality of feature points fp2 in the planar image P. The feature values, or feature points, may be detected in any desired method. However, it is desirable that feature values, or feature points, are invariant or robust to changes in scale or image rotation. The first area calculator 552 specifies corresponding points between the images, based on similarity between the feature value fv1 of the feature points fp1 in the equirectangular projection image EC, and the feature value fv2 of the feature points fp2 in the planar image P. Based on the corresponding points between the images, the first area calculator 552 calculates the homography for transformation between the equirectangular projection image EC and the planar image P. The first area calculator 552 then applies first homography transformation to the planar image P (S120). Accordingly, the first area calculator 552 obtains a first corresponding area CA1 ("first area CA1"), in the equirectangular projection image EC, which corresponds to the planar image P. In such case, a central point CP1 of a rectangle defined by four vertices of the planar image P, is converted to the point of gaze GP1 in the equirectangular projection image EC, by the first homography transformation.

Here, the coordinates of four vertices p1, p2, p3, and p4 of the planar image P are p1=(x1, y1), p2=(x2, y2), p3=(x3, y3), and p4=(x4, y4). The first area calculator 552 calculates the central point CP1 $(x, y)$ using the equation 2 below.

$$S1=\{(x4-x2)*(y1-y2)-(y4-y2)*(x1-x2)\}/2, S2=\{(x4-x2)*(y2-y3)-(y4-y2)*(x2-x3)\}/2, x=x1+(x3-x1)*S1/(S1+S2), y=y1+(y3-y1)*S1/(S1+S2) \quad \text{(Equation 2)}$$

While the planar image P is a rectangle in the case of FIG. 20, the central point CP1 may be calculated using the equation 2 with an intersection of diagonal lines of the planar image P, even when the planar image P is a square, trapezoid, or rhombus. When the planar image P has a shape of rectangle or square, the central point of the diagonal line may be set as the central point CP1. In such case, the central points of the diagonal lines of the vertices p1 and p3 are calculated, respectively, using the equation 3 below.

$$x=(x1+x3)/2, y=(y1+y3)/2 \quad \text{(Equation 3)}$$

The point of gaze specifier 554 specifies the point (referred to as the point of gaze) in the equirectangular projection image EC, which corresponds to the central point CP1 of the planar image P after the first homography transformation (S130).

Here, the point of gaze GP1 is expressed as a coordinate on the equirectangular projection image EC. The coordinate of the point of gaze GP1 may be transformed to the latitude and longitude. Specifically, a coordinate in the vertical direction of the equirectangular projection image EC is expressed as a latitude in the range of −90 degree (−0.5π) to +90 degree (+0.5π). Further, a coordinate in the horizontal direction of the equirectangular projection image EC is expressed as a longitude in the range of −180 degree (−π) to +180 degree (+π). With this transformation, the coordinate of each pixel, according to the image size of the equirectangular projection image EC, can be calculated from the latitude and longitude system.

The projection converter 556 extracts a peripheral area PA, which is a part surrounding the point of gaze GP1, from the equirectangular projection image EC. The projection converter 556 converts the peripheral area PA, from the equirectangular projection to the perspective projection, to generate a peripheral area image PI (S140). The peripheral area PA is determined, such that, after projection transformation, the square-shaped, peripheral area image PI has a vertical angle of view (or a horizontal angle of view), which is the same as the diagonal angle of view α of the planar image P. Here, the central point CP2 of the peripheral area image PI corresponds to the point of gaze GP 1.

(Transformation of Projection)

The following describes transformation of a projection, performed at S140 of FIG. 20, in detail. As described above referring to FIGS. 3 to 5, the equirectangular projection image EC covers a surface of the sphere CS, to generate the spherical image CE. Therefore, each pixel in the equirectangular projection image EC corresponds to each pixel in the surface of the sphere CS, that is, the three-dimensional, spherical image. The projection converter 556 applies the following transformation equation. Here, the coordinate system used for the equirectangular projection image EC is expressed with (latitude, longitude)=(ea, aa), and the rectangular coordinate system used for the three-dimensional sphere CS is expressed with (x, y, z).

$$(x,y,z)=(\cos(ea)\times\cos(aa),\cos(ea)\times\sin(aa),\sin(ea)),$$
wherein the sphere $CS$ has a radius of 1. (Equation 4)

The planar image P in perspective projection, is a two-dimensional image. When the planar image P is represented by the two-dimensional polar coordinate system (moving radius, argument)=(r, a), the moving radius r, which corresponds to the diagonal angle of view α, has a value in the range from 0 to tan (diagonal angle view/2). That is, 0<=r<=tan(diagonal angle view/2). The planar image P, which is represented by the two-dimensional rectangular coordinate system (u, v), can be expressed using the polar coordinate system (moving radius, argument)=(r, a) using the following transformation equation 5.

$$u=r\times\cos(a), v=r\times\sin(a) \quad \text{(Equation 5)}$$

The equation 5 is represented by the three-dimensional coordinate system (moving radius, polar angle, azimuth). For the surface of the sphere CS, the moving radius in the three-dimensional coordinate system is "1". The equirectangular projection image, which covers the surface of the sphere CS, is converted from the equirectangular projection to the perspective projection, using the following equations 6 and 7. Here, the equirectangular projection image is represented by the above-described two-dimensional polar coordinate system (moving radius, azimuth)=(r, a), and the virtual camera IC is located at the center of the sphere.

$$r=\tan(\text{polar angle}) \quad \text{(Equation 6)}$$

$$a=\text{azimuth Assuming that the polar angle is } t, \text{Equation 6 can be expressed as: } t=\arctan(r). \quad \text{(Equation 7)}$$

Accordingly, the three-dimensional polar coordinate (moving radius, polar angle, azimuth) is expressed as (1,arctan(r),a).

The three-dimensional polar coordinate system is transformed into the rectangle coordinate system (x, y, z), using Equation 8.

$$(x,y,z)=(\sin(t)\times\cos(a),\sin(t)\times\sin(a),\cos(t)) \quad \text{(Equation 8)}$$

Equation 8 is applied to convert between the equirectangular projection image EC in equirectangular projection, and the planar image P in perspective projection. More specifically, the moving radius r, which corresponds to the diagonal angle of view α of the planar image P, is used to calculate transformation map coordinates, which indicate correspondence of a location of each pixel between the planar image P and the equirectangular projection image EC. With this transformation map coordinates, the equirectangular projection image EC is transformed to generate the peripheral area image PI in perspective projection.

Through the above-described projection transformation, the coordinate (latitude=90°, longitude=0°) in the equirectangular projection image EC becomes the central point CP2 in the peripheral area image PI in perspective projection. In case of applying projection transformation to an arbitrary point in the equirectangular projection image EC as the point of gaze, the sphere CS covered with the equirectangular projection image EC is rotated such that the coordinate (latitude, longitude) of the point of gaze is positioned at (90°, 0°).

The sphere CS may be rotated using any known equation for rotating the coordinate.

(Determination of Peripheral Area Image)

Figure 21B:
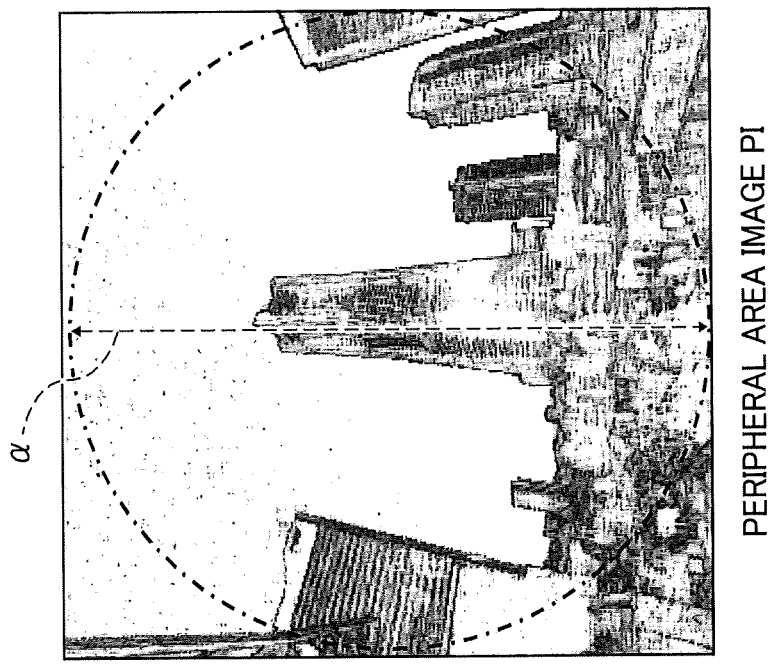
FIGS. 21A and 21B are conceptual diagrams for describing determination of a peripheral area image, according to the first embodiment.
Figure 21A:
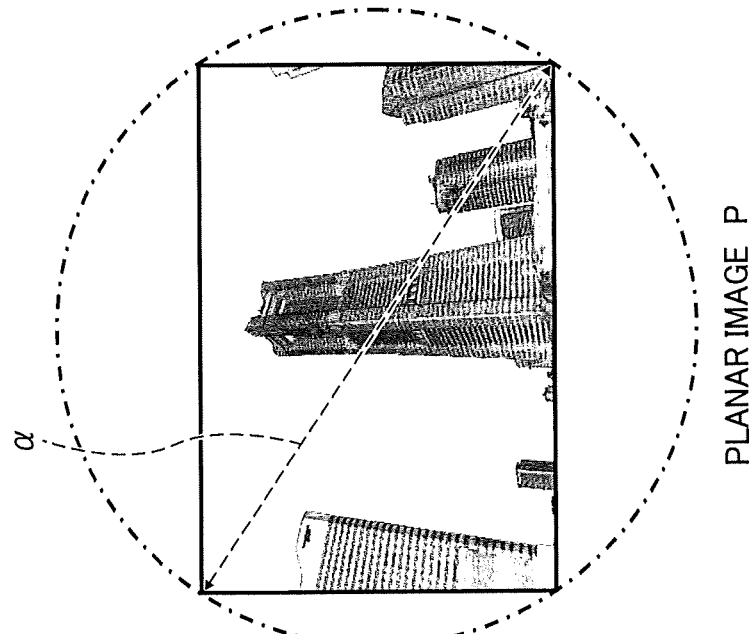

Next, referring to FIGS. 21A and 21B, determination of a peripheral area image P1 is described according to the embodiment. FIGS. 21A and 21B are conceptual diagrams for describing determination of the peripheral area image PI.

To enable the first area calculator 552 to determine correspondence between the planar image P and the peripheral area image PI, it is desirable that the peripheral area image PI is sufficiently large to include the entire second area CA2. If the peripheral area image PI has a large size, the second area CA2 is included in such large-size area image. With the large-size peripheral area image PI, however, the time required for processing increases as there are a large number of pixels subject to similarity calculation. For this reasons, the peripheral area image PI should be a minimum-size image area including at least the entire second area CA2. In this embodiment, the peripheral area image PI is determined as follows.

More specifically, the peripheral area image PI is determined using the 35 mm equivalent focal length of the planar image, which is obtained from the Exif data recorded when the image is captured. Since the 35 mm equivalent focal length is a focal length corresponding to the 24 mm×36 mm film size, it can be calculated from the diagonal and the focal length of the 24 mm×36 mm film, using Equations 9 and 10.

film diagonal=sqrt(24*24+36*36)  (Equation 9)

angle of view of the image to be combined/2=arctan ((film diagonal/2)/35 mm equivalent focal length of the image to be combined)  (Equation 10)

The image with this angle of view has a circular shape. Since the actual imaging element (film) has a rectangular shape, the image taken with the imaging element is a rectangle that is inscribed in such circle. In this embodiment, the peripheral area image PI is determined such that, a vertical angle of view α of the peripheral area image PI is made equal to a diagonal angle of view α of the planar image P. That is, the peripheral area image PI illustrated in FIG. 21B is a rectangle, circumscribed around a circle containing the diagonal angle of view α of the planar image P illustrated in FIG. 21A. The vertical angle of view α is calculated from the diagonal angle of a square and the focal length of the planar image P, using Equations 11 and 12.

angle of view of square=sqrt(film diagonal*film diagonal+film diagonal*film diagonal)  (Equation 11)

vertical angle of view α/2=arctan((angle of view of square/2)/35 mm equivalent focal length of planar image))  (Equation 12)

The calculated vertical angle of view α is used to obtain the peripheral area image PI in perspective projection, through projection transformation. The obtained peripheral area image PI at least contains an image having the diagonal angle of view α of the planar image P while centering on the point of gaze, but has the vertical angle of view α that is kept small as possible.

(Calculation of Location Information)

Referring back to FIGS. 16 and 20, the second area calculator 558 calculates the feature value fp2 of a plurality of feature points fp2 in the planar image P, and the feature value fp3 of a plurality of feature points fp3 in the peripheral area image PI. The second area calculator 558 specifies corresponding points between the images, based on similarity between the feature value fv2 and the feature value fv3. Based on the corresponding points between the images, the second area calculator 558 calculates the homography for transformation between the planar image P and the peripheral area image PI. The second area calculator 558 then applies second homography transformation to the planar image P (S160). Accordingly, the second area calculator 558 obtains a second (corresponding) area CA2 ("second area CA2"), in the peripheral area image PI, which corresponds to the planar image P (S170).

In the above-described transformation, in order to increase the calculation speed, an image size of at least one of the planar image P and the equirectangular projection image EC may be changed, before applying the first homography transformation. For example, assuming that the planar image P has 40 million pixels, and the equirectangular projection image EC has 30 million pixels, the planar image P may be reduced in size to 30 million pixels. Alternatively, both of the planar image P and the equirectangular projection image EC may be reduced in size to 10 million pixels. Similarly, an image size of at least one of the planar image P and the peripheral area image PI may be changed, before applying the second homography transformation.

The homography in this embodiment is a transformation matrix indicating the projection relation between the equirectangular projection image EC and the planar image P. The coordinate system for the planar image P is multiplied by the homography transformation matrix to convert into a corresponding coordinate system for the equirectangular projection image EC (spherical image CE).

Figure 22A:
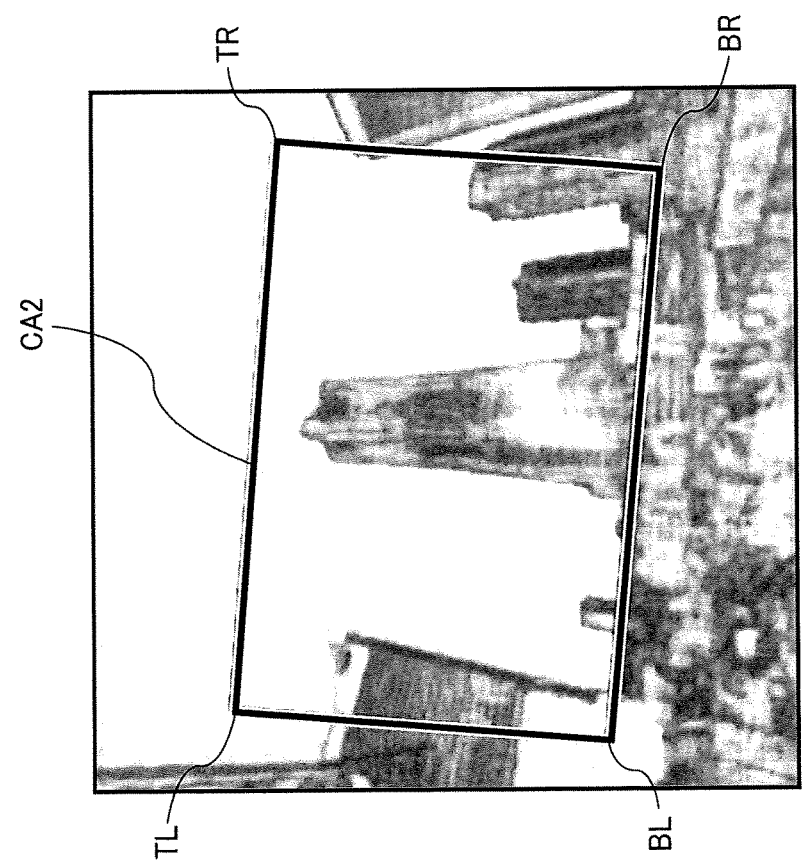
FIGS. 22A and 22B are conceptual diagrams for explaining operation of dividing the second area into a plurality of grid areas, according to the first embodiment.
Figure 22B:
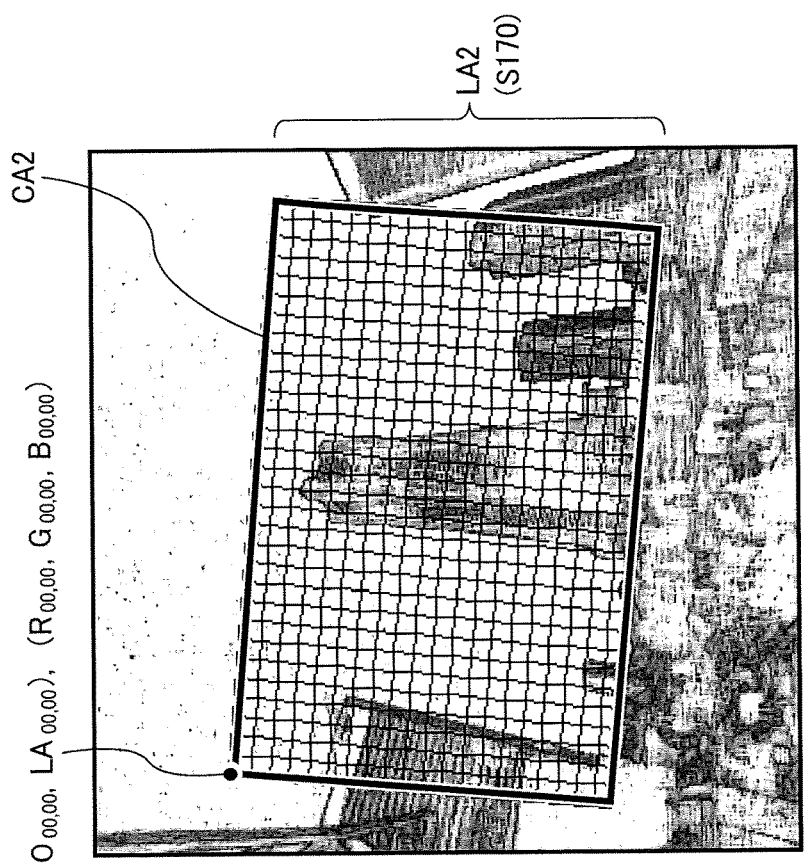

The area divider 560 divides a part of the image into a plurality of grid areas. Referring to FIGS. 22A and 22B, operation of dividing the second area CA2 into a plurality of grid areas is described according to the embodiment. FIGS. 22A and 22B illustrate conceptual diagrams for explaining operation of dividing the second area into a plurality of grid areas, according to the embodiment.

As illustrated in FIG. 22A, the second area CA2 is a rectangle defined by four vertices each obtained with the second homography transformation, by the second area calculator 558. As illustrated in FIG. 22B, the area divider 560 divides the second area CA2 into a plurality of grid areas LA2. For example, the second area CA2 is equally divided into 30 grid areas in the horizontal direction, and into 20 grid areas in the vertical direction.

Next, dividing the second area CA2 into the plurality of grid areas LA2 is explained in detail.

The second area CA2 is equally divided using the following equation. Assuming that a line connecting two points, A(X1, Y1) and B(X2, Y2), is to be equally divided into "n" coordinates, the coordinate of a point Pm that is the "m"th point counted from the point A is calculated using the equation 13.

Pm=(X1+(X2−X1)×m/n, Y1+(Y2−Y1)×m/n)  (Equation 13)

With Equation 13, the line can be equally divided into a plurality of coordinates. The upper line and the lower line of the rectangle are each divided into a plurality of coordinates, to generate a plurality of lines connecting corresponding coordinates of the upper line and the lower line. The generated lines are each divided into a plurality of coordinates, to further generate a plurality of lines. Here, coordinates of points (vertices) of the upper left, upper right, lower right, and lower left of the rectangle are respectively represented by TL, TR, BR, and BL. The line connecting TL and TR, and the line connecting BR and BL are each equally divided into 30 coordinates (0 to 30th coordinates). Next, each of the lines connecting corresponding 0 to 30th coordinates of the TL-TR line and the BR-BL line, is equally divided into 20 coordinates. Accordingly, the rectangular area is divided into 30×20, sub-areas. FIG. 22B shows an example case of the coordinate ($LO_{00,00}$, $LA_{00,00}$) of the upper left point TL.

Figure 18B:
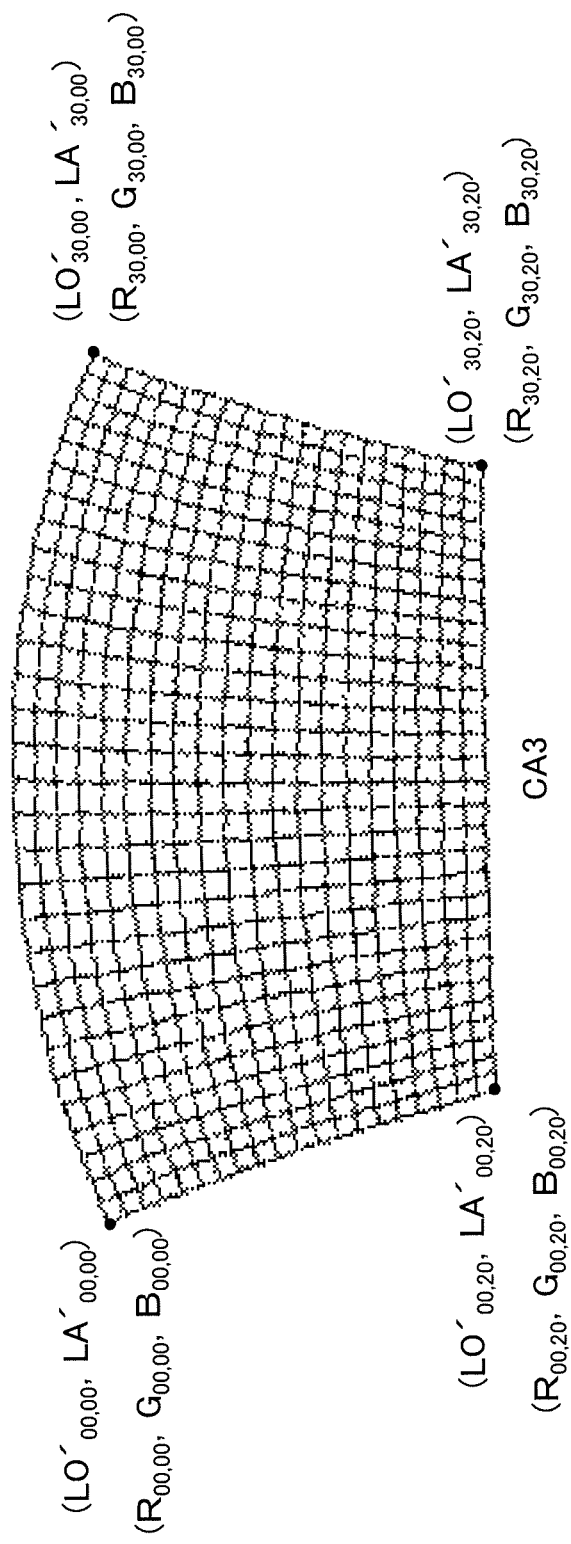
Figure 23:
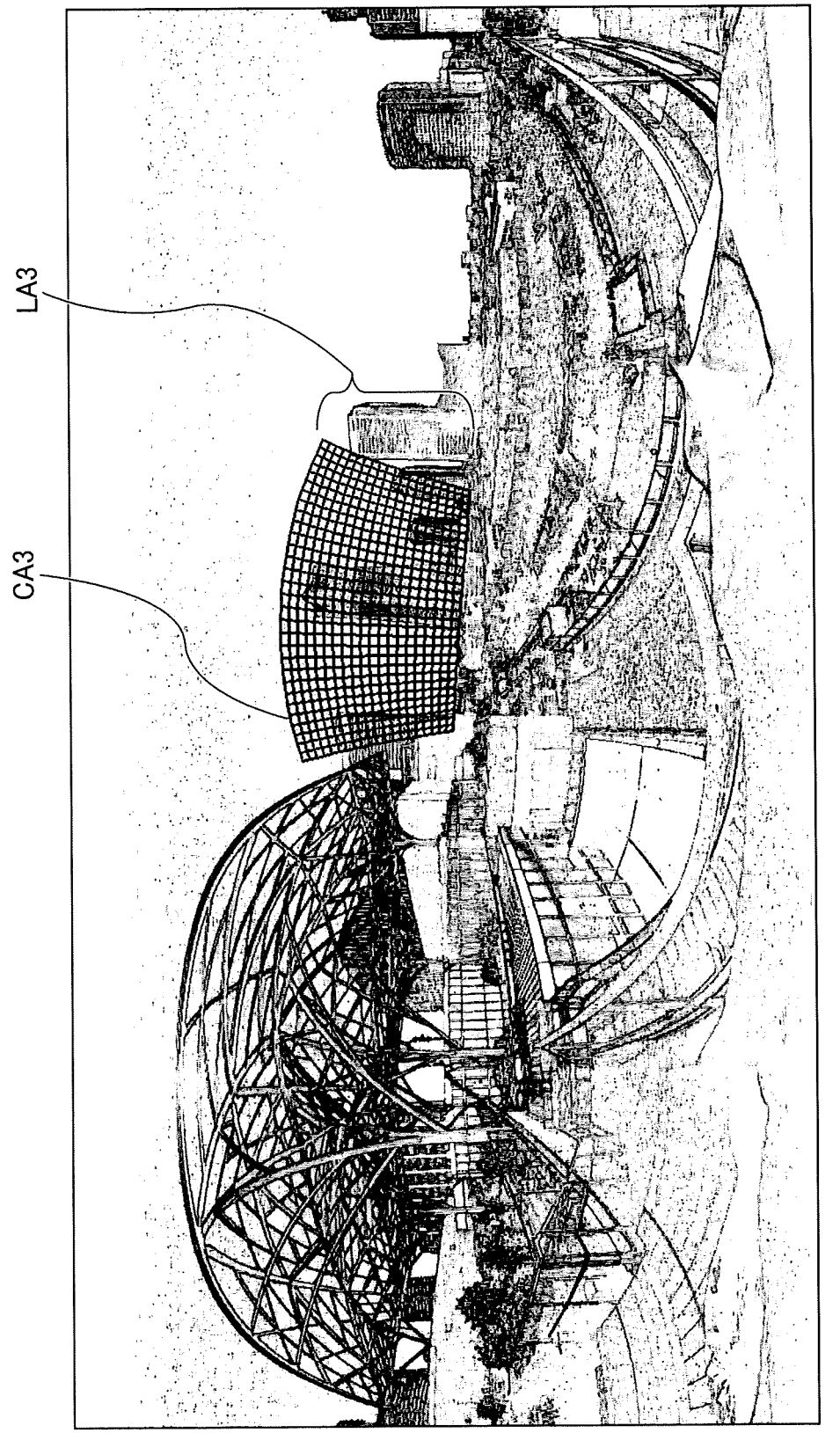
FIG. 23 is a conceptual diagram for explaining determination of the third area in the equirectangular projection image, according to the first embodiment.

Referring back to FIGS. 16 and 20, the projection reverse converter 562 reversely converts projection applied to the second area CA2, back to the equirectangular projection applied to the equirectangular projection image EC. With this projection transformation, the third area CA3 in the equirectangular projection image EC, which corresponds to the second area CA2, is determined. Specifically, the projection reverse converter 562 determines the third area CA3 in the equirectangular projection image EC, which contains a plurality of grid areas LA3 corresponding to the plurality of grid areas LA2 in the second area CA2. FIG. 23 illustrates an enlarged view of the third area CA3 illustrated in FIG. 20. FIG. 23 is a conceptual diagram for explaining determination of the third area CA3 in the equirectangular projection image EC. The planar image P is superimposed on the spherical image CE, which is generated from the equirectangular projection image EC, so as to fit in a portion defined by the third area CA3 by mapping. Through processing by the projection reverse converter 562, a location parameter is generated, which indicates the coordinate of each grid in each grid area LA3. The location parameter is illustrated in FIG. 17 and FIG. 18B. In this example, the gird may be referred to as a single point of a plurality of points.

As described above, the location parameter is generated, which is used to calculate the correspondence of each pixel between the equirectangular projection image EC and the planar image P.

Although the planar image P is superimposed on the equirectangular projection image EC at a right location with the location parameter, these image EC and image P may vary in brightness or color (such as tone), causing an unnatural look. The shape converter 564 and the correction parameter generator 566 are provided to avoid this unnatural look, even when these images that differ in brightness and color, are partly superimposed one above the other.

Figure 24A:
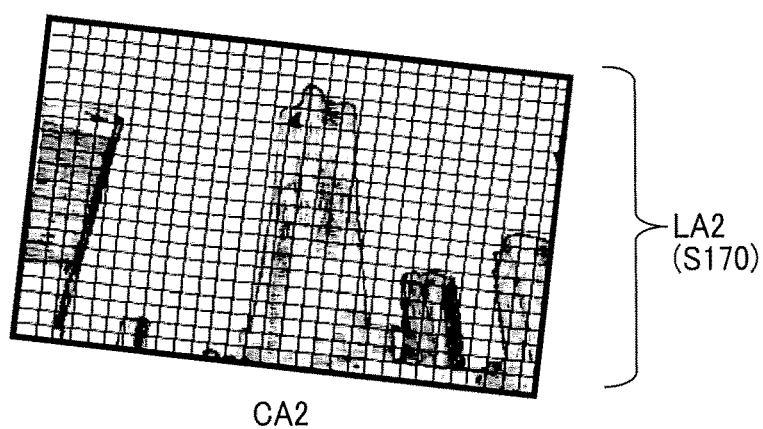
FIGS. 24A, 24B, and 24C are conceptual diagrams illustrating operation of generating a correction parameter, according to the first embodiment.

Before applying color correction, the shape converter 564 converts the second area CA2 to have a shape that is the same as the shape of the planar image P. To made the shape equal, the shape converter 564 maps four vertices of the second area CA2, on corresponding four vertices of the planar image P. More specifically, the shape of the second area CA2 is made equal to the shape of the planar image P, such that each grid area LA2 in the second area CA2 illustrated in FIG. 24A, is located at the same position of each grid area LA0 in the planar image P illustrated in FIG. 24C. That is, a shape of the second area CA2 illustrated in FIG. 24A is converted to a shape of the second area CA2' illustrated in FIG. 24B. As each grid area LA2 is converted to the corresponding grid area LA2', the grid area LA2' becomes equal in shape to the corresponding grid area LA0 in the planar image P.

The correction parameter generator 566 generates the correction parameter, which is to be applied to each grid area LA2' in the second area CA2', such that each grid area LA2' is equal to the corresponding grid area LA0 in the planar image P in brightness and color. Specifically, the correction parameter generator 566 specifies four grid areas LA0 that share one common grid, and calculates an average avg= ($R_{ave}$, $G_{ave}$, $B_{ave}$) of brightness and color values (R, G, B) of all pixels contained in the specified four grid areas LA0. Similarly, the correction parameter generator 566 specifies four grid areas LA2' that share one common grid, and calculates an average avg'=($R_{ave}$, $G_{ave}$, $B_{ave}$) of brightness and color values (R, G, B) of all pixels contained in the specified four grid areas LA2'. If one gird of the specified grid areas LA0 and the corresponding grid of the specific grid areas LA2' correspond to one of four vertices of the second area CA2 (or the third area CA3), the correction parameter generator 566 calculates the average avg and the average avg' of the brightness and color of pixels from one grid area located at the corner. If one grid of the specific grid areas LA0 and the corresponding grid of the specific grid areas LA2' correspond to a gird of the outline of the second area CA2 (or the third area CA3), the correction parameter generator 566 calculates the average avg and the average avg' of the brightness and color of pixels from two grid areas inside the outline. In this embodiment, the correction parameter is gain data for correcting the brightness and color of the planar image P. Accordingly, the correction parameter Pa is obtained by dividing the avg' by the avg, as represented by the following equation 14.

$$Pa = \text{avg}'/\text{avg} \qquad \text{(Equation 14)}$$

In displaying images being superimposed, each grid area LA0 is multiplied with the gain, represented by the correction parameter. Accordingly, the brightness and color of the planar image P is made substantially equal to that of the equirectangular projection image EC (spherical image CE). This prevents unnatural look, even when the planar image P is superimposed on the equirectangular projection image EC. In addition to or in alternative to the average value, the correction parameter may be calculated using the median or the most frequent value of brightness and color of pixels in the grid areas.

In this embodiment, the values (R, G, B) are used to calculate the brightness and color of each pixel. Alternatively, any other color space may be used to obtain the brightness and color, such as brightness and color difference using YUV, and brightness and color difference using sYCC (YCbCr) according to the JPEG. The color space may be converted from RGB, to YUV, or to sYCC (YCbCr), using any desired known method. For example, RGB, in compliance with JPEG file interchange format (JFIF), may be converted to YCbCr, using Equation 15.

$$\begin{pmatrix} Y \\ Cb \\ Cr \end{pmatrix} = \begin{pmatrix} 0.299 & 0.587 & 0.114 \\ -0.1687 & -0.3313 & 0.5 \\ 0.5 & -0.4187 & -0.0813 \end{pmatrix} \begin{pmatrix} R \\ G \\ B \end{pmatrix} + \begin{pmatrix} 0 \\ 128 \\ 128 \end{pmatrix} \qquad \text{(Equation 15)}$$

The superimposed display metadata generator 570 generates superimposed display metadata indicating a location where the planar image P is superimposed on the spherical image CE, and correction values for correcting brightness and color of pixels, using such as the location parameter and the correction parameter.

(Superimposed Display Metadata)

Referring to FIG. 17, a data structure of the superimposed display metadata is described according to the embodiment. FIG. 17 illustrates a data structure of the superimposed display metadata according to the embodiment.

As illustrated in FIG. 17, the superimposed display metadata includes equirectangular projection image information, planar image information, superimposed display information, and metadata generation information.

The equirectangular projection image information is transmitted from the special image capturing device 1, with the captured image data. The equirectangular projection image information includes an image identifier (image ID) and attribute data of the captured image data. The image identifier, included in the equirectangular projection image information, is used to identify the equirectangular projection image. While FIG. 17 uses an image file name as an example of image identifier, an image ID for uniquely identifying the image may be used instead.

The attribute data, included in the equirectangular projection image information, is any information related to the equirectangular projection image. In the case of metadata of FIG. 17, the attribute data includes positioning correction data (Pitch, Yaw, Roll) of the equirectangular projection image, which is obtained by the special image capturing device 1 in capturing the image. The positioning correction data is stored in compliance with a standard image recording format, such as Exchangeable image file format (Exif). Alternatively, the positioning correction data may be stored in any desired format defined by Google Photo Sphere schema (GPano). As long as an image is taken at the same place, the special image capturing device 1 captures the image in 360 degrees with any positioning. However, in displaying such spherical image CE, the positioning information and the center of image (point of gaze) should be specified. Generally, the spherical image CE is corrected for display, such that its zenith is right above the user capturing the image. With this correction, a horizontal line is displayed as a straight line, thus the displayed image have more natural look.

The planar image information is transmitted from the generic image capturing device 3 with the captured image data. The planar image information includes an image identifier (image ID) and attribute data of the captured image data. The image identifier, included in the planar image information, is used to identify the planar image P. While FIG. 17 uses an image file name as an example of image identifier, an image ID for uniquely identifying the image may be used instead.

The attribute data, included in the planar image information, is any information related to the planar image P. In the case of metadata of FIG. 17, the planar image information includes, as attribute data, a value of 35 mm equivalent focal length. The value of 35 mm equivalent focal length is not necessary to display the image on which the planar image P is superimposed on the spherical image CE. However, the value of 35 mm equivalent focal length may be referred to determine an angle of view when displaying superimposed images.

The superimposed display information is generated by the smart phone 5. In this example, the superimposed display information includes area division number information, a coordinate of a grid in each grid area (location parameter), and correction values for brightness and color (correction parameter). The area division number information indicates a number of divisions of the first area CA1, both in the horizontal (longitude) direction and the vertical (latitude) direction. The area division number information is referred to when dividing the first area CA1 into a plurality of grid areas.

The location parameter is mapping information, which indicates, for each grid in each grid area of the planar image P, a location in the equirectangular projection image EC. For example, the location parameter associates a location of each grid in each grid area in the equirectangular projection image EC, with each grid in each grid area in the planar image P. The correction parameter, in this example, is gain data for correcting color values of the planar image P. Since the target to be corrected may be a monochrome image, the correction parameter may be used only to correct the brightness value. Accordingly, at least the brightness of the image is to be corrected using the correction parameter.

The perspective projection, which is used for capturing the planar image P, is not applicable to capturing the 360-degree omnidirectional image, such as the spherical image CE. The wide-angle image, such as the spherical image, is often captured in equirectangular projection. In equirectangular projection, like Mercator projection, the distance between lines in the horizontal direction increases away from the standard parallel. This results in generation of the image, which looks very different from the image taken with the general-purpose camera in perspective projection. If the planar image P, superimposed on the spherical image CE, is displayed, the planar image P and the spherical image CE that differ in projection, look different from each other. Even scaling is made equal between these images, the planar image P does not fit in the spherical image CE. In view of the above, the location parameter is generated as described above referring to FIG. 20.

Referring to FIGS. 18A and 18B, the location parameter and the correction parameter are described in detail, according to the embodiment. FIG. 18A is a conceptual diagram illustrating a plurality of grid areas in the second area CA2, according to the embodiment. FIG. 18B is a conceptual diagram illustrating a plurality of grid areas in the third area CA3, according to the embodiment.

As described above, the first area CA1, which is a part of the equirectangular projection image EC, is converted to the second area CA2 in perspective projection, which is the same projection with the projection of the planar image P. As illustrated in FIG. 18A, the second area CA2 is divided into 30 grid areas in the horizontal direction, and 20 grid areas in the vertical direction, resulting in 600 grid areas in total. Still referring to FIG. 18A, the coordinate of each grid in each grid area can be expressed by $(LO_{00,00}, LA_{00,00})$, $(LO_{01,00}, LA_{01,00})$, ..., $(LO_{30,20}, LA_{30,20})$. The correction value of brightness and color of each grid in each grid area can be expressed by $(R_{00,00}, G_{00,00}, B_{00,00})$, $(R_{01,00}, G_{01,00}, B_{01,00})$, ..., $(R_{30,20}, G_{30,20}, B_{30,20})$. For simplicity, in FIG. 18A, only four vertices (grids) are each shown with the coordinate value, and the correction value for brightness and color. However, the coordinate value and the correction value for brightness and color, are assigned to each of all girds. The correction values R, G, B for brightness and color, corresponds to correction gains for red, green, and blue, respectively. In this example, the correction values R, G, B for brightness and color, are generated for a predetermined area centering on a specific grid. The specific grid is selected, such that the predetermined area of such grid does not overlap with a predetermined area of an adjacent specific gird.

As illustrated in FIG. 18B, the second area CA2 is reverse converted to the third area CA3 in equirectangular projection, which is the same projection with the projection of the equirectangular projection image EC. In this embodiment, the third area CA3 is equally divided into 30 grid areas in the horizontal direction, and 20 grid areas in the vertical direction, resulting in 600 grid areas in total. Referring to FIG. 18B, the coordinate of each grid in each area can be expressed by $(LO'_{00,00}, LA'_{00,00}), (LO'_{01,00}, LA'_{01,00}), \ldots, (LO'_{30,20}, LA'_{30,20})$. The correction values of brightness and color of each grid in each grid area are the same as the correction values of brightness and color of each grid in each grid area in the second area CA2. For simplicity, in FIG. 18B, only four vertices (grids) are each shown with the coordinate value, and the correction value for brightness and color. However, the coordinate value and the correction value for brightness and color, are assigned to each of all girds.

Referring back to FIG. 17, the metadata generation information includes version information indicating a version of the superimposed display metadata.

As described above, the location parameter indicates correspondence of pixel positions, between the planar image P and the equirectangular projection image EC (spherical image CE). If such correspondence information is to be provided for all pixels, data for about 40 million pixels is needed in case the generic image capturing device 3 is a high-resolution digital camera. This increases processing load due to the increased data size of the location parameter. In view of this, in this embodiment, the planar image P is divided into 600 (30×20) grid areas. The location parameter indicates correspondence of each gird in each of 600 grid areas, between the planar image P and the equirectangular projection image EC (spherical image CE). When displaying the superimposed images by the smart phone 5, the smart phone 5 may interpolate the pixels in each grid area based on the coordinate of each grid in that grid area.

(Functional Configuration of Superimposing Unit)

Referring to FIG. 16, a functional configuration of the superimposing unit 55b is described according to the embodiment. The superimposing unit 55b includes a superimposed area generator 582, a correction unit 584, an image generator 586, an image superimposing unit 588, and a projection converter 590.

The superimposed area generator 582 specifies a part of the sphere CS, which corresponds to the third area CA3, to generate a partial sphere PS.

The correction unit 584 corrects the brightness and color of the planar image P, using the correction parameter of the superimposed display metadata, to match the brightness and color of the equirectangular projection image EC. The correction unit 584 may not always perform correction on brightness and color. In one example, the correction unit 584 may only correct the brightness of the planar image P using the correction parameter.

The image generator 586 superimposes (maps) the planar image P (or the corrected image C of the planar image P), on the partial sphere PS to generate an image to be superimposed on the spherical image CE, which is referred to as a superimposed image S for simplicity. The image generator 586 generates mask data M, based on a surface area of the partial sphere PS. The image generator 586 covers (attaches) the equirectangular projection image EC, over the sphere CS, to generate the spherical image CE.

The mask data M, having information indicating the degree of transparency, is referred to when superimposing the superimposed image S on the spherical image CE. The mask data M sets the degree of transparency for each pixel, or a set of pixels, such that the degree of transparency increases from the center of the superimposed image S toward the boundary of the superimposed image S with the spherical image CE. With this mask data M, the pixels around the center of the superimposed image S have brightness and color of the superimposed image S, and the pixels near the boundary between the superimposed image S and the spherical image CE have brightness and color of the spherical image CE. Accordingly, superimposition of the superimposed image S on the spherical image CE is made unnoticeable. However, application of the mask data M can be made optional, such that the mask data M does not have to be generated.

The image superimposing unit 588 superimposes the superimposed image S and the mask data M, on the spherical image CE. The image is generated, in which the high-definition superimposed image S is superimposed on the low-definition spherical image CE.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T. In projection transformation, the projection converter 590 converts a resolution of the predetermined area T, to match with a resolution of a display area of the display 517. Specifically, when the resolution of the predetermined area T is less than the resolution of the display area of the display 517, the projection converter 590 enlarges a size of the predetermined area T to match the display area of the display 517. In contrary, when the resolution of the predetermined area T is greater than the resolution of the display area of the display 517, the projection converter 590 reduces a size of the predetermined area T to match the display area of the display 517. Accordingly, the display control 56 displays the predetermined-area image Q, that is, the image of the predetermined area T, in the entire display area of the display 517.

Referring now to FIGS. 19 to 30, operation of capturing the image and displaying the image, performed by the image capturing system, is described according to the embodiment. First, referring to FIG. 19, operation of capturing the image, performed by the image capturing system, is described according to the embodiment. FIG. 19 is a data sequence diagram illustrating operation of capturing the image, according to the embodiment. The following describes the example case in which the object and surroundings of the object are captured. However, in addition to capturing the object, audio may be recorded by the audio collection unit 14 as the captured image is being generated.

As illustrated in FIG. 19, the acceptance unit 52 of the smart phone 5 accepts a user instruction to start linked image capturing (S11). In response to the user instruction to start linked image capturing, the display control 56 controls the display 517 to display a linked image capturing device configuration screen as illustrated in FIG. 15B. The screen of FIG. 15B includes, for each image capturing device available for use, a radio button to be selected when the image capturing device is selected as a main device, and a check box to be selected when the image capturing device is selected as a sub device. The screen of FIG. 15B further displays, for each image capturing device available for use, a device name and a received signal intensity level of the image capturing device. Assuming that the user selects one image capturing device as a main device, and other image capturing device as a sub device, and presses the "Confirm" key, the acceptance unit 52 of the smart phone 5 accepts the instruction for starting linked image capturing. In this example, more than one image capturing device may be selected as the sub device. For this reasons, more than one check boxes may be selected.

The near-distance communication unit 58 of the smart phone 5 sends a polling inquiry to start image capturing, to the near-distance communication unit 38 of the generic image capturing device 3 (S12). The near-distance communication unit 38 of the generic image capturing device 3 receives the inquiry to start image capturing.

The determiner 37 of the generic image capturing device 3 determines whether image capturing has started, according to whether the acceptance unit 32 has accepted pressing of the shutter button 315*a* by the user (S13).

The near-distance communication unit 38 of the generic image capturing device 3 transmits a response based on a result of the determination at S13, to the smart phone 5 (S14). When it is determined that image capturing has started at S13, the response indicates that image capturing has started. In such case, the response includes an image identifier of the image being captured with the generic image capturing device 3. In contrary, when it is determined that the image capturing has not started at S13, the response indicates that it is waiting to start image capturing. The near-distance communication unit 58 of the smart phone 5 receives the response.

The description continues, assuming that the determination indicates that image capturing has started at S13 and the response indicating that image capturing has started is transmitted at S14.

The generic image capturing device 3 starts capturing the image (S15). The processing of S15, which is performed after pressing of the shutter button 315*a*, includes capturing the object and surroundings to generate captured image data (planar image data) with the image capturing unit 33, and storing the captured image data in the memory 3000 with the storing and reading unit 39.

At the smart phone 5, the near-distance communication unit 58 transmits an image capturing start request, which requests to start image capturing, to the special image capturing device 1 (S16). The near-distance communication unit 18 of the special image capturing device 1 receives the image capturing start request. Here, the smart phone 5 operates as the linking device, which causes the generic image capturing device 3 and the special image capturing device 1 to cooperate with each other to perform linked image capturing.

The special image capturing device 1 starts capturing the image (S17). Specifically, at S17, the image capturing unit 13 captures the object and surroundings to generate captured image data, i.e., two hemispherical images as illustrated in FIGS. 3A and 3B. The image and audio processing unit 15 then generates one equirectangular projection image as illustrated in FIG. 3C, based on these two hemispherical images. The storing and reading unit 19 stores data of the equirectangular projection image in the memory 1000.

At the smart phone 5, the near-distance communication unit 58 transmits a request to transmit a captured image ("captured image request") to the generic image capturing device 3 (S18). The captured image request includes the image identifier received at S14. The near-distance communication unit 38 of the generic image capturing device 3 receives the captured image request.

The near-distance communication unit 38 of the generic image capturing device 3 transmits planar image data, obtained at S15, to the smart phone 5 (S19). With the planar image data, the image identifier for identifying the planar image data, and attribute data, are transmitted. The image identifier and attribute data of the planar image, are a part of planar image information illustrated in FIG. 17. The near-distance communication unit 58 of the smart phone 5 receives the planar image data, the image identifier, and the attribute data.

The near-distance communication unit 18 of the special image capturing device 1 transmits the equirectangular projection image data, obtained at S17, to the smart phone 5 (S20). With the equirectangular projection image data, the image identifier for identifying the equirectangular projection image data, and attribute data, are transmitted. As illustrated in FIG. 17, the image identifier and the attribute data are a part of the equirectangular projection image information. The near-distance communication unit 58 of the smart phone 5 receives the equirectangular projection image data, the image identifier, and the attribute data.

Next, the storing and reading unit 59 of the smart phone 5 stores the planar image data received at S19, and the equirectangular projection image data received at S20, in the same folder in the memory 5000 (S21).

Next, the image and audio processing unit 55 of the smart phone 5 generates superimposed display metadata, which is used to display an image where the planar image P is partly superimposed on the spherical image CE (S22). The storing and reading unit 59 further stores the superimposed display metadata in the same folder, which is created or used in the memory 5000 for the planar image data and the equirectangular projection image data at S21. Accordingly, the planar image data received at S19, the equirectangular projection image data received at S20, and the superimposed display metadata generated at the superimposed display metadata generator 570, are managed using the same folder.

Referring to FIGS. 20 to 24, operation of generating superimposed display metadata is described in detail, according to the embodiment. Even when the generic image capturing device 3 and the special image capturing device 1 are equal in resolution of imaging element, the imaging element of the special image capturing device 1 captures a wide area to obtain the equirectangular projection image, from which the 360-degree spherical image CE is generated. Accordingly, the image data captured with the special image capturing device 1 tends to be low in definition per unit area.

<Generation of Superimposed Display Metadata>

First, operation of generating the superimposed display metadata is described. The superimposed display metadata is used to display an image on the display 517, where the high-definition planar image P is superimposed on the spherical image CE. The spherical image CE is generated from the low-definition equirectangular projection image EC. As illustrated in FIG. 17, the superimposed display metadata includes the location parameter and the correction parameter, each of which is generated as described below.

Referring to FIG. 20, the extractor 550 extracts a plurality of feature points fp1 from the rectangular, equirectangular projection image EC captured in equirectangular projection (S110). The extractor 550 further extracts a plurality of feature points fp2 from the rectangular, planar image P captured in perspective projection (S110).

Next, the first area calculator 552 calculates a rectangular, first area CA1 in the equirectangular projection image EC, which corresponds to the planar image P, based on similarity between the feature value fv1 of the feature 8 points fp1 in the equirectangular projection image EC, and the feature value fv2 of the feature points fp2 in the planar image P, using the homography (S120). More specifically, the first area calculator 552 calculates a rectangular, first area CA1 in the equirectangular projection image EC, which corresponds to the planar image P, based on similarity between the feature value fv1 of the feature points fp1 in the equirectangular projection image EC, and the feature value fv2 of the feature points fp2 in the planar image P, using the homography (S120). The above-described processing is performed to roughly estimate corresponding pixel (gird) positions between the planar image P and the equirectangular projection image EC that differ in projection.

Next, the point of gaze specifier 554 specifies the point (referred to as the point of gaze) in the equirectangular projection image EC, which corresponds to the central point CP1 of the planar image P after the first homography transformation (S130).

The projection converter 556 extracts a peripheral area PA, which is a part surrounding the point of gaze GP1, from the equirectangular projection image EC. The projection converter 556 converts the peripheral area PA, from the equirectangular projection to the perspective projection, to generate a peripheral area image PI (S140).

The extractor 550 extracts a plurality of feature points fp3 from the peripheral area image PI, which is obtained by the projection converter 556 (S150).

Next, the second area calculator 558 calculates a rectangular, second area CA2 in the peripheral area image PI, which corresponds to the planar image P, based on similarity between the feature value fv2 of the feature points fp2 in the planar image P, and the feature value fv3 of the feature points fp3 in the peripheral area image PI using second homography (S160) In this example, the planar image P, which is a high-definition image of 40 million pixels, may be reduced in size.

Next, the area divider 560 divides the second area CA2 into a plurality of grid areas LA2 as illustrated in FIG. 22B (S170).

As illustrated in FIG. 20, the projection reverse converter 562 converts (reverse converts) the second area CA2 from the perspective projection to the equirectangular projection, which is the same as the projection of the equirectangular projection image EC (S180). As illustrated in FIG. 23, the projection reverse converter 562 determines the third area CA3 in the equirectangular projection image EC, which contains a plurality of grid areas LA3 corresponding to the plurality of grid areas LA2 in the second area CA2. FIG. 23 is a conceptual diagram for explaining determination of the third area CA3 in the equirectangular projection image EC. Through processing by the projection reverse converter 562, a location parameter is generated, which indicates the coordinate of each grid in each grid area LA3. The location parameter is illustrated in FIG. 17 and FIG. 18B.

Figure 24B:
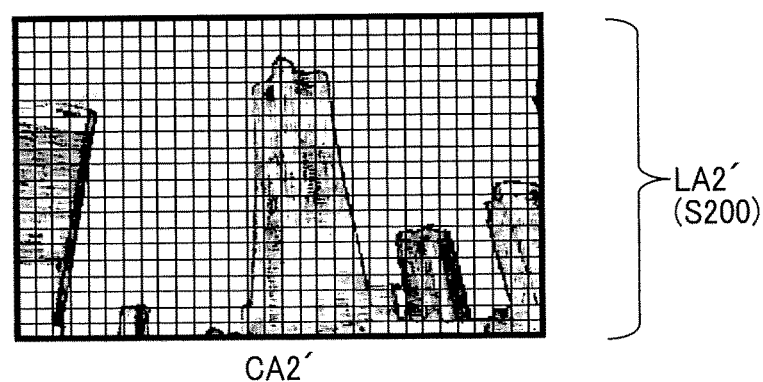
Figure 24C:
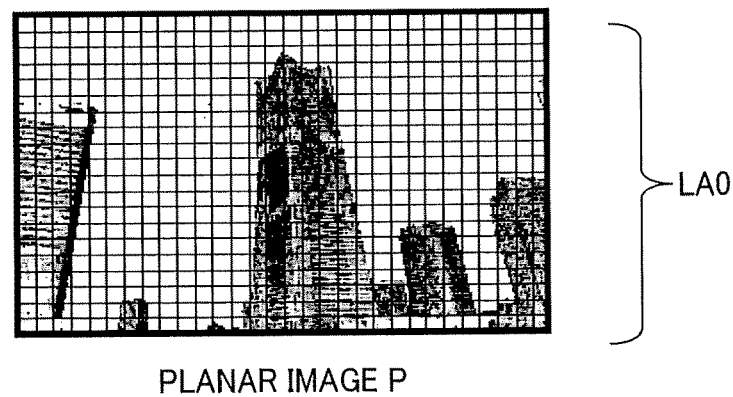

Referring to FIGS. 20 to 24C, operation of generating the correction parameter is described according to the embodiment. FIGS. 24A to 24C are conceptual diagrams illustrating operation of generating the correction parameter, according to the embodiment.

After S180, the shape converter 564 converts the second area CA2 to have a shape that is the same as the shape of the planar image P. Specifically, the shape converter 564 maps four vertices of the second area CA2, illustrated in FIG. 24A, on corresponding four vertices of the planar image P, to obtain the second area CA2 as illustrated in FIG. 24B.

As illustrated in FIG. 24C, the area divider 560 divides the planar image P into a plurality of grid areas LA0, which are equal in shape and number to the plurality of grid areas LA2' of the second area CA2' (S200).

The correction parameter generator 566 generates the correction parameter, which is to be applied to each grid area LA2' in the second area CA2', such that each grid area LA2' is equal to the corresponding grid area LA0 in the planar image P in brightness and color (S210).

As illustrated in FIG. 17, the superimposed display metadata generator 570 generates the superimposed display metadata, using the equirectangular projection image information obtained from the special image capturing device 1, the planar image information obtained from the generic image capturing device 3, the area division number information previously set, the location parameter generated by the projection reverse converter 562, the correction parameter generated by the correction parameter generator 566, and the metadata generation information (S220). The superimposed display metadata is stored in the memory 5000 by the storing and reading unit 59.

Then, the operation of generating the superimposed display metadata performed at S22 of FIG. 19 ends. The display control 56, which cooperates with the storing and reading unit 59, superimposes the images, using the superimposed display metadata (S23).

<Superimposition>

Figure 25:
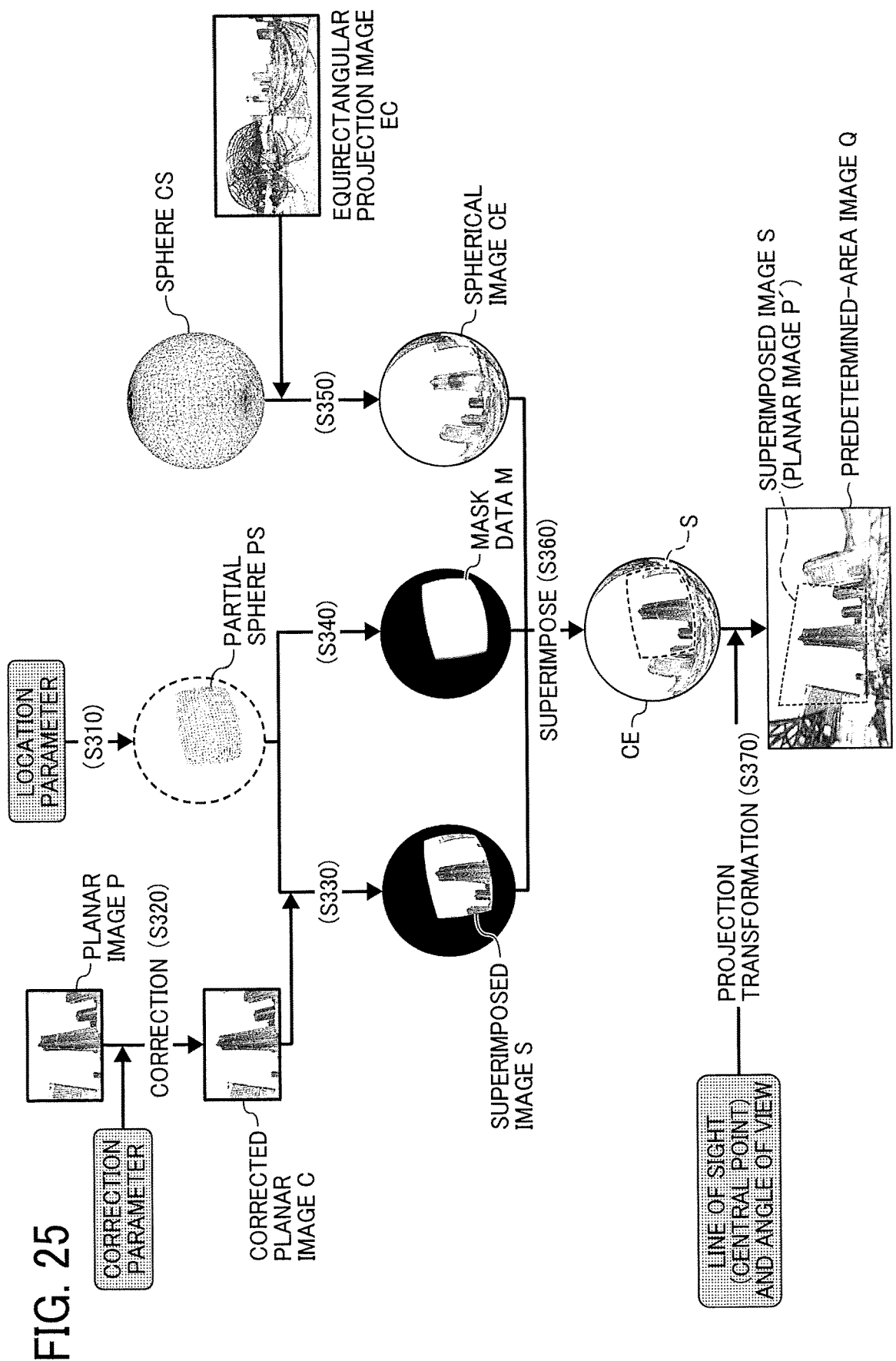
FIG. 25 is a conceptual diagram illustrating operation of superimposing images, with images being processed or generated, according to the first embodiment.

Referring to FIGS. 25 to 30D, operation of superimposing images is described according to the embodiment. FIG. 25 is a conceptual diagram illustrating operation of superimposing images, with images being processed or generated, according to the embodiment.

The storing and reading unit 59 (obtainer) illustrated in FIG. 14 reads from the memory 5000, data of the equirectangular projection image EC in equirectangular projection, data of the planar image P in perspective projection, and the superimposed display metadata.

As illustrated in FIG. 25, using the location parameter, the superimposed area generator 582 specifies a part of the virtual sphere CS, which corresponds to the third area CA3, to generate a partial sphere PS (S310). The pixels other than the pixels corresponding to the grids having the positions defined by the location parameter are interpolated by linear interpolation.

The correction unit 584 corrects the brightness and color of the planar image P, using the correction parameter of the superimposed display metadata, to match the brightness and color of the equirectangular projection image EC (S320). The planar image P, which has been corrected, is referred to as the "corrected planar image C".

The image generator 586 superimposes the corrected planar image C of the planar image P, on the partial sphere PS to generate the superimposed image S (S330). The pixels other than the pixels corresponding to the grids having the positions defined by the location parameter are interpolated by linear interpolation. The image generator 586 generates mask data M based on the partial sphere PS (S340). The image generator 586 covers (attaches) the equirectangular projection image EC, over a surface of the sphere CS, to generate the spherical image CE (S350). The image superimposing unit 588 superimposes the superimposed image S and the mask data M, on the spherical image CE (S360). The image is generated, in which the high-definition superimposed image S is superimposed on the low-definition spherical image CE. With the mask data, the boundary between the two different images is made unnoticeable.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T (S370). The projection converter 590 may further change a size of the predetermined area T according to the resolution of the display area of the display 517. Accordingly, the display control 56 displays the predetermined-area image Q, that is, the image of the predetermined area T, in the entire display area of the display 517 (S24). In this example, the predetermined-area image Q includes the superimposed image S superimposed with the planar image P.

Figure 26:
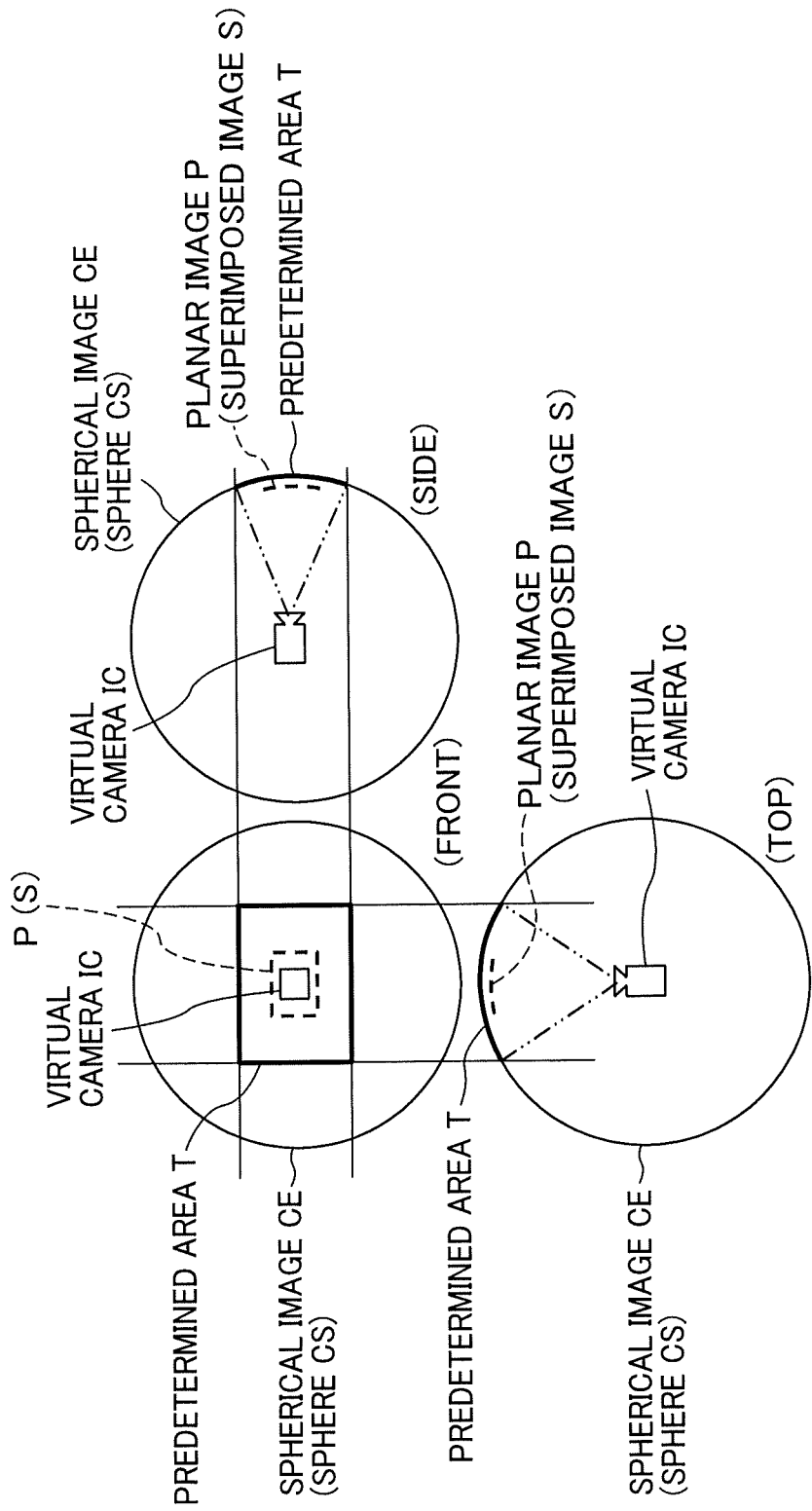
FIG. 26 is a conceptual diagram illustrating a two-dimensional view of the spherical image superimposed with the planar image, according to the first embodiment.

Referring to FIGS. 26 to 30D, display of the superimposed image is described in detail, according to the embodiment. FIG. 26 is a conceptual diagram illustrating a two-dimensional view of the spherical image CE superimposed with the planar image P. The planar image P is superimposed on the spherical image CE illustrated in FIG. 5. As illustrated in FIG. 26, the high-definition superimposed image S is superimposed on the spherical image CE, which covers a surface of the sphere CS, to be within the inner side of the sphere CS, according to the location parameter.

Figure 27:
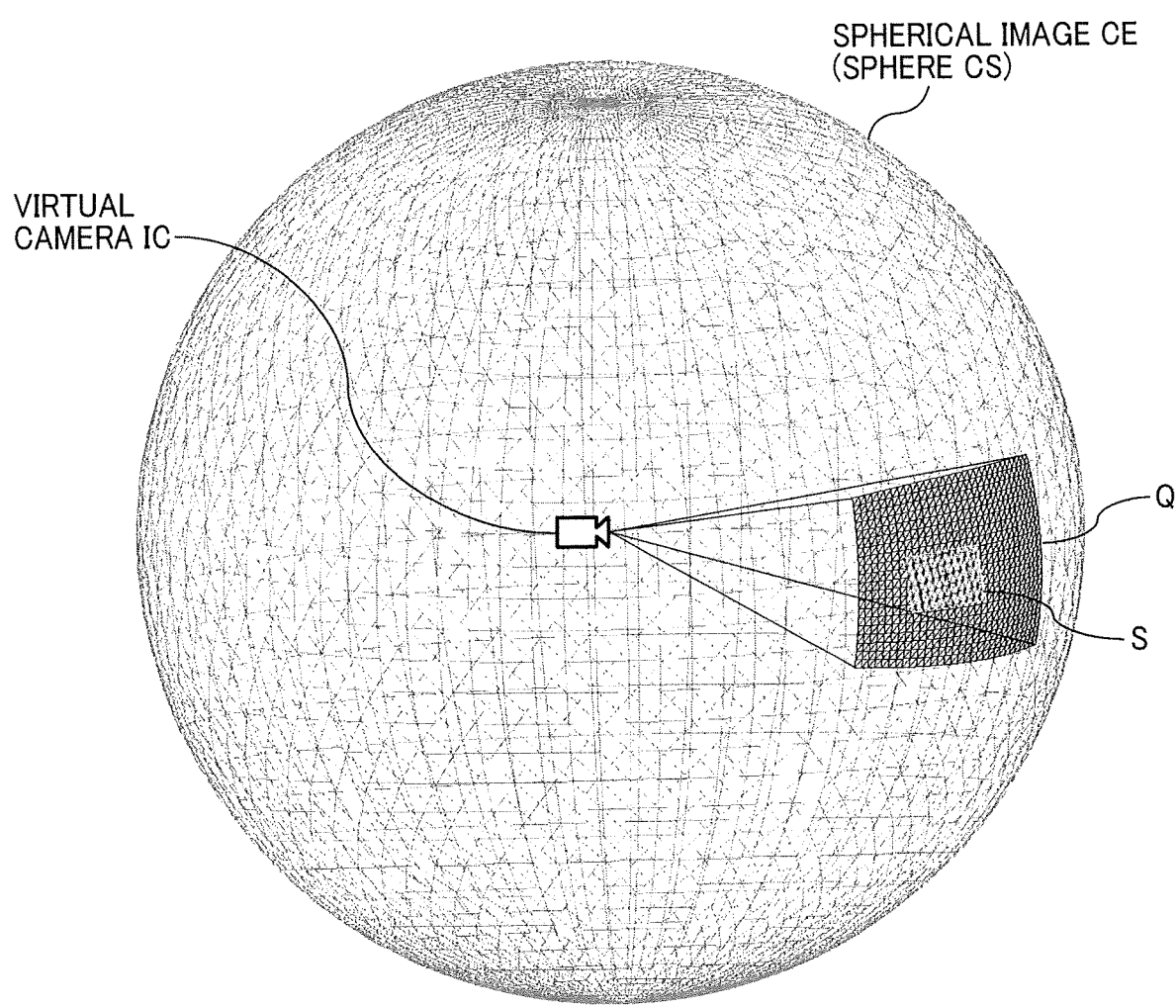
FIG. 27 is a conceptual diagram illustrating a three-dimensional view of the spherical image superimposed with the planar image, according to the first embodiment.

FIG. 27 is a conceptual diagram illustrating a three-dimensional view of the spherical image CE superimposed with the planar image P. FIG. 27 represents a state in which the spherical image CE and the superimposed image S cover a surface of the sphere CS, and the predetermined-area image Q includes the superimposed image S.

Figure 28A:
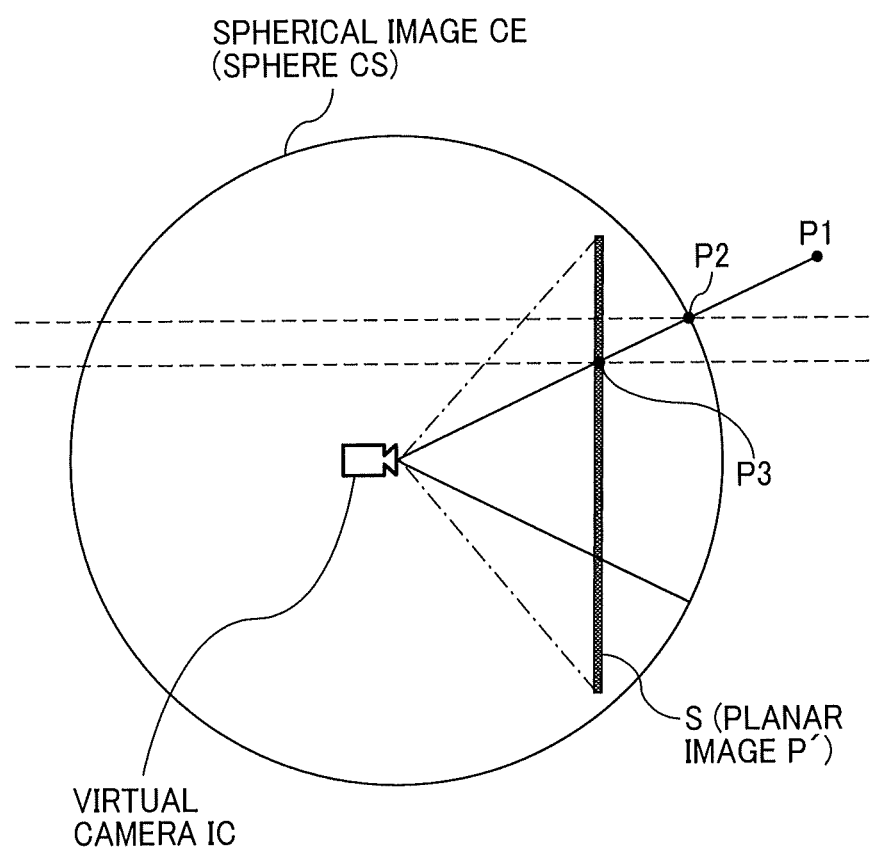
FIGS. 28A and 28B are conceptual diagrams illustrating a two-dimensional view of a spherical image superimposed with a planar image, without using the location parameter, according to a comparative example.
Figure 28B:
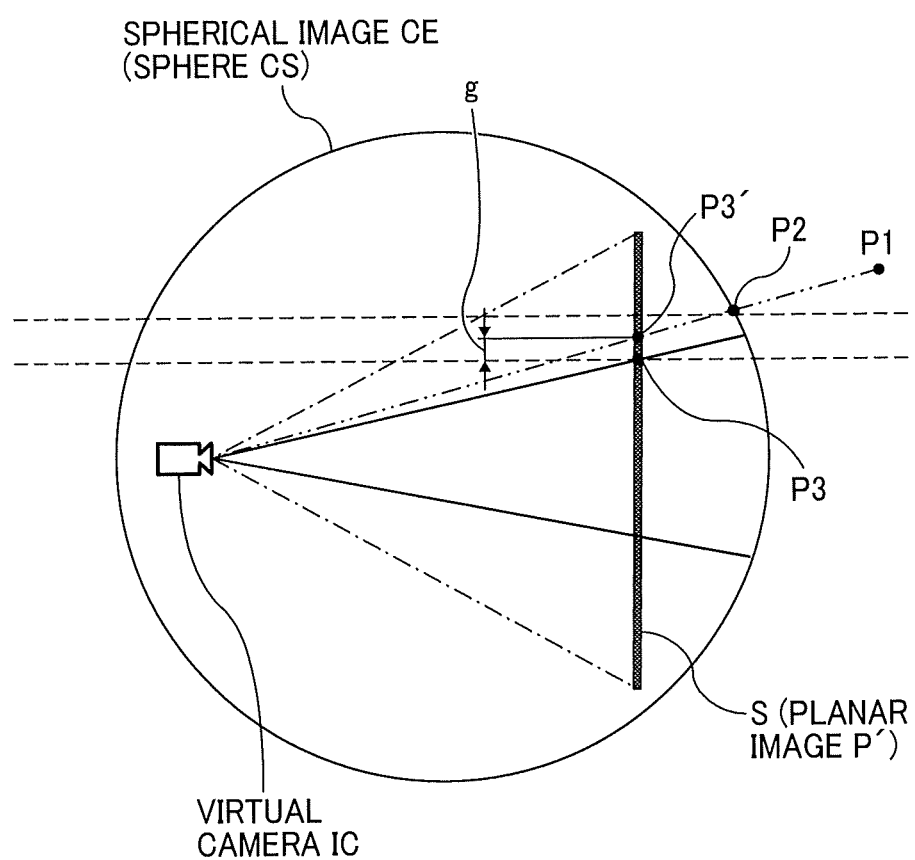
Figure 29A:
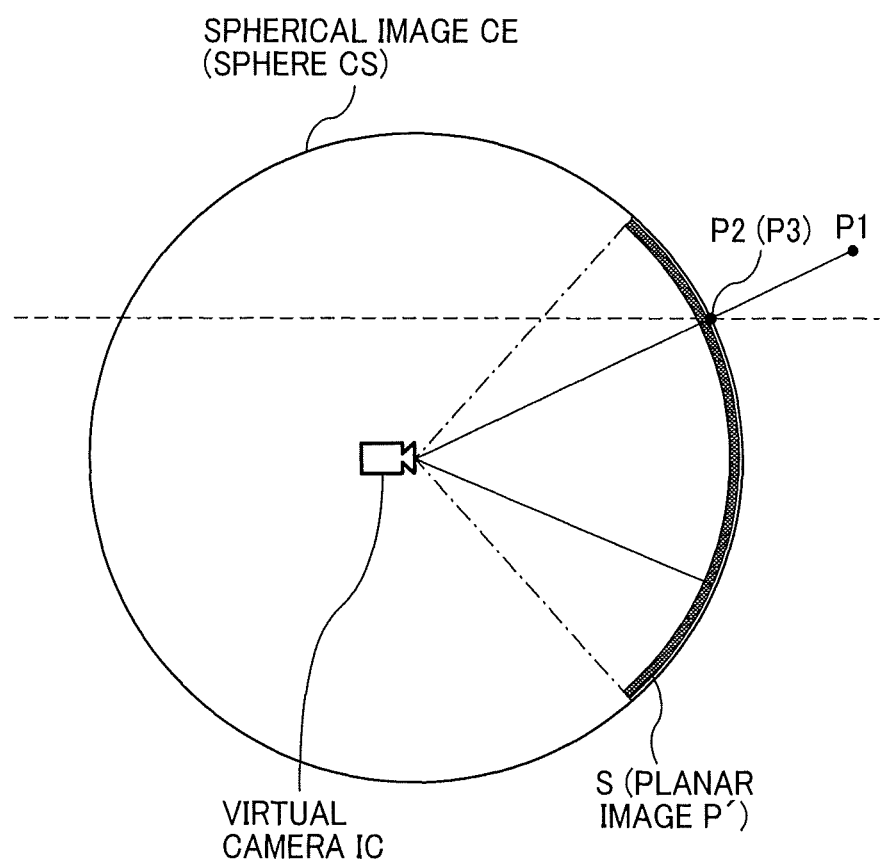
FIGS. 29A and 29B are conceptual diagrams illustrating a two-dimensional view of the spherical image superimposed with the planar image, using the location parameter, in the first embodiment.
Figure 29B:
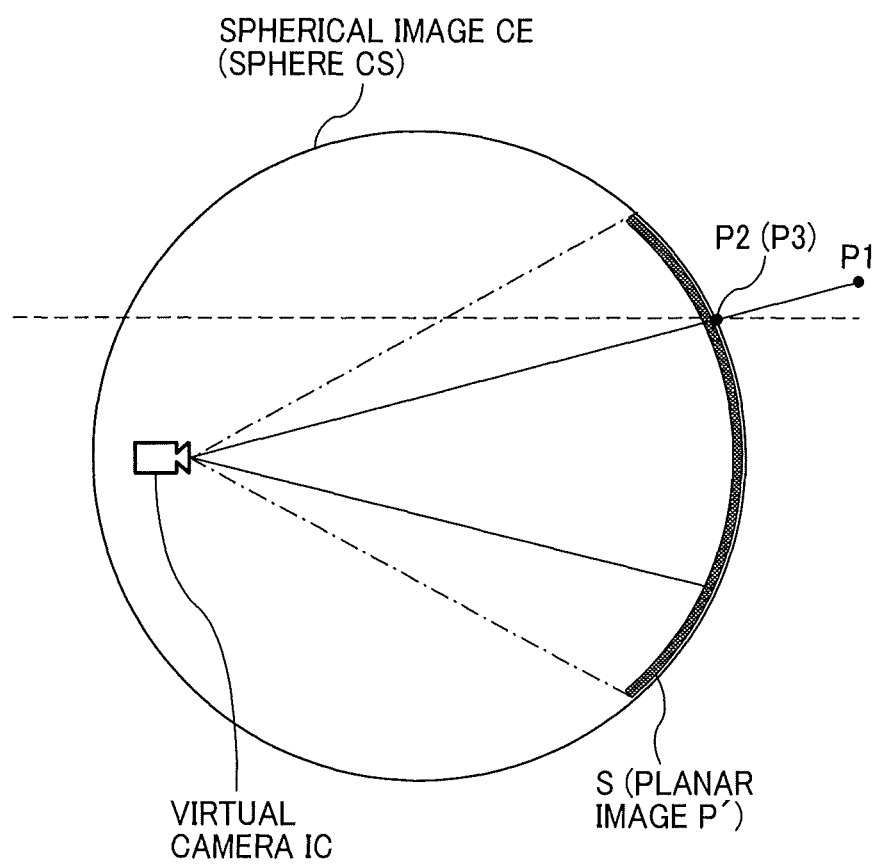

FIGS. 28A and 28B are conceptual diagrams illustrating a two-dimensional view of a spherical image superimposed with a planar image, without using the location parameter, according to a comparative example. FIGS. 29A and 29B are conceptual diagrams illustrating a two-dimensional view of the spherical image CE superimposed with the planar image P, using the location parameter, in this embodiment.

As illustrated in FIG. 28A, it is assumed that the virtual camera IC, which corresponds to the user's point of view, is located at the center of the sphere CS, which is a reference point. The object P1, as an image capturing target, is represented by the object P2 in the spherical image CE. The object P1 is represented by the object P3 in the superimposed image S. Still referring to FIG. 28A, the object P2 and the object P3 are positioned along a straight line connecting the virtual camera IC and the object P1. This indicates that, even when the superimposed image S is displayed as being superimposed on the spherical image CE, the coordinate of the spherical image CE and the coordinate of the superimposed image S match. As illustrated in FIG. 28B, if the virtual camera IC is moved away from the center of the sphere CS, the position of the object P2 stays on the straight line connecting the virtual camera IC and the object P1, but the position of the object P3 is slightly shifted to the position of an object P3'. The object P3' is an object in the superimposed image S, which is positioned along the straight line connecting the virtual camera IC and the object P1. This will cause a difference in grid positions between the spherical image CE and the superimposed image S, by an amount of shift "g" between the object P3 and the object P3'. Accordingly, in displaying the superimposed image S, the coordinate of the superimposed image S is shifted from the coordinate of the spherical image CE.

In view of the above, in this embodiment, the location parameter is generated, which indicates respective positions of a plurality of grid areas in the superimposed image S with respect to the planar image P. With this location parameter, as illustrated in FIGS. 29A and 29B, the superimposed image S is superimposed on the spherical image CE at right positions, while compensating the shift. More specifically, as illustrated in FIG. 29A, when the virtual camera IC is at the center of the sphere CS, the object P2 and the object P3 are positioned along the straight line connecting the virtual camera IC and the object P1. As illustrated in FIG. 29B, even when the virtual camera IC is moved away from the center of the sphere CS, the object P2 and the object P3 are positioned along the straight line connecting the virtual camera IC and the object P1. Even when the superimposed image S is displayed as being superimposed on the spherical image CE, the coordinate of the spherical image CE and the coordinate of the superimposed image S match.

Figure 30A:
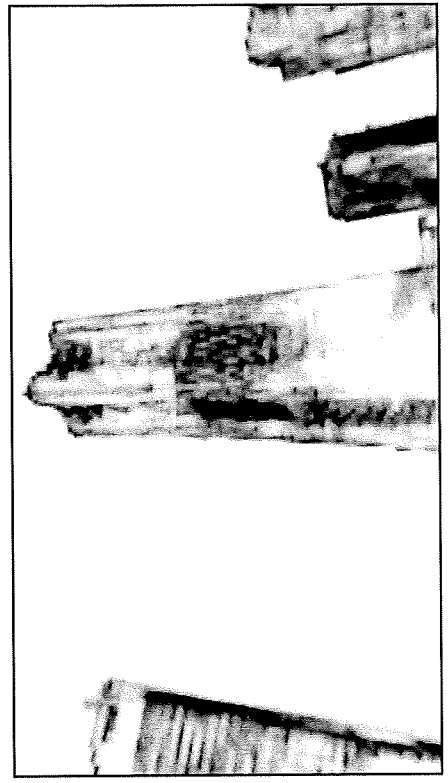
Figure 30B:
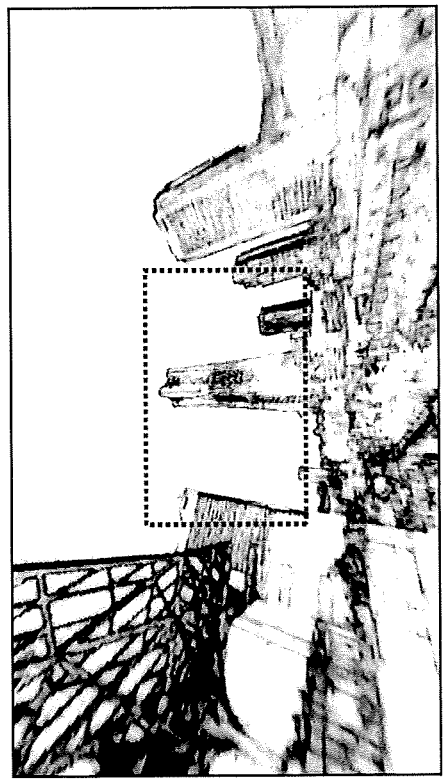

Accordingly, the image capturing system of this embodiment is able to display an image in which the high-definition planar image P is superimposed on the low-definition spherical image CE, with high image quality. This will be explained referring to FIGS. 30A to 30D. FIG. 30A illustrates the spherical image CE, when displayed as a wide-angle image. Here, the planar image P is not superimposed on the spherical image CE. FIG. 30B illustrates the spherical image CE, when displayed as a telephoto image. Here, the planar image P is not superimposed on the spherical image CE. FIG. 30C illustrates the spherical image CE, superimposed with the planar image P, when displayed as a wide-angle image. FIG. 30D illustrates the spherical image CE, superimposed with the planar image P, when displayed as a telephoto image. The dotted line in each of FIGS. 30A and 30C, which indicates the boundary of the planar image P, is shown for the descriptive purposes. Such dotted line may be displayed, or not displayed, on the display 517 to the user.

It is assumed that, while the spherical image CE without the planar image P being superimposed, is displayed as illustrated in FIG. 30A, a user instruction for enlarging an area indicated by the dotted area is received. In such case, as illustrated in FIG. 30B, the enlarged, low-definition image, which is a blurred image, is displayed to the user. As described above in this embodiment, it is assumed that, while the spherical image CE with the planar image P being superimposed, is displayed as illustrated in FIG. 30C, a user instruction for enlarging an area indicated by the dotted area is received. In such case, as illustrated in FIG. 30D, a high-definition image, which is a clear image, is displayed to the user. For example, assuming that the target object, which is shown within the dotted line, has a sign with some characters, even when the user enlarges that section, the user may not be able to read such characters if the image is blurred. If the high-definition planar image P is superimposed on that section, the high-quality image will be displayed to the user such that the user is able to read those characters.

As described above, the smart phone 5 operates as the linking device, which causes the generic image capturing device 3 and the special image capturing device 1 to cooperate with each other to perform linked image capturing. That is, when the smart phone 5 receives the response indicating that image capturing has started from the generic image capturing device 3 (See S14 of FIG. 19), the smart phone 5 transmits the image capturing start request to the special image capturing device 1 (See S16). With this operation, the planar image and the equirectangular projection image, which have been captured at substantially the same time, are obtained even they are captured with separate devices. This suppresses the images to be superimposed with each other, from being different in terms of the objects and surroundings of the objects that are captured.

Further, the smart phone 5 stores the planar image and the equirectangular projection image, respectively received from the generic image capturing device 3 and the special image capturing device 1, in the same folder (S21). With this operation, the planar image and the equirectangular projection image to be superimposed with each other are associated with each other. This prevents the images, which are not related, from wrongly associating as the images to be superimposed with each other. While these items of data to be superimposed with each other are stored in the same folder, as long as these images can be associated, those images do not have to be stored in the same folder.

Further, considering a time difference between pressing of the shutter button 315*a* and competing image capturing (S15) at the generic image capturing device 3, the generic image capturing device 3 transmits the response indicating start of capturing to the smart phone 5 right after detecting pressing of the shutter button 315*a* (S14). With this operation, the time at which the planar image is captured at the generic image capturing device 3, and the time at which the equirectangular projection image is captured at the special image capturing device 1 are made substantially equal.

Further, as described above referring to S13 of FIG. 19, the generic image capturing device 3 starts capturing the images both at the generic image capturing device 3 and the special image capturing device 1 (S15, S17), in response to pressing of the shutter button 315*a* by the user (S13). As opposed to the case when the smart phone 5 remotely instructs the generic image capturing device 3 to start capturing (that is, an instruction is accepted at the smart phone 5), the generic image capturing device 3 accepts the user instruction to start image capturing. With this configuration, as illustrated in FIG. 10, the user can easily focus the target object using the generic image capturing device 3.

Moreover, as described above in this embodiment, even when images that differ in projection are superimposed one above the other, the grid shift caused by the difference in projection can be compensated. For example, even when the planar image P in perspective projection is superimposed on the equirectangular projection image EC in equirectangular projection, these images are displayed with the same coordinate positions. More specifically, the special image capturing device 1 and the generic image capturing device 3 capture images using different projection methods. In such case, if the planar image P obtained by the generic image capturing device 3, is superimposed on the spherical image CE that is generated from the equirectangular projection image EC obtained by the special image capturing device, the planar image P does not fit in the spherical image CE as these images CE and P look different from each other. In view of this, as illustrated in FIG. 20, the smart phone 5 according to this embodiment determines the first area CA1 in the equirectangular projection image EC, which corresponds to the planar image P, to roughly determine the area where the planar image P is superimposed (S120). The smart phone 5 extracts a peripheral area PA, which is a part surrounding the point of gaze GP1 in the first area CA1, from the equirectangular projection image EC. The smart phone 5 further converts the peripheral area PA, from the equirectangular projection, to the perspective projection that is the projection of the planar image P, to generate a peripheral area image PI (S140). The smart phone 5 determines the second area CA2, which corresponds to the planar image P, in the peripheral area image PI (S160), and reversely converts the projection applied to the second area CA2, back to the equirectangular projection applied to the equirectangular projection image EC. With this projection transformation, the third area CA3 in the equirectangular projection image EC, which corresponds to the second area CA2, is determined (S180). As illustrated in FIG. 30C, the high-definition planar image P is superimposed on a part of the predetermined-area image on the low-definition, spherical image CE. The planar image P fits in the spherical image CE, when displayed to the user.

Further, in this embodiment, the location parameter indicates positions where the superimposed image S is superimposed on the spherical image CE, using the third area CA3 including a plurality of grid areas. Accordingly, as illustrated in FIG. 29B, the superimposed image S is superimposed on the spherical image CE at right positions. This compensates the shift in grid due to the difference in projection, even when the position of the virtual camera IC changes.

<First Modification>

Figure 31:
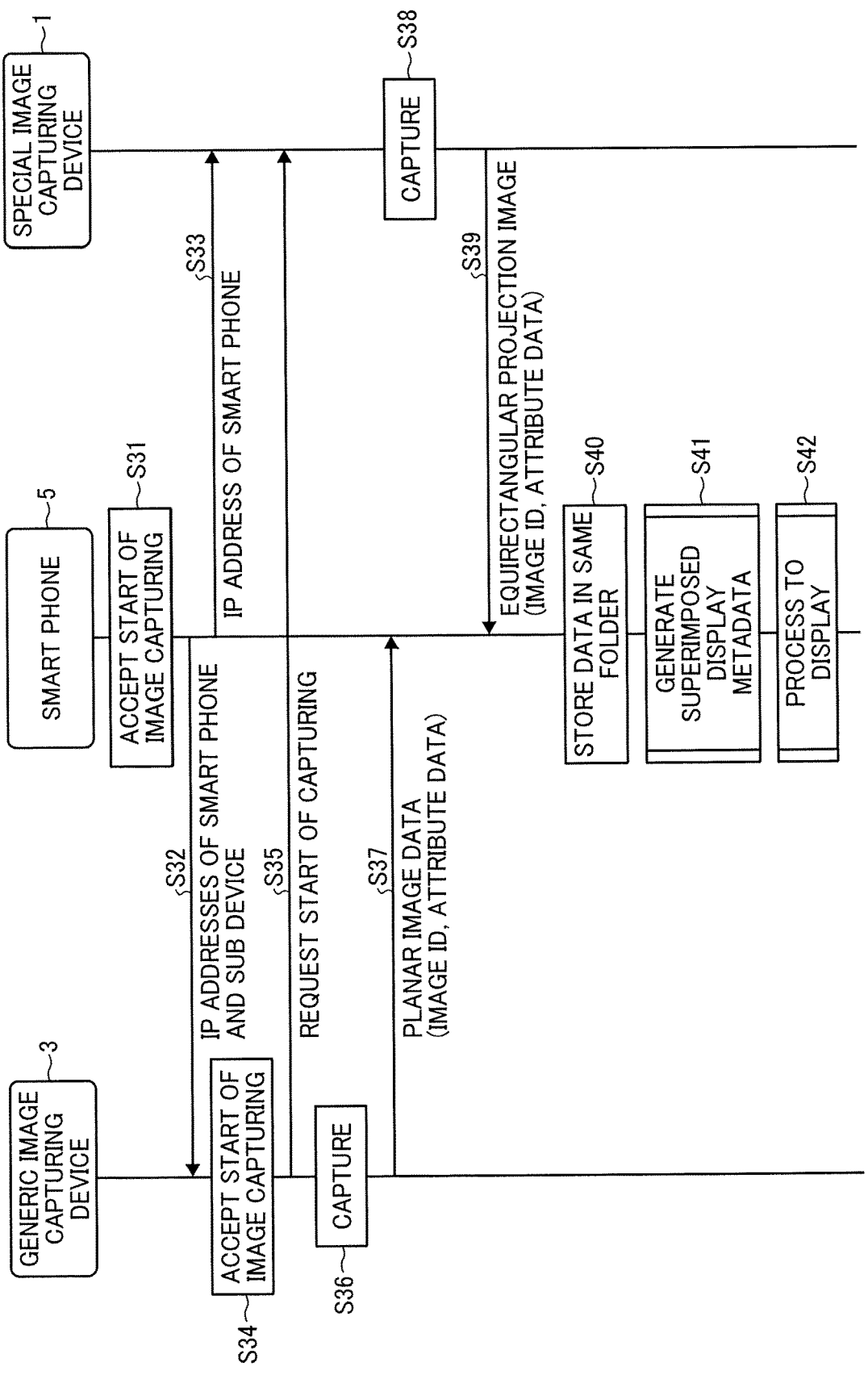
FIG. 31 is a data sequence diagram illustrating linked image capturing and superimposed display according to a first modification.

Referring now to FIG. 31, an image capturing system according to a first modification is described. FIG. 31 is a data sequence diagram illustrating linked image capturing and superimposed display according to the first modification. The function and configuration of the image capturing system according to the first modification are substantially the same as those of the image capturing system according to the embodiment described above, and description thereof is omitted. A description is given of linked image capturing and superimposed display.

As illustrated in FIG. 31, the acceptance unit 52 of the smart phone 5 accepts a user instruction to start linked image capturing (S31). The near-distance communication unit 58 of the smart phone 5 transmits an IP address of the smart phone 5 and an IP address of the special image capturing device 1, which is selected as sub-device 1, to the near-distance communication unit 38 of the generic image capturing device 3 (S32). The IP addresses are data managed in the linked image capturing device management DB 5001. The near-distance communication unit 58 of the smart phone 5 further transmits the IP address of the smart phone 5 to the near-distance communication unit 18 of the special image capturing device 1 (S33).

The acceptance unit 32 of the generic image capturing device 3 accepts pressing of the shutter button 315*a* by the user (S34). Thus, the near-distance communication unit 38 of the generic image capturing device 3 transmits image capturing start request information indicating a request to start image capturing directly to the near-distance communication unit 18 of the special image capturing device 1 without the intervention of the smart phone 5 (S35). Here, the smart phone 5 transmits the IP address of the special image capturing device 1 to the generic image capturing device 3, to cause the generic image capturing device 3 and the special image capturing device 1 to cooperate with each other to perform linked image capturing.

The generic image capturing device 3 starts capturing an image (step S36). The process for capturing an image is substantially the same as that in step S15 described above, and description thereof is omitted. Then, the near-distance communication unit 38 of the generic image capturing device 3 transmits planar image data obtained at S36 to the smart phone 5 (S37). At this time, the near-distance communication unit 38 also transmits an image identifier for identifying the planar image data to be transmitted and attribute data of the planar image data to the smart phone 5.

Thus, the near-distance communication unit 58 of the smart phone 5 receives the planar image data, the image identifier, and the attribute data.

The special image capturing device 1 starts capturing an image (step S38). The process for capturing an image is substantially the same as that in step S17 described above, and description thereof is omitted. The near-distance communication unit 18 of the special image capturing device 1 transmits equirectangular projection image data obtained at S38 to the smart phone 5 (S39). At this time, the near-distance communication unit 18 also transmits an image identifier for identifying the equirectangular projection image data for transmission and attribute data of the equirectangular projection image data to the smart phone 5. Thus, the near-distance communication unit 58 of the smart phone 5 receives the equirectangular projection image data, the image identifier, and the attribute data.

Subsequently, the smart phone 5 performs processing (S40, S41, and S42) similar to the processing of S21, S22, and S23 described above, and description thereof is omitted.

Accordingly, the image capturing system according to the first modification can achieve advantages similar to those described above referring to the first embodiment.

<Second Modification>

Figures 32A, 32B:
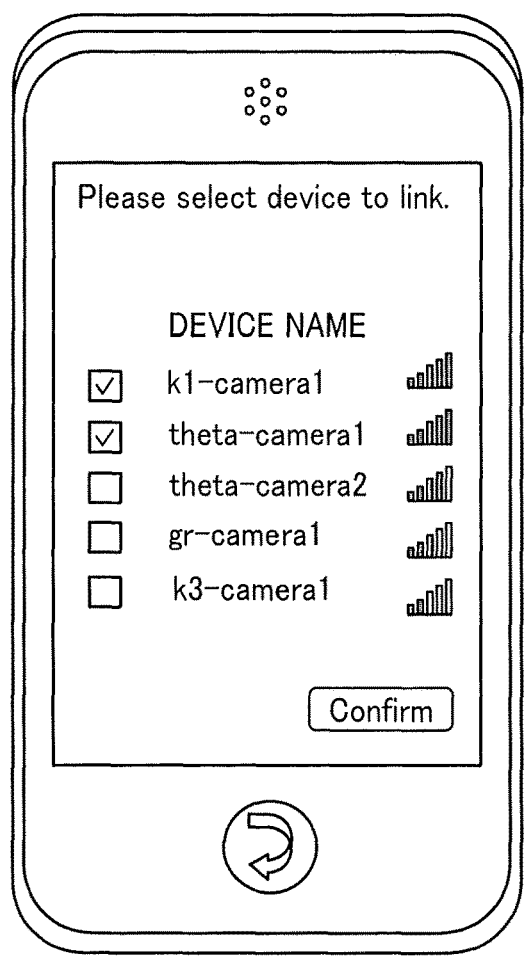
FIGS. 32A and 32B are respectively conceptual diagrams illustrating a linked image capturing device management table and a linked image capturing device configuration screen according to a second modification.
Figure 33:
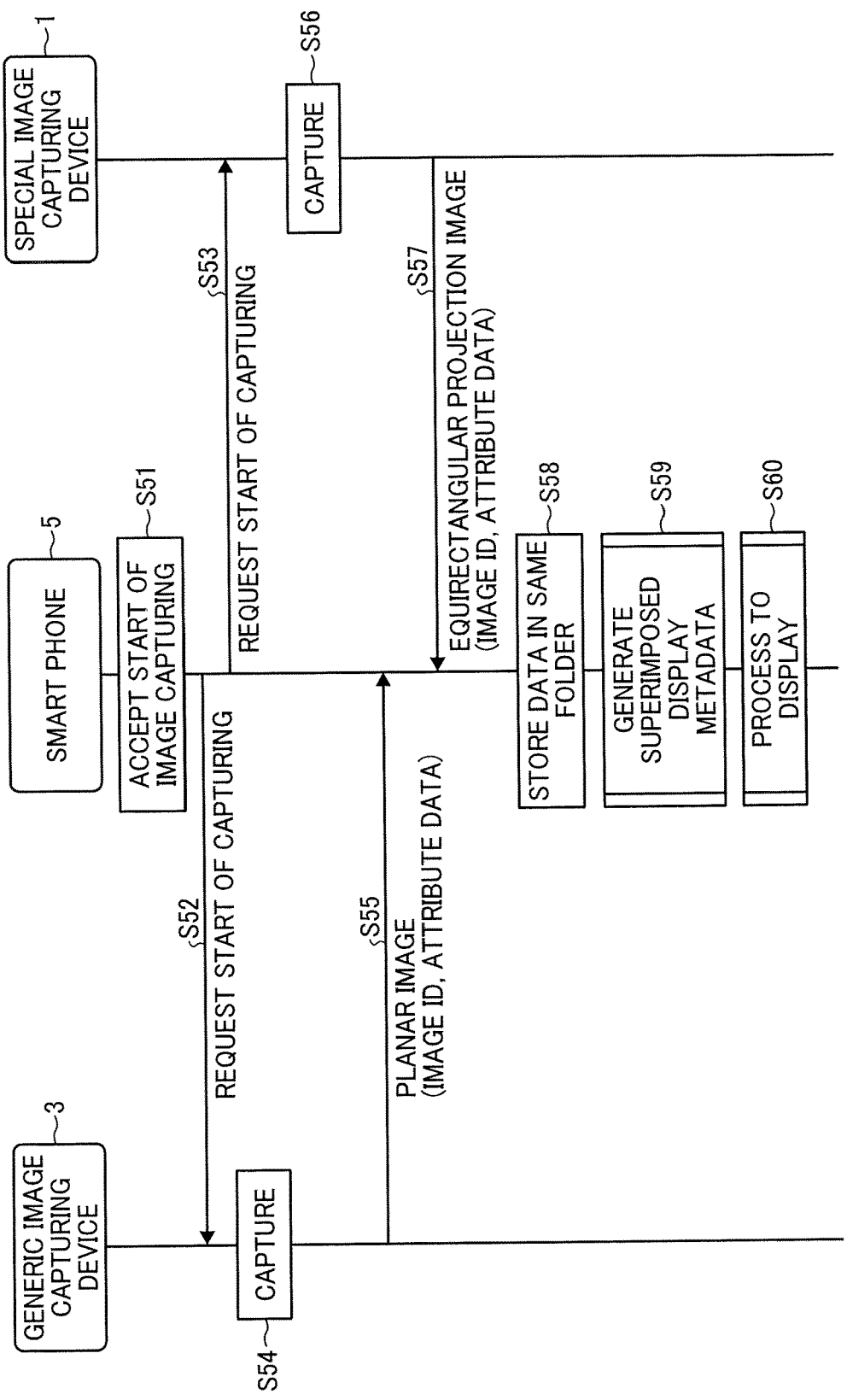
FIG. 33 is a data sequence diagram illustrating linked image capturing and superimposed display according to the second modification.

Referring now to FIGS. 32A, 32B, and 33, an image capturing system according to a second modification is described. FIGS. 32A and 32B are respectively conceptual diagrams illustrating a linked image capturing device management table and a linked image capturing device configuration screen according to the second modification. FIG. 33 is a data sequence diagram illustrating linked image capturing and superimposed display according to the second modification.

The function and configuration of the image capturing system according to the second modification are substantially the same as those of the image capturing system according to the embodiment described above, and description thereof is omitted. A description is given of the linked image capturing device management table and linked image capturing device configuration screen according to the second modification, and also of linked image capturing and superimposed display according to the second modification.

(Linked Image Capturing Device Management Table)

The linked image capturing device management table according to the second modification is described with reference to FIG. 32A. As illustrated in FIG. 32A, the linked image capturing device management table according to the second modification is substantially the same as the linked image capturing device management table illustrated in FIG. 15A according to the embodiment described above, except that the field for linking information indicating a relation to each linked image capturing device is not included, and description thereof is omitted. The linked image capturing device configuration screen illustrated in FIG. 32B according to the second modification is substantially the same as the linked image capturing device configuration screen illustrated in FIG. 15B according to the embodiment described above, except that the radio buttons, which are used to specify an image capturing device to be selected as a main device, are not included, and description thereof is omitted. In the second modification, therefore, instead of an image capturing device selected as a main device, the smart phone 5 accepts an instruction to start capturing an image.

As illustrated in FIG. 33, the acceptance unit 52 of the smart phone 5 accepts a user instruction to start linked image capturing (S51). Then, the near-distance communication unit 58 of the smart phone 5 transmits image capturing start request information to the near-distance communication unit 38 of the generic image capturing device 3 to request the generic image capturing device 3 to start capturing an image (S52). The near-distance communication unit 58 of the smart phone 5 further transmits image capturing start request information to the near-distance communication unit 18 of the special image capturing device 1 to request the special image capturing device 1 to start capturing an image (S53).

The generic image capturing device 3 starts capturing an image (S54). The process for capturing an image is substantially the same as that in step S15 described above, and description thereof is omitted. Then, the near-distance communication unit 38 of the generic image capturing device 3 transmits planar image data obtained at S54 to the smart phone 5 (S55). At this time, the near-distance communication unit 38 also transmits an image identifier for identifying the planar image data to be transmitted and attribute data of the planar image data to the smart phone 5. Thus, the near-distance communication unit 58 of the smart phone 5 receives the planar image data, the image identifier, and the attribute data.

The special image capturing device 1 starts capturing an image (S56). The process for capturing an image is substantially the same as that in step S17 described above, and description thereof is omitted. Then, the near-distance communication unit 18 of the special image capturing device 1 transmits equirectangular projection image data obtained at S56 to the smart phone 5 (S57). At this time, the near-distance communication unit 18 also transmits an image identifier for identifying the equirectangular projection image data to be transmitted and attribute data of the equirectangular projection image data to the smart phone 5. Thus, the near-distance communication unit 58 of the smart phone 5 receives the equirectangular projection image data, the image identifier, and the attribute data. That is, the smart phone 5 transmits image capturing start request information (such as the image capturing start request signal), which requests start of image capturing, respectively, to the generic image capturing device 3 and the special image capturing device 1, to cause these devices 3 and 1 to cooperate with each other to perform the linked image capturing.

Subsequently, the smart phone 5 performs processing (S58, S59, and S60) similar to the processing of S21, S22, and S23 described above, and description thereof is omitted.

Accordingly, the image capturing system according to the second modification can achieve the advantages described above referring to the embodiment described above. In addition, the smart phone 5 serves to trigger the start of capturing an image. This enables a user who is distant from the special image capturing device 1 and the generic image capturing device 3 to start capturing images by using the special image capturing device 1 and the generic image capturing device 3.

<Third Modification>

Figure 34A:
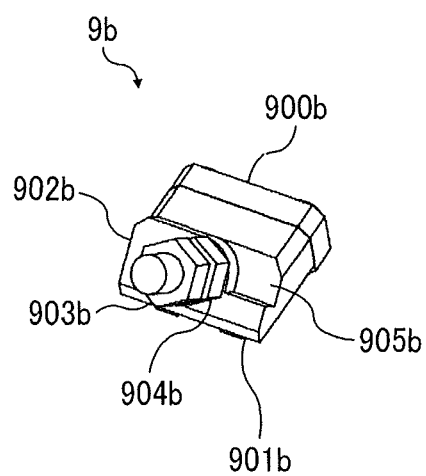
FIG. 34A is a perspective view of an adapter according to a third modification.
Figure 34B:
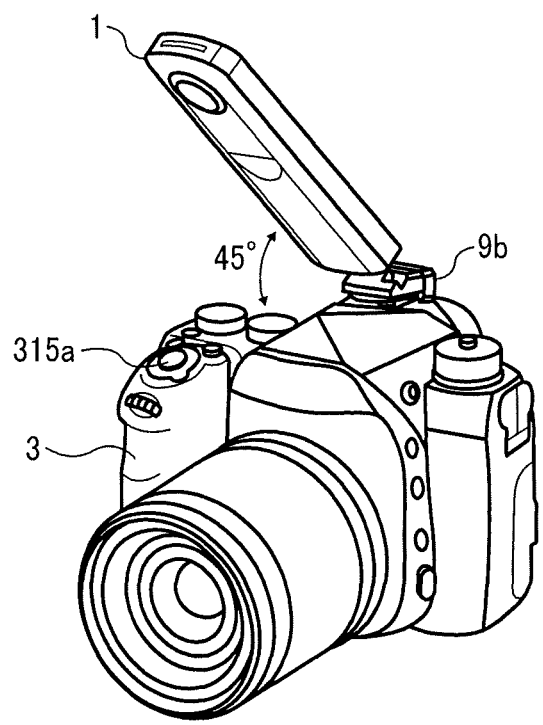
FIG. 34B is an illustration for explaining how a user uses the adapter according to the third modification.

Referring now to FIGS. 34A and 34B, an image capturing system according to a third modification is described. FIG. 34A is a perspective view of an adapter 9b according to the third modification. FIG. 34B is an illustration for explaining how a user uses the adapter 9b according to the third modification.

As illustrated in FIG. 34A, the adapter 9b includes a main body 900b, a shoe adapter 901b, a bolt 902b, an upper adjuster 903b, a lower adjuster 904b, and a plug receiving section 905b. The main body 900b is provided with the shoe adapter 901b, the bolt 902b, the upper adjuster 903b, the lower adjuster 904b, and the plug receiving section 905b. The shoe adapter 901b is attached to an accessory shoe of the generic image capturing device 3 as it slides. The bolt 902b is provided at a center of the shoe adapter 901b, which is to be screwed into the tripod mount hole 151. The bolt 902b is provided with the upper adjuster 903b and the lower adjuster 904b, each of which is rotatable around the central axis of the bolt 902b. The bolt 902b of the main body 900b is further provided with the plug receiving section 905b. The plug receiving section 905b is a recess in which a plug is received when the plug is inserted into the Micro USB terminal 152 or the HDMI terminal 153 of the special image capturing device 1 for wired communication, rather than wireless communication, to attach the special image capturing device 1 to the generic image capturing device 3.

As illustrated in FIG. 34B, when the special image capturing device 1 is attached to the generic image capturing device 3 via the adapter 9b, the special image capturing device 1 is fixed to the generic image capturing device 3 at an angle of 45° with respect to an optical axis of the lens of the generic image capturing device 3. The inclination of the special image capturing device 1 at an angle of 45° leads to a trade-off between the achievement of superimposed display and the risk of an unexpected object appearing in a captured image. Specifically, the closer the angle is to 0° with respect to the optical axis of the lens (the less the parallax), the higher the performance of superimposed display is. On the contrary to this characteristic, if the angle is set to 0°, a larger portion of the generic image capturing device 3 may appear in the spherical image CE.

Second Embodiment

Referring now to FIGS. 35 to 39, an image capturing system is described according to a second embodiment.

<Overview of Image Capturing System>

Figure 35:
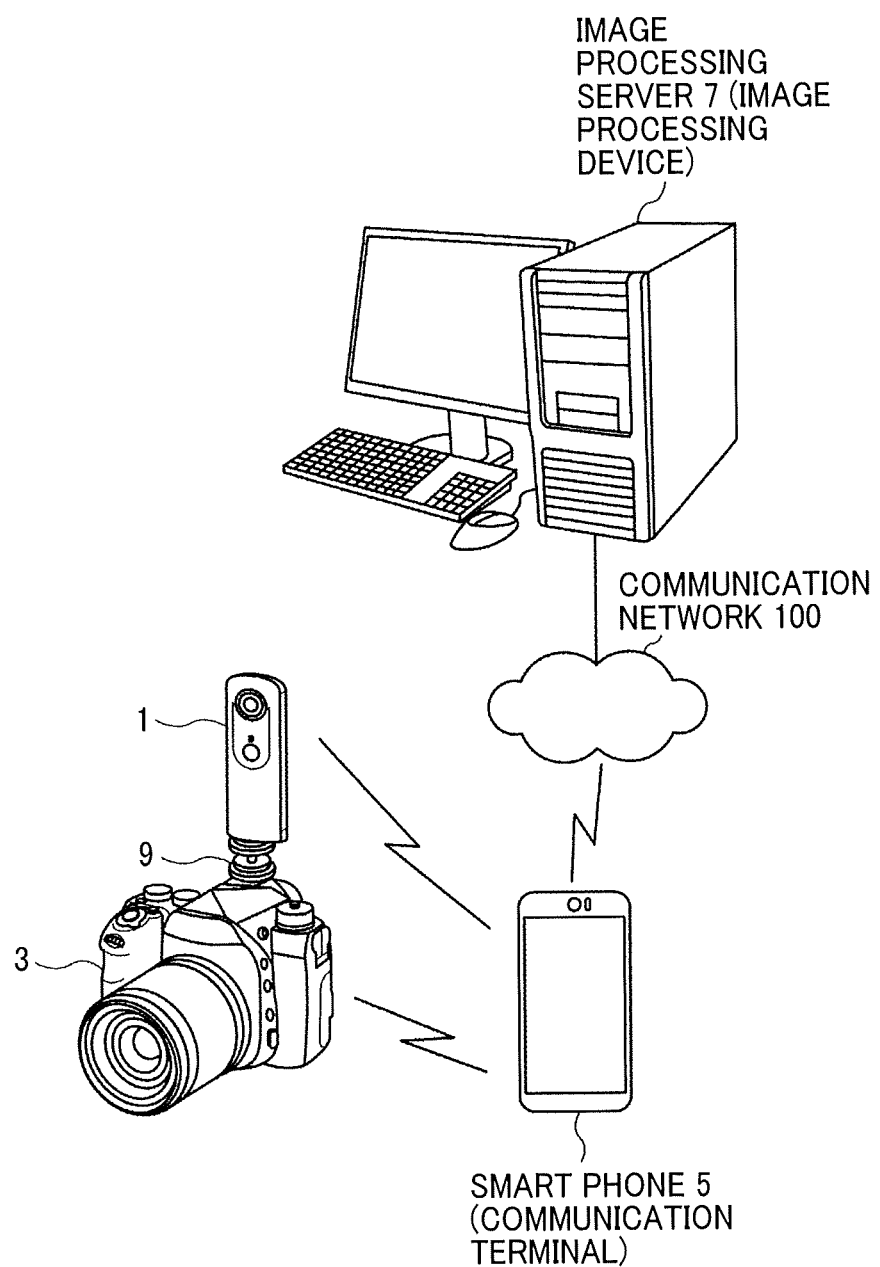
FIG. 35 is a schematic view illustrating an image capturing system according to a second embodiment.

First, referring to FIG. 35, an overview of the image capturing system is described according to the second embodiment. FIG. 35 is a schematic block diagram illustrating a configuration of the image capturing system according to the second embodiment.

As illustrated in FIG. 35, compared to the image capturing system of the first embodiment described above, the image capturing system of this embodiment further includes an image processing server 7. In the second embodiment, the elements that are substantially same to the elements described in the first embodiment are assigned with the same reference numerals. For descriptive purposes, description thereof is omitted. The smart phone 5 and the image processing server 7 communicate with each other through the communication network 100 such as the Internet and the Intranet.

In the first embodiment, the smart phone 5 generates superimposed display metadata, and processes superimposition of images. In this second embodiment, the image processing server 7 performs such processing, instead of the smart phone 5. The smart phone 5 in this embodiment is one example of the communication terminal, and the image processing server 7 is one example of the image processing apparatus or device.

The image processing server 7 is a server system, which is implemented by a plurality of computers that may be distributed over the network to perform processing such as image processing in cooperation with one another.

<Hardware Configuration>

Figure 36:
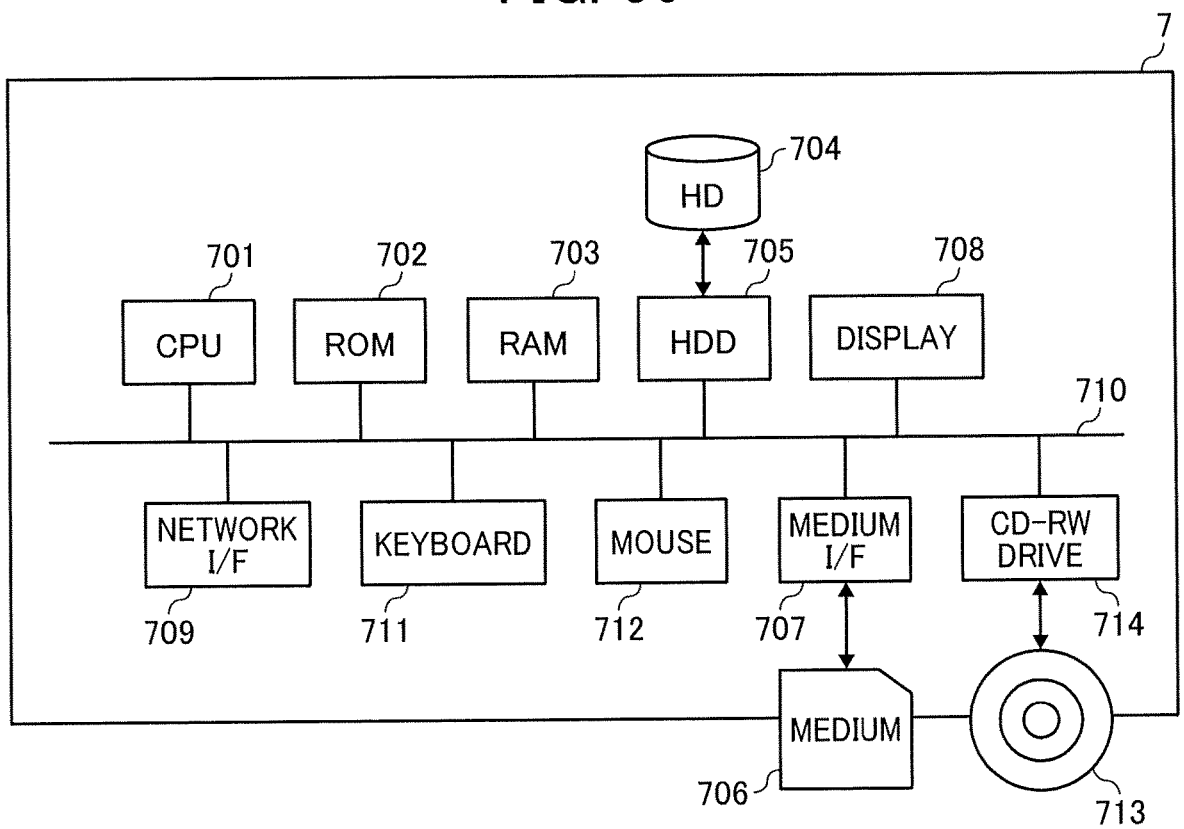
FIG. 36 is a schematic diagram illustrating a hardware configuration of an image processing server according to the second embodiment.

Next, referring to FIG. 36, a hardware configuration of the image processing server 7 is described according to the embodiment. FIG. 36 illustrates a hardware configuration of the image processing server 7 according to the embodiment.

Since the special image capturing device 1, the generic image capturing device 3, and the smart phone 5 are substantially the same in hardware configuration, as described in the first embodiment, description thereof is omitted.

<Hardware Configuration of Image Processing Server>

FIG. 36 is a schematic block diagram illustrating a hardware configuration of the image processing server 7, according to the embodiment. Referring to FIG. 36, the image processing server 7, which is implemented by the general-purpose computer, includes a CPU 701, a ROM 702, a RAM 703, a HD 704, a HDD 705, a medium I/F 707, a display 708, a network I/F 709, a keyboard 711, a mouse 712, a CD-RW drive 714, and a bus line 710. Since the image processing server 7 operates as a server, an input device such as the keyboard 711 and the mouse 712, or an output device such as the display 708 does not have to be provided.

The CPU 701 controls entire operation of the image processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network I/F 709 is an interface that controls communication of data with an external device through the communication network 100. The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The CD-RW drive 714 reads or writes various data with respect to a Compact Disc ReWritable (CD-RW) 713, which is one example of removable recording medium.

The image processing server 7 further includes the bus line 710. The bus line 710 is an address bus or a data bus, which electrically connects the elements in FIG. 36 such as the CPU 701.

<Functional Configuration of Image Capturing System>

Figure 38:
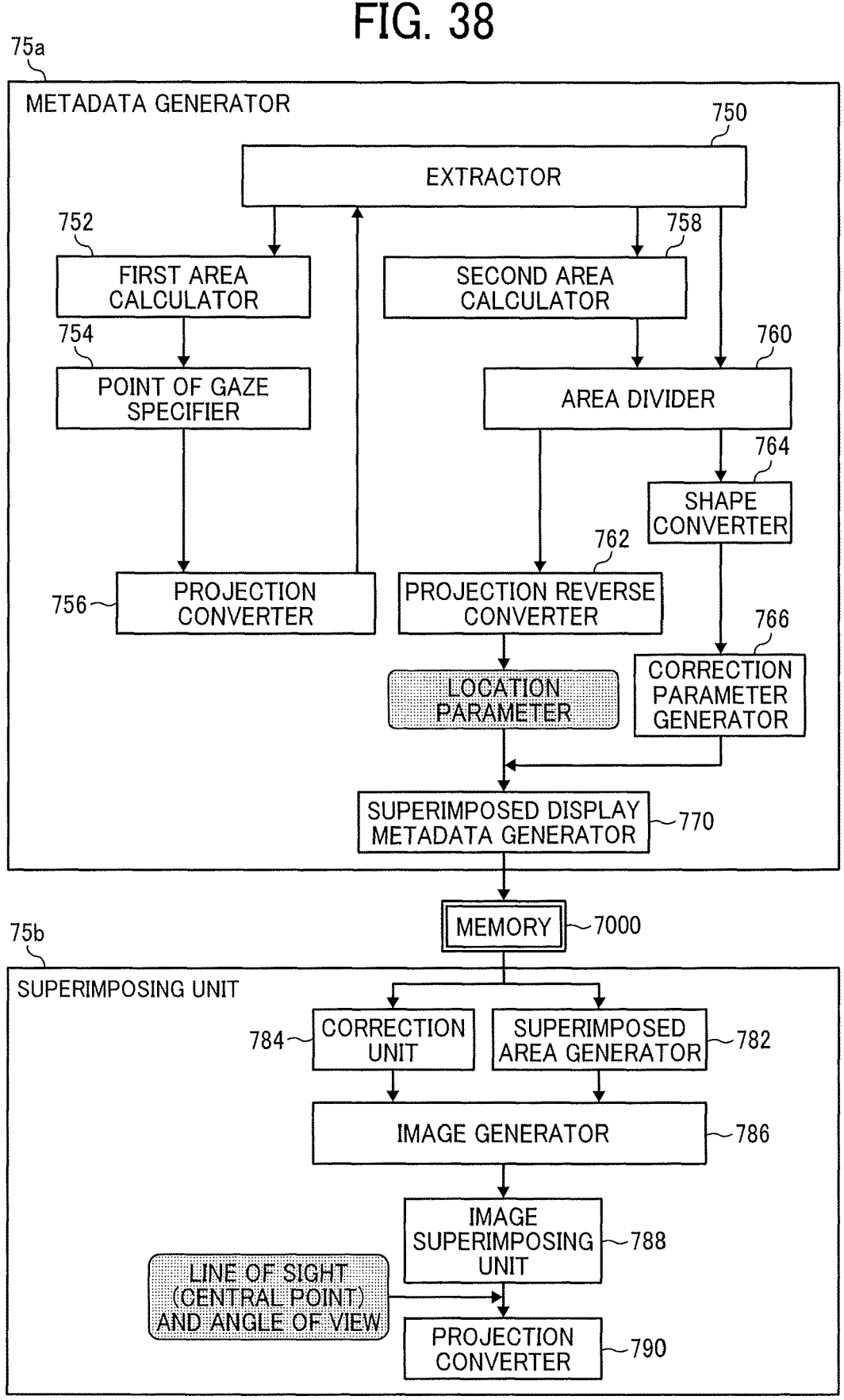
FIG. 38 is a block diagram illustrating a functional configuration of an image and audio processing unit according to the second embodiment.

Referring now to FIGS. 37 and 38, a functional configuration of the image capturing system of FIG. 35 is described according to the second embodiment. FIG. 37 is a schematic block diagram illustrating a functional configuration of the image capturing system of FIG. 35 according to the second embodiment. Since the special image capturing device 1, the generic image capturing device 3, and the smart phone 5 are substantially same in functional configuration, as described in the first embodiment, description thereof is omitted. In this embodiment, however, the image and audio processing unit 55 of the smart phone 5 does not have to be provided with all of the functional units illustrated in FIG. 16.

<Functional Configuration of Image Processing Server>

As illustrated in FIG. 37, the image processing server 7 includes a far-distance communication unit 71, an acceptance unit 72, an image and audio processing unit 75, a display control 76, a determiner 77, and a storing and reading unit 79. These units are functions that are implemented by or that are caused to function by operating any of the elements illustrated in FIG. 36 in cooperation with the instructions of the CPU 701 according to the control program expanded from the HD 704 to the RAM 703.

The image processing server 7 further includes a memory 7000, which is implemented by the ROM 702, the RAM 703 and the HD 704 illustrated in FIG. 36.

The far-distance communication unit 71 of the image processing server 7 is implemented by the network I/F 709 that operates under control of the CPU 701, illustrated in FIG. 36, to transmit or receive various data or information to or from other device (for example, other smart phone or server) through the communication network such as the Internet.

The acceptance unit 72 is implement by the keyboard 711 or mouse 712, which operates under control of the CPU 701, to receive various selections or inputs from the user.

The image and audio processing unit 75 is implemented by the instructions of the CPU 701. The image and audio processing unit 75 applies various types of processing to various types of data, transmitted from the smart phone 5.

The display control 76, which is implemented by the instructions of the CPU 701, generates data of the predetermined-area image Q, as a part of the planar image P, for display on the display 517 of the smart phone 5. The display control 76 superimposes the planar image P, on the spherical image CE, using superimposed display metadata, generated by the image and audio processing unit 75. With the superimposed display metadata, each grid area LA0 of the planar image P is placed at a location indicated by a location parameter, and is adjusted to have a brightness value and a color value indicated by a correction parameter.

The determiner 77 is implemented by the instructions of the CPU 701, illustrated in FIG. 36, to perform various determinations.

The storing and reading unit 79, which is implemented by instructions of the CPU 701 illustrated in FIG. 36, stores various data or information in the memory 7000 and read out various data or information from the memory 7000. For example, the superimposed display metadata may be stored in the memory 7000. In this embodiment, the storing and reading unit 79 functions as an obtainer that obtains various data from the memory 7000.

(Functional Configuration of Image and Audio Processing Unit)

Referring to FIG. 38, a functional configuration of the image and audio processing unit 75 is described according to the embodiment. FIG. 38 is a block diagram illustrating the functional configuration of the image and audio processing unit 75 according to the embodiment.

Figure 39:
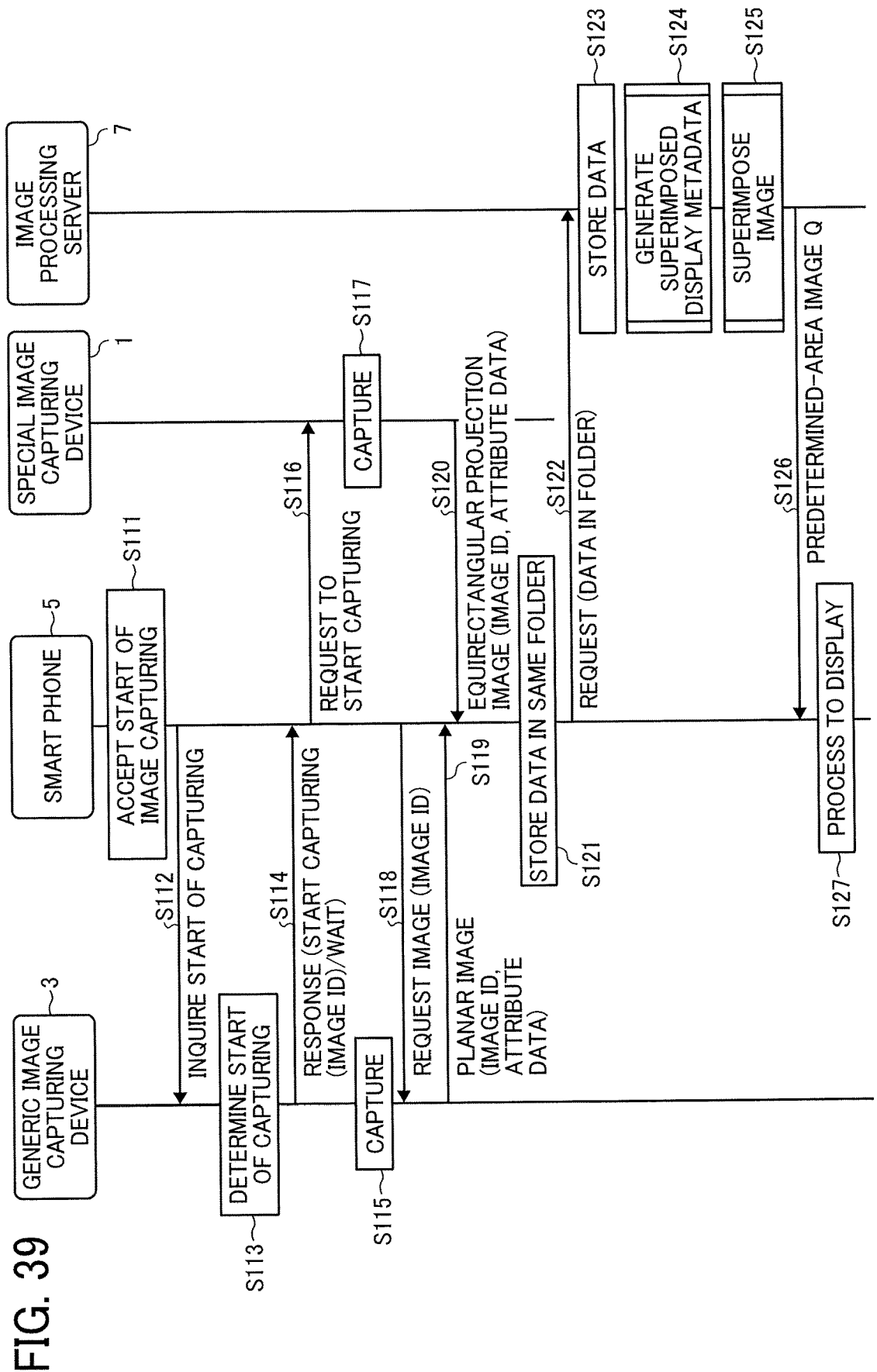
FIG. 39 is a data sequence diagram illustrating operation of capturing the image, performed by the image capturing system, according to the second embodiment.

The image and audio processing unit 75 mainly includes a metadata generator 75a that performs encoding, and a superimposing unit 75b that performs decoding. The metadata generator 75a performs processing of S124, which is processing to generate superimposed display metadata, as illustrated in FIG. 39. The superimposing unit 75b performs processing of S125, which is processing to superimpose the images using the superimposed display metadata, as illustrated in FIG. 39.

(Functional Configuration of Metadata Generator)

First, a functional configuration of the metadata generator 75a is described according to the embodiment. The metadata generator 75a includes an extractor 750, a first area calculator 752, a point of gaze specifier 754, a projection converter 756, a second area calculator 758, an area divider 760, a projection reverse converter 762, a shape converter 764, a correction parameter generator 766, and a superimposed display metadata generator 770. These elements of the metadata generator 75a are substantially similar in function to the extractor 550, first area calculator 552, point of gaze specifier 554, projection converter 556, second area calculator 558, area divider 560, projection reverse converter 562, shape converter 564, correction parameter generator 566, and superimposed display metadata generator 570 of the metadata generator 55a, respectively. Accordingly, the description thereof is omitted.

Referring to FIG. 38, a functional configuration of the superimposing unit 75b is described according to the embodiment. The superimposing unit 75b includes a superimposed area generator 782, a correction unit 784, an image generator 786, an image superimposing unit 788, and a projection converter 790. These elements of the superimposing unit 75b are substantially similar in function to the superimposed area generator 582, correction unit 584, image generator 586, image superimposing unit 588, and projection converter 590 of the superimposing unit 55b, respectively. Accordingly, the description thereof is omitted.

<Operation>

Referring to FIG. 39, operation of capturing the image, performed by the image capturing system of FIG. 35, is described according to the second embodiment. Referring to FIG. 39, operation of capturing the image, performed by the image capturing system of FIG. 35, is described according to the second embodiment. FIG. 39 is a data sequence diagram illustrating operation of capturing the image, according to the second embodiment. S111 to S121 are performed in a substantially similar manner as described above referring to S11 to S21 according to the first embodiment, and description thereof is omitted.

At the smart phone 5, the far-distance communication unit 51 transmits a superimposing request, which requests for superimposing one image on other image that are different in projection, to the image processing server 7, through the communication network 100 (S122). The superimposing request includes image data to be processed, which has been stored in the memory 5000. In this example, the image data to be processed includes planar image data, and equirectangular projection image data, which are stored in the same folder. The far-distance communication unit 71 of the image processing server 7 receives the image data to be processed.

Next, at the image processing server 7, the storing and reading unit 79 stores the image data to be processed (planar image data and equirectangular projection image data), which is received at S122, in the memory 7000 (S123). The metadata generator 75a illustrated in FIG. 38 generates superimposed display metadata (S124). Further, the superimposing unit 75b superimposes images using the superimposed display metadata (S125). More specifically, the superimposing unit 75b superimposes the planar image on the equirectangular projection image. S124 and S125 are performed in a substantially similar manner as described above referring to S22 and S23 of FIG. 19, and description thereof is omitted.

Next, the display control 76 generates data of the predetermined-area image Q, which corresponds to the predetermined area T, to be displayed in a display area of the display 517 of the smart phone 5. As described above in this example, the predetermined-area image Q is displayed so as to cover the entire display area of the display 517. In this example, the predetermined-area image Q includes the superimposed image S superimposed with the planar image P. The far-distance communication unit 71 transmits data of the predetermined-area image Q, which is generated by the display control 76, to the smart phone 5 (S126). The far-distance communication unit 51 of the smart phone 5 receives the data of the predetermined-area image Q.

The display control 56 of the smart phone 5 controls the display 517 to display the predetermined-area image Q including the superimposed image S (S127).

Accordingly, the image capturing system of this embodiment can achieve the advantages described above referring to the first embodiment.

Further, in this embodiment, the smart phone 5 performs image capturing, and the image processing server 7 performs image processing such as generation of superimposed display metadata and generation of superimposed images. This results in decrease in processing load on the smart phone 5. Accordingly, high image processing capability is not required for the smart phone 5.

In the embodiments described above, as illustrated in FIG. 14, the smart phone 5 stores in its memory equirectangular projection image data, planar image data, and superimposed display parameter data; however, this is not required. For example, a management server with which the smart phone 5 can communicate via a communication network such as the Internet may store at least one of equirectangular projection image data, planar image data, and superimposed display parameter data.

In the embodiments described above, furthermore, the storing and reading unit 59 stores three electronic files, namely, an electronic file of equirectangular projection image data, an electronic file of planar image data, and an electronic file of superimposed display metadata, in the same electronic folder; however, this is not required. For example, the storing and reading unit 59 may store an electronic file of equirectangular projection image data and an electronic file of planar image data in an electronic folder FA and store an electronic file of superimposed display metadata in another electronic folder FB. In this case, as illustrated in FIG. 17, superimposed display metadata stores equirectangular projection image information and planar image information in association with superimposed display information. Thus, a location parameter and a correction parameter can be generated and used even if the electronic folders FA and FB are separate electronic folders. Similarly, the storing and reading unit 59 may store an electronic file of equirectangular projection image data and an electronic file of superimposed display metadata in the electronic folder FA and store an electronic file of planar image data in the electronic folder FB. Alternatively, the storing and reading unit 59 may store an electronic file of planar image data and an electronic file of superimposed display metadata in the electronic folder FA and store an electronic file of equirectangular projection image data in the electronic folder FB. In another example, the storing and reading unit 59 may store an electronic file of equirectangular projection image data, an electronic file of planar image data, and an electronic file of superimposed display metadata, respectively, in three electronic folders. Alternatively, the storing and reading unit 59 may store an electronic file of equirectangular projection image data, an electronic file of planar image data, and an electronic file of superimposed display metadata, in the memory 5000, without assigning a specific electronic folder.

In any one of the above-described steps S21, S40, an S58, when the storing and reading unit 59 stores an electronic file of equirectangular projection image data and an electronic file of planar image data respectively in separate electronic folders, the storing and reading unit 59 generates association information (a path to data) for associating the electronic file of equirectangular projection image data and the electronic file of planar image data, to be referred to when generating the superimposed display metadata. The generated association information may be written in any desired file, or stored in any desired database. Based on the association information, the superimposed display metadata is generated, while specifying the electronic files to be used for superimposition.

In the second embodiment referring to FIG. 39, at S121, the storing and reading unit 59 of the smart phone 5 may store an electronic file of equirectangular projection image data and an electronic file of planar image data respectively in separate electronic folders. In such case, the storing and reading unit 79 generates association information (path to data) for associating the electronic file of equirectangular projection image data and the electronic file of planar image data, to be referred to when generating the superimposed display metadata. The generated association information may be written in any desired file, or stored in any desired database. In transmission of the electronic files to be used for generating the superimposed display metadata for superimposition at S122, the storing and reading unit 79 refers to this association information. After generation of the superimposed display data, as described above for the example cases of the storing and reading unit 59. The storing and reading unit 79 of the image processing server 7 may store any combination of the electronic file of equirectangular projection image data, the electronic file of planar image data, and the electronic file of superimposed display metadata, in two electronic folders. In another example, the storing and reading unit 79 may store three electronic files, namely, an electronic file of equirectangular projection image data, an electronic file of planar image data, and an electronic file of superimposed display metadata, in the same electronic folder in the memory 7000. In another example, the storing and reading unit 79 may store an electronic file of equirectangular projection image data, an electronic file of planar image data, and an electronic file of superimposed display metadata, in the memory 7000, without assigning a specific electronic folder.

As illustrated in FIG. 40, in another example, the storing and reading units 59 and 79 may manage superimposed display metadata, equirectangular projection image data, and planar image data using the same electronic file. FIG. 40 is a conceptual diagram illustrating a data structure of a management file. "File Header" indicates a format identifier, version information, and offset values of Entry Info. "Entry Info" indicates image-related information, which is related to equirectangular projection image data and planar image data (such as the display of an image to be superimposed on other image and the display of an image on which other image is to be superimposed). The "Entry Info" is similar to an Image File Directory (IFD) in a Tag Image File Format (TIFF). That is, the "Entry Info" has a configuration similar to that for TIFF when a plurality of IFDs are included and offset values for subsequent IFDs are held.

In FIG. 40, "superimposed display information", "metadata generation information", "equirectangular projection image information", "planar image information", and "attribute data" are substantially the same as the corresponding information items illustrated in FIG. 17. In the management file, images of equirectangular projection image data and planar image data are stored. Each of the images may be a binary image in a general-purpose format such as Joint Photographic Experts Group (JPEG) or may be information other than header information such as JPEG. In this case, data corresponding to the header information need be contained in the Entry Info.

While the foregoing embodiments describe a case where a single planar image is superimposed on a single equirectangular projection image, a plurality of planar images may be superimposed on a single equirectangular projection image. In this case, in FIGS. 17 and 40, the number of items of planar image information increases with the number of planar images.

Third Embodiment

The following describes an image capturing system according to a third embodiment of the present invention.
<<Overview of Image Capturing System>>

Figure 41B:
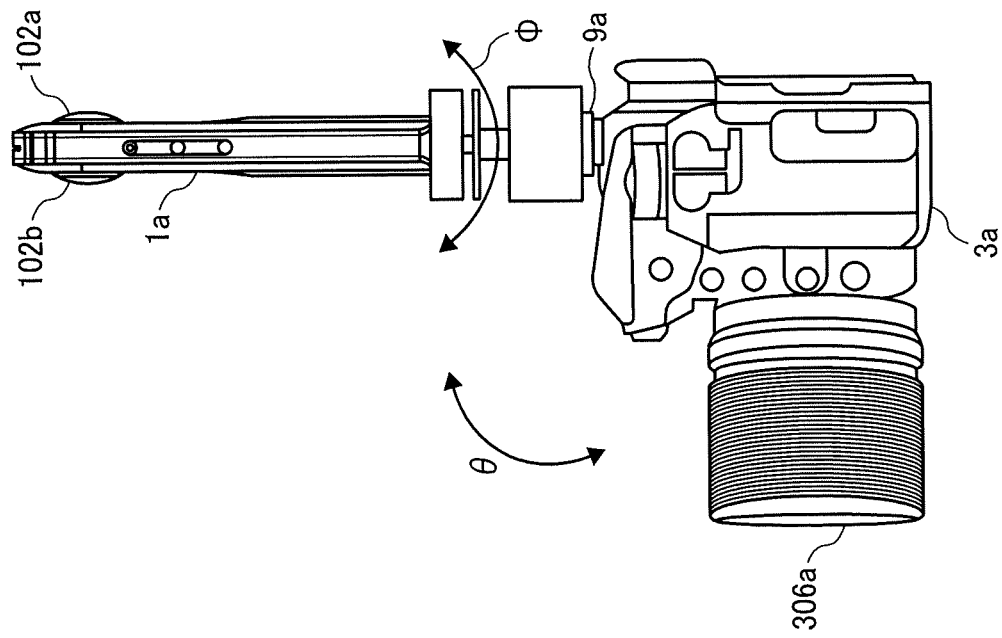
Figure 41A:
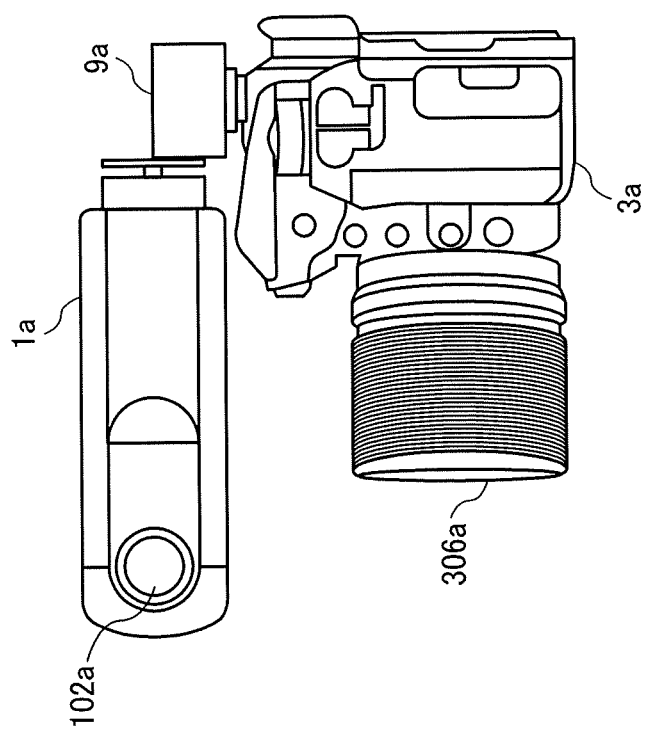

First, an overview of a configuration of the image capturing system according to this embodiment is described with reference to FIGS. 41A and 41B. FIGS. 41A and 41B are schematic diagrams illustrating a configuration of the image capturing system according to this embodiment.

As illustrated in FIGS. 41A and 41B, the image capturing system according to this embodiment includes a special image capturing device 1a, a generic image capturing device 3a, and an adapter 9a. The special image capturing device 1a is an example of the special image capturing device 1, and the generic image capturing device 3a is an example of the generic image capturing device 3. The adapter 9a is an example of a linking device.

FIGS. 41A and 41B are side views of the image capturing system according to this embodiment. FIG. 41A illustrates a case where parallax reduction is prioritized, and FIG. 41B illustrates a case where a reduction in unexpected appearance of a portion of the generic image capturing device 3a in a high-quality area in an image obtained by using the special image capturing device 1a is prioritized.

FIG. 41A illustrates a state in which the adapter 9a is attached to the generic image capturing device 3a and the special image capturing device 1a is attached to the adapter 9a, which is an initial state. In a first form illustrated in FIG. 41A, lenses 102a and 102b of the special image capturing device 1a are brought into close proximity to a lens (an objective lens) 306a of the generic image capturing device 3a to reduce parallax. The first form is thus suitable for capturing an image of an object located at a near distance.

FIG. 41B illustrates a state in which the special image capturing device 1a is tilted from the initial state (θ=0°) to an upright position (θ=90°) by using the adapter 9a and is further panned to change its orientation to 90° (φ=90°) from the initial state (φ=0°). In a second form illustrated in FIG. 41B, an image can be captured by the special image capturing device 1a such that an object located in front of the generic image capturing device 3a appears in a comparatively high quality portion corresponding to a front portion of the lens 102b and a portion not related to the object, such as a portion of the user's hand or arm, appears in a comparatively low quality portion corresponding to the "seam" of the lenses 102a and 102b. The second form is thus suitable for capturing an image of an object located at a medium or far distance, which is less affected by parallax caused by a difference in lens position between the special image capturing device 1a and the generic image capturing device 3a.

In the following description, special image capturing devices 1a, 1b, and 1c are collectively referred to as the "special image capturing device 1", generic image capturing devices 3a, 3b, and 3c are collectively referred to as the "generic image capturing device 3", and adapters 9a, 9b, 9c, 9d, and 9e are collectively referred to as the "adapter 9".

As described above, the special image capturing device 1 is a special digital camera, which captures an image of an object and its surroundings such as scenery to obtain two hemispherical images from which a spherical (panoramic) image is generated.

The generic image capturing device 3 is a digital camera such as a digital single-lens reflex camera or a compact digital camera used to obtain planar image data. In FIGS. 41A and 41B, a single-lens reflex digital camera is illustrated as the generic image capturing device 3a. The generic image capturing device 3a is provided with the shutter button 315a, which is a portion of the operation unit 315 described above.
<<Mechanical Hardware Configuration of Adapter>>

Figure 42A:
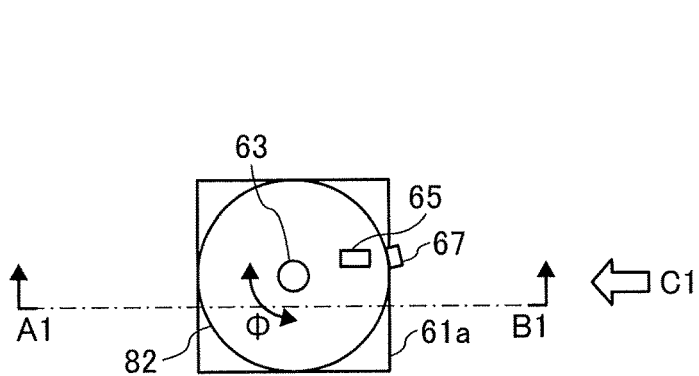
Figure 42B:
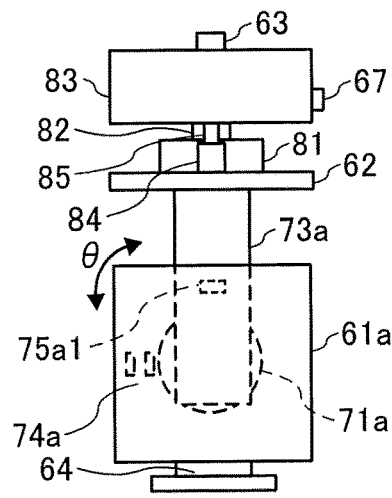
Figure 42C:
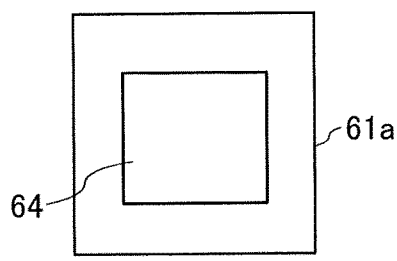
Figure 42D:
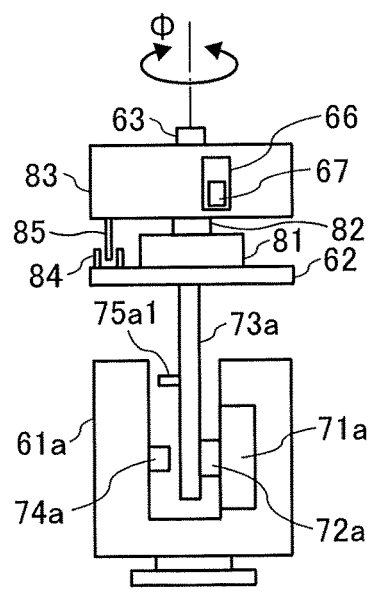
Figure 42E:
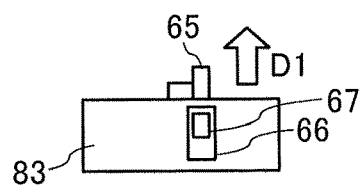

Referring to FIGS. 42A to 42E, the mechanical hardware of the adapter 9a according to this embodiment is described. FIGS. 42A to 42E illustrate a mechanical hardware configuration of a linking device according to the third embodiment. FIG. 42A is a plan view of the linking device, and FIG. 42B is a side sectional view of the linking device taken along line A1-B1 in FIG. 42A. FIG. 42C is a bottom view of the linking device, FIG. 42D is a side view of the linking device as viewed along arrow C1 in FIG. 42A, and FIG. 42E is a side view of the linking device having a terminal that projects from a rotating table in a direction indicated by arrow D1.

The adapter 9a includes a tilt mechanism that vertically rotates A degrees, and a pan mechanism that horizontally rotates φ degrees. The tilt mechanism mainly includes a main body 61a, a stepping motor 71a for tilt operation, and an arm 73a for tilt operation. The pan mechanism mainly includes a base plate 62 for rotation, a stepping motor 81 for rotation, and a rotating table 83 for rotation. The main body 61a is provided with an accessory shoe connector 64 in a lower portion thereof. The rotating table 83 is provided with a tripod screw 63 on an upper surface thereof. The tripod screw 63 is screwed into the tripod mount hole 151 in the special image capturing device 1 to fix the special image capturing device 1 to the upper surface of the rotating table 83.

Typically, the rotation angle of a stepping motor can be controlled in accordance with the number of pulses input to the stepping motor, and the rotation speed of a stepping motor can be controlled in accordance with the rate of pulses input to the stepping motor. For example, a stepping motor that rotates 1.8 degrees for each pulse is capable of rotating a desired angle in accordance with the number of pulses input, such as rotating 45 degrees for 25 pulses or rotating 90 degrees for 50 pulses. The rotation direction of the stepping motor can also be controlled in accordance with the pulse input pattern.

Subsequently, the tilt mechanism is described. The main body 61a is provided with the stepping motor 71a. The arm 73a has a proximal end attached to a motor shaft 72a of the stepping motor 71a. As the stepping motor 71a rotates, the arm 73a rotates in a θ direction with respect to the main body 61a, which enables tilting of a physical object attached to the tripod screw 63. The main body 61a is further provided with a photo interrupter 74a. The arm 73a is provided with a light-blocking member 75a1. This configuration allows detection of a reference position from which the arm 73a is tilted. In FIGS. 42A to 42E, the position of the arm 73a that bows down to the left with respect to the main body 61a and is held horizontal is used as the reference position for tilting.

A description is now given of a typical operation of a photo interrupter and a light-blocking member. A photo interrupter is a device including a light-emitting element and a light-receiving element that face each other. Light from the light-emitting element enters the light-receiving element.

When an object is present between the light-emitting element and the light-receiving element, the light from the light-emitting element is blocked by the object, which causes a difference in the detection result of the light-receiving element, which is the output of the photo interrupter. Thus, a change in state can be detected.

Next, the pan mechanism is described. The arm 73a has a distal end to which the base plate 62 is fixed. On the base plate 62, the stepping motor 81 is mounted. The stepping motor 81 has a motor shaft 82 fixed to a center of a lower surface of the rotating table 83 having a cylindrical shape. As the stepping motor 81 rotates, the rotating table 83 rotates in a φ direction with respect to the base plate 62 having a cylindrical shape, which enables panning of a physical object attached to the tripod screw 63. The base plate 62 is provided with a photo interrupter 84 on an upper surface thereof. A light-blocking member 85 is disposed on the lower surface of the rotating table 83. This configuration allows detection of a reference position for panning using the rotating table 83. The rotating table 83 is formed to be hollow, through which a convex terminal 65 for Micro USB is slidably mounted. The terminal 65 is provided with a sliding member 67 on a side surface thereof, which is movable by the user with their finger. The sliding member 67 projects outward from a slide opening 66 formed in the side surface of the rotating table 83. When the user slides the sliding member 67 with their finger, the terminal 65 projects from the upper surface of the rotating table 83 or the terminal 65, when projecting, is retracted into the rotating table 83.

Normally, the user screws the tripod screw 63 into the tripod mount hole 151 in the special image capturing device 1a to fix the special image capturing device 1a to the rotating table 83 and then slides the sliding member 67 upward to insert the convex terminal 65 on the rotating table 83 into the HDMI terminal 153, which is a concave terminal in the special image capturing device 1a.

In FIGS. 42A to 42E, the stepping motor 71a directly engages with the arm 73a and the stepping motor 81 directly engages with the rotating table 83 to transmit power, by way of example but not limitation. Power may be transmitted indirectly through gears, a belt, or the like.

Figure 43A:
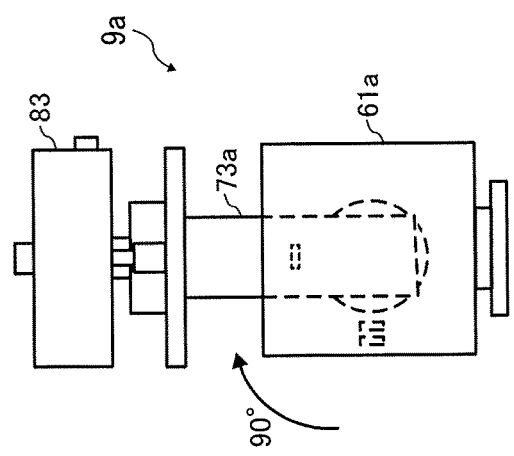
FIGS. 43A to 43C are views illustrating an example of driving of a linking device according to the third embodiment.
Figure 43B:
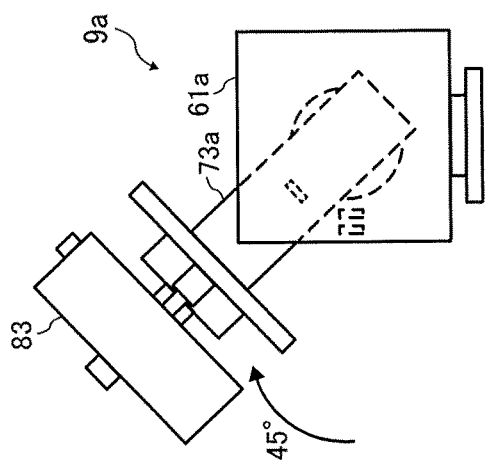
Figure 43C:
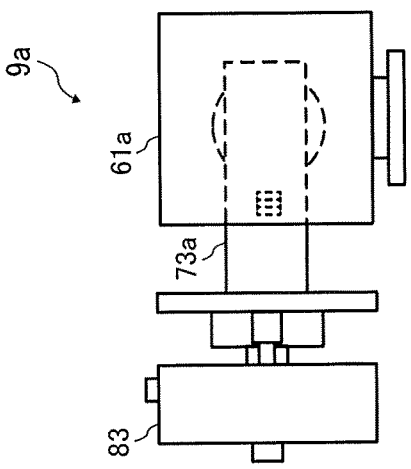

Referring now to FIGS. 43A to 43C, an example of driving of the adapter 9a is described. FIGS. 43A to 43C are views illustrating an example of driving of the adapter 9a. FIG. 43A illustrates a state in which the arm 73a is positioned at the reference position (θ=0°). FIG. 43B illustrates a state in which the arm 73a tilts to θ=45° from the reference position. FIG. 43C illustrates a state in which the arm 73a tilts to θ=90° from the reference position.

In FIG. 43A, light to be received by the light-receiving element of the photo interrupter 74a is blocked by the light-blocking member 75a1 of the arm 73a. In FIGS. 43B and 43C, light from the light-emitting element of the photo interrupter 74a directly enters the light-receiving element. In the state illustrated in FIG. 43A, the detection result of the photo interrupter 74a is different from the detection results obtained in the states illustrated in FIGS. 43B and 43C. Thus, when the position illustrated in FIG. 43A is used as a reference position, a control 96 described below can determine whether the arm 73a is positioned at the reference position by using the detection result of the photo interrupter 74a.

Also in this embodiment, as illustrated in FIG. 10, the user captures an image of an object and its surrounding by using the generic image capturing device 3a to which the special image capturing device 1a is attached through the adapter 9.

In this embodiment, there is no need for the smart phone 5; however, a smart phone may be used instead of the generic image capturing device 3a. When the user presses the shutter button 315a of the generic image capturing device 3a, the generic image capturing device 3a can start capturing an image and a linked image capturing operation of the special image capturing device 1a can be started via the adapter 9a.

<<Electrical Hardware Configurations of Devices Included in Image Capturing System>>

Subsequently, a description is given of electrical hardware configurations of devices included in the image capturing system according to this embodiment.

<Hardware Configuration of Special Image Capturing Device>

The special image capturing device 1 has the above-described hardware configuration illustrated in FIG. 11, and description thereof is omitted. In this embodiment, the communication circuit 117 communicates with an external terminal (device) such as the adapter 9a and is capable of transmitting data of an equirectangular projection image to the external terminal (device) such as the adapter 9a.

<Hardware Configuration of General-Purpose Image Capturing Device>

Figure 44:
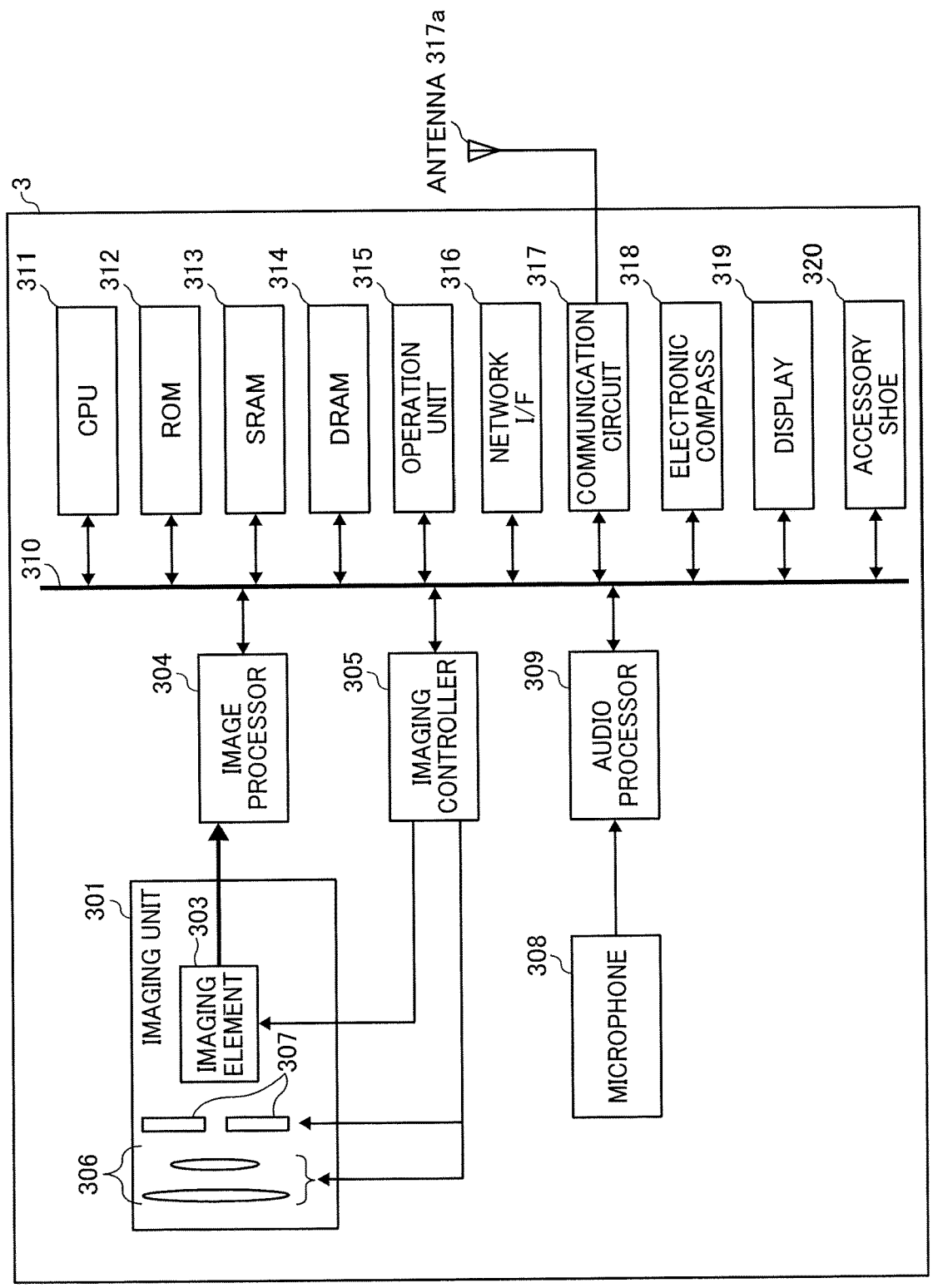
FIG. 44 is a schematic diagram illustrating an electrical hardware configuration of a generic image capturing device according to the third embodiment.

Referring now to FIG. 44, the hardware of the generic image capturing device 3a is described.

The generic image capturing device 3a includes an accessory shoe 320 in addition to the hardware components described above with reference to FIG. 12.

The accessory shoe 320 is mounted on a single-lens reflex digital camera or a high-end compact digital camera. The accessory shoe 320 is a component to which an external accessory device such as a flash light or a viewfinder is mechanically and electrically attached. An accessory shoe with an electrical contact is particularly referred to as a hot shoe, and an accessory shoe without an electrical contact is particularly referred to as a cold shoe.

<Electrical Hardware Configuration of Adapter>

Figure 45:
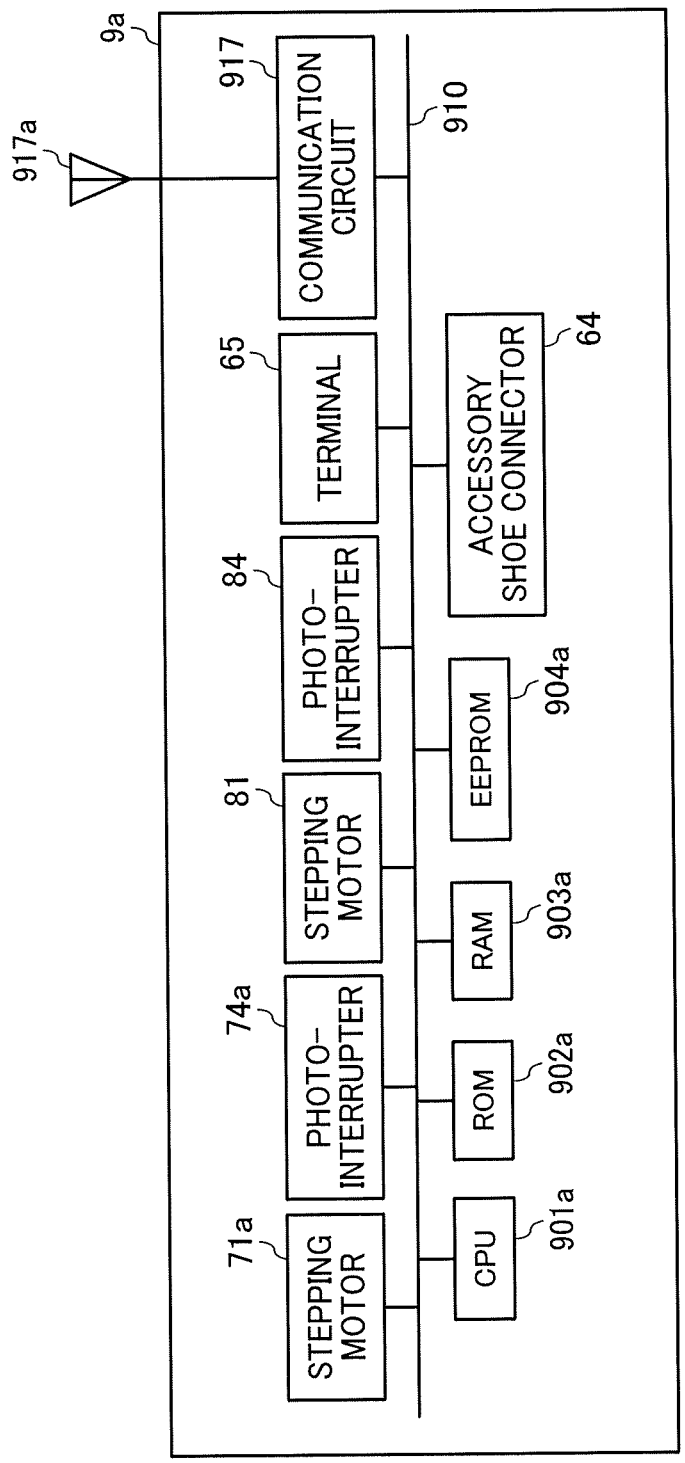
FIG. 45 is a schematic diagram illustrating an electrical hardware configuration of the linking device according to the third embodiment.

Referring now to FIG. 45, the electrical hardware of the adapter 9a is described. FIG. 45 illustrates an electrical hardware configuration of the adapter 9a. The electrical hardware of the adapters 9b and 9c is similar to that of the adapter 9a, and description thereof is omitted.

As illustrated in FIG. 45, the adapter 9a includes a CPU 901, a ROM 902a, a RAM 903a, an EEPROM 904a, a communication circuit 917, and an antenna 917a.

The CPU 901 controls entire operation of the adapter 9a. The ROM 902a stores a control program for controlling the CPU 901 such as an IPL. The RAM 903a is used as a work area for the CPU 901. The EEPROM 904a reads or writes various data such as a control program for the adapter 9a under control of the CPU 901. The communication circuit 917 communicates with an external terminal (device) such as the generic image capturing device 3a via the antenna 917a of the adapter 9a by using near-distance wireless communication technology such as Wi-Fi, NFC, or Bluetooth. The communication circuit 917 obtains data of a planar image captured in perspective projection from the external terminal (device).

The adapter 9a further includes the accessory shoe connector 64, the convex terminal 65 for Micro USB, the stepping motor 71a for tilt operation, the photo interrupter 74a for tilt operation, the stepping motor 81 for panning operation, and the photo interrupter 84 for panning operation. These components are described above with reference to FIGS. 42A to 42E, and description thereof is omitted.

The adapter 9a further includes a bus line 910. Examples of the bus line 910 include an address bus and a data bus, which electrically connects the elements such as the CPU 901.

It should be noted that a recording medium such as a CD-ROM or HD storing any of the above-described programs may be distributed domestically or overseas as a program product.

<<Functional Configuration of Image Capturing System>>

Figure 46:
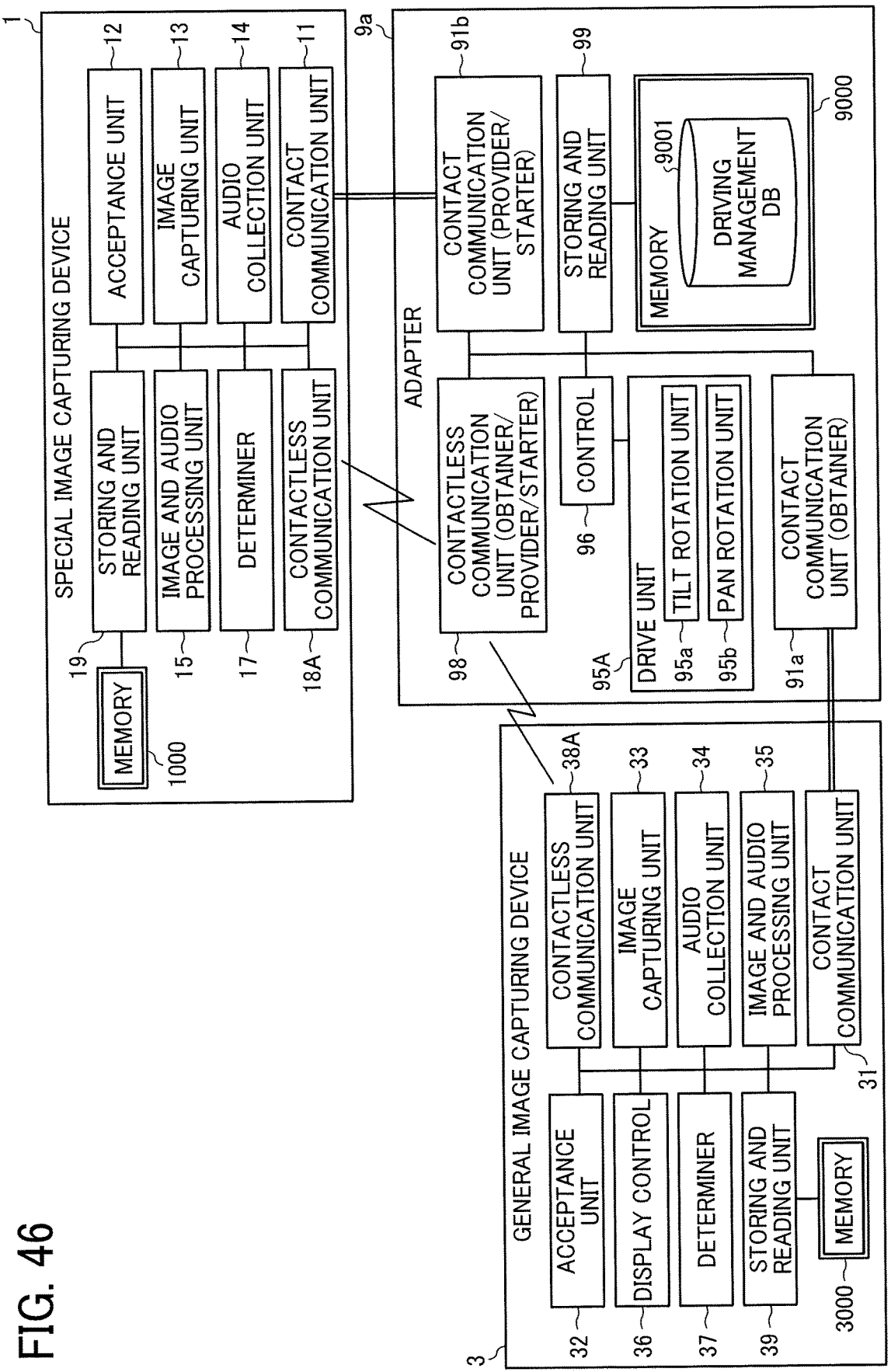
FIG. 46 is a schematic block diagram illustrating a functional configuration of an image capturing system according to the third embodiment.

Referring now to FIGS. 11 and 46, a functional configuration of the image capturing system according to this embodiment is described. FIG. 46 is a schematic block diagram illustrating functional configurations of the special image capturing device 1a, the generic image capturing device 3a, and the adapter 9a in the image capturing system according to this embodiment. The functions of the adapters 9b and 9c are similar to the function of the adapter 9a, and description thereof is omitted.

<Functional Configuration of Special Image Capturing Device>

Referring to FIGS. 11 and 44 to 46, a functional configuration of the special image capturing device 1a is described in detail. As illustrated in FIG. 46, the special image capturing device 1a includes a contact communication unit 11, an acceptance unit 12, an image capturing unit 13, an audio collection unit 14, an image and audio processing unit 15, a determiner 17, a contactless communication unit 18A, and a storing and reading unit 19. These units are functions that are implemented by or that are caused to function by operating any of the elements illustrated in FIG. 11 in cooperation with the instructions of the CPU 111 according to the special image capturing device control program expanded from the SRAM 113 to the DRAM 114.

The special image capturing device 1a further includes a memory 1000, which is implemented by the ROM 112, the SRAM 113, and the DRAM 114 illustrated in FIG. 11. The acceptance unit 12, the image capturing unit 13, the audio collection unit 14, the image and audio processing unit 15, the determiner 17, and the storing and reading unit 19 are described above with reference to FIG. 14, and description thereof is omitted.

The contact communication unit 11 of the special image capturing device 1 is implemented mainly by the terminal 121 illustrated in FIG. 11 and by the processing performed by the CPU 111. The contact communication unit 11 exchanges various data and various signals with a contact communication unit 91b of the adapter 9a described below.

The contactless communication unit 18A is implemented mainly by the processing performed by the CPU 111 and by the communication circuit 117 and the antenna 117a. The contactless communication unit 18A is capable of communicating with a contactless communication unit 98 of the adapter 9a described below by using near-distance wireless communication technology such as Wi-Fi.

<Functional Configuration of General-Purpose Image Capturing Device>

Referring now to FIGS. 44 and 46, a functional configuration of the generic image capturing device 3a is described in detail. As illustrated in FIG. 46, the generic image capturing device 3a includes a contact communication unit 31, an acceptance unit 32, an image capturing unit 33, an audio collection unit 34, an image and audio processing unit 35, a display control 36, a determiner 37, a contactless communication unit 38A, and a storing and reading unit 39. These units are functions that are implemented by or that are caused to function by operating any of the elements illustrated in FIG. 44 in cooperation with the instructions of the CPU 311 according to the special image capturing device control program expanded from the SRAM 313 to the DRAM 314.

The generic image capturing device 3a further includes a memory 3000, which is implemented by the ROM 312, the SRAM 313, and the DRAM 314 illustrated in FIG. 44. The acceptance unit 32, the image capturing unit 33, the audio collection unit 34, the image and audio processing unit 35, the display control 36, the determiner 37, and the storing and reading unit 39 are described above with reference to FIG. 14, and description thereof is omitted.

The contact communication unit 31 of the generic image capturing device 3a is implemented mainly by the accessory shoe 320 illustrated in FIG. 44 and by the processing performed by the CPU 311. When connected to a contact communication unit 91a of the adapter 9a described below, the contact communication unit 31 exchanges various data and various signals with the contact communication unit 91a.

The contactless communication unit 38A is implemented mainly by the processing performed by the CPU 311 and by the communication circuit 317 and the antenna 317a. The contactless communication unit 38A is capable of communicating with the contactless communication unit 98 of the adapter 9a described below by using near-distance wireless communication technology such as Wi-Fi.

<Functional Configuration of Adapter>

Referring now to FIGS. 45 and 46, a functional configuration of the adapter 9a is described in detail. As illustrated in FIG. 46, the adapter 9a includes the contact communication units 91a and 91b, a drive unit 95A, the control 96, the contactless communication unit 98, and a storing and reading unit 99. These units are functions that are implemented by or that are caused to function by operating any of the elements illustrated in FIG. 45 in cooperation with the instructions of the CPU 901 according to the adapter control program expanded from the EEPROM 904a to the RAM 903a.

The adapter 9a further includes a memory 9000, which is implemented by the ROM 902a, the RAM 903a, and the EEPROM 904a illustrated in FIG. 45. The memory 9000 stores a driving management DB 9001. The driving management DB 9001 includes a driving management table illustrated in FIG. 47.

In order to implement communication with the generic image capturing device 3a even when the generic image capturing device 3a does not include the contact communication unit 31, the adapter 9a includes the contactless communication unit 98, which is capable of wirelessly communicating with the contactless communication unit 38A of the generic image capturing device 3a.

(Driving Management Table)

Figure 47:
FIG. 47 is a conceptual diagram illustrating a driving management table.

Referring now to FIG. 47, the driving management table is described. As illustrated in FIG. 47, the driving management table includes control values indicating a tilt angle (θ) and a pan angle (φ) from the reference position for each device-to-object distance (m) relative to a focal length (mm). The device-to-object distance is a distance from the generic image capturing device 3a to an object, more specifically, a distance from the imaging element 303 of the generic image capturing device 3a to an object.

(Configuration of Functions of Adapter)

The contact communication unit 91a of the adapter 9a is implemented mainly by the accessory shoe connector 64 illustrated in FIG. 45 and by the processing performed by the CPU 901. When connected to the contact communication unit 31 of the generic image capturing device 3a, the contact communication unit 91a exchanges various data and various signals with the contact communication unit 31. For example, the contact communication unit 91a serves as an obtainer. When the user performs a zoom operation or focus operation of the generic image capturing device 3a, the contact communication unit 91a obtains operation data indicating the operation from the contact communication unit 31 of the generic image capturing device 3a. When the user presses the shutter button 315a of the generic image capturing device 3a, the contact communication unit 91a, which serves as an obtainer, obtains data (or a signal) indicating image capturing start information, which indicates that image capturing has started, from the contact communication unit 31 of the generic image capturing device 3a.

The contact communication unit 91b of the adapter 9a is implemented mainly by the convex terminal 65 for Micro USB illustrated in FIG. 45 and by the processing performed by the CPU 901. When connected to the contact communication unit 11 of the special image capturing device 1a, the contact communication unit 91b exchanges various data and various signals with the contact communication unit 11. For example, the contact communication unit 91b serves as a provider and provides the operation data obtained by the contact communication unit 91a to the contact communication unit 11 of the special image capturing device 1a. The contact communication unit 91b further serves as a starter and provides data (or a signal) indicating image capturing start request information to the contact communication unit 11 in response to the contact communication unit 91a obtaining the image capturing start information.

The drive unit 95A is driven in accordance with control instructions of the control 96. The drive unit 95A includes a tilt rotation unit 95a and a pan rotation unit 95b. The tilt rotation unit 95a is implemented by the tilt mechanism (mainly, the main body 61a, the stepping motor 71a, and the arm 73a) and is capable of moving the special image capturing device 1a in the tilt ($\theta$) direction. That is, the tilt rotation unit 95a enables displacement of objective lenses, namely, the lenses 102a and 102b, of the special image capturing device 1a. The pan rotation unit 95b is implemented by the pan mechanism (mainly, the base plate 62, the stepping motor 81, and the rotating table 83) and is capable of moving the special image capturing device 1a in the pan ($\phi$) direction. That is, the pan rotation unit 95b enables displacement of objective lenses, namely, the lenses 102a and 102b, of the special image capturing device 1a.

The control 96 is implemented by the processing performed by the CPU 901 illustrated in FIG. 45. The control 96 controls driving of the tilt rotation unit 95a and the pan rotation unit 95b in accordance with the tilt angle ($\theta$) and pan angle ($\phi$) in the driving management table, which are indicated by the operation data received from the generic image capturing device 3a.

The contactless communication unit 98 is implemented mainly by the processing performed by the CPU 901 and by the communication circuit 917 and the antenna 917a. The contactless communication unit 98 is capable of communicating with the contactless communication unit 38A of the generic image capturing device 3a by using near-distance wireless communication technology such as Wi-Fi. Even when the generic image capturing device 3a does not include the accessory shoe 320 or when the accessory shoe 320 is a cold shoe, the contactless communication unit 98 enables the adapter 9a to communicate with the generic image capturing device 3a. Accordingly, the contactless communication unit 98 serves as both an obtainer, which is implemented by the contact communication unit 91a described above, and a provider and a starter, which are implemented by the contact communication unit 91b.

The storing and reading unit 99 is implemented mainly by the processing performed by the processing performed by the CPU 901 illustrated in FIG. 45. The storing and reading unit 99 stores various data (or signals) in the memory 9000 and reads various data (or signals) from the memory 9000.

<<Detailed Description of Tilt Operation and Panning Operation>>

Subsequently, a change in parallax caused by tilt operation and panning operation according to this embodiment is described in detail.

<Parallax Caused by Tilt Operation>

Figure 48:
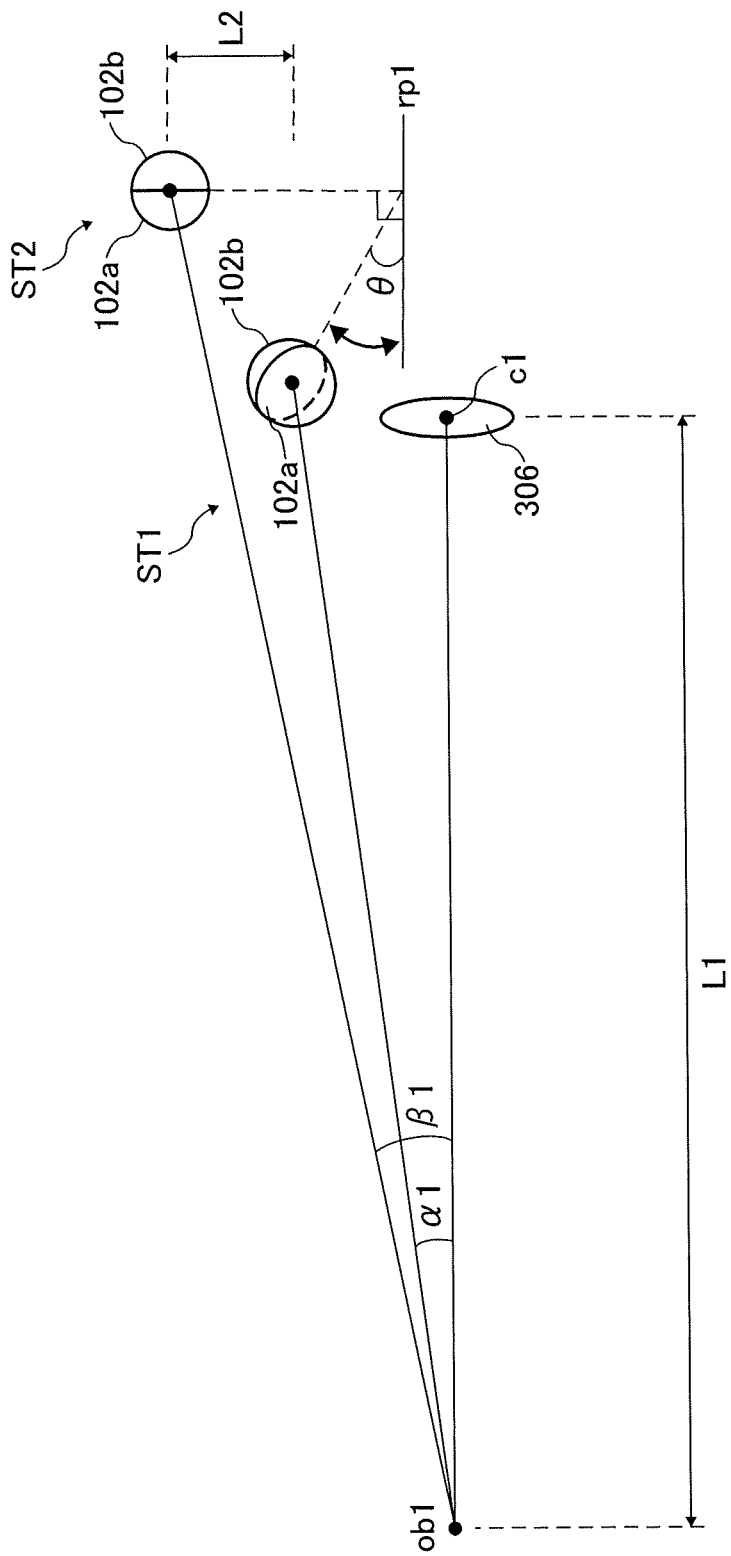
FIG. 48 is a diagram illustrating a relationship between parallax and a vertical movement of the special image capturing device in accordance with rotation in a tilt angle direction.

First, referring to FIGS. 48 and 49A to 49C, a change in parallax caused by tilt operation is described. FIG. 48 is a diagram illustrating a relationship between parallax and a vertical movement of the special image capturing device 1a in accordance with rotation in a tilt angle ($\theta$) direction. FIGS. 49A to 49C illustrate a relationship between a tilt angle $\theta$ and a device-to-object distance L1 and illustrate how an object is viewed.

FIG. 48 illustrates a situation in which an object ob1 is located at a position that is a distance L1 away from the generic image capturing device 3a. In FIG. 48, it is assumed that the tilt mechanism of the adapter 9a allows the special image capturing device 1a to move an angle $\theta$ from a reference position rp1, which is used for tilting. A state ST1 in which the special image capturing device 1a tilts to an angle $\theta$ less than 90° ($\theta$<90°) from the reference position rp1, and a state ST2 in which the special image capturing device 1a tilts to an angle $\theta$ equal to 90° ($\theta$=90°) from the reference position rp1 are depicted. When the position of the lens 102a (102b) of the special image capturing device 1a changes between the states ST1 and ST2, the difference between the positions of the lens 102a (102b) of the special image capturing device 1a in the two states ST1 and ST2 is equal to a distance L2 in the vertical direction. When the angle between the generic image capturing device 3a and the special image capturing device 1a in the state ST1 is represented by $\alpha 1$ and the angle between the generic image capturing device 3a and the special image capturing device 1a in the state ST2 is represented by $\beta 1$, $\beta 1>\alpha 1$ holds for parallax introduced by the special image capturing device 1a and the generic image capturing device 3a.

The parallax decreases as the distance between the position of the lens 306a of the generic image capturing device 3a and the position of the lens 102a (102b) of the special image capturing device 1a decreases. Thus, parallax can be reduced by controlling tilt motion, specifically, by bringing the position of the lens 102a (102b) of the special image capturing device 1a into close proximity to the position of the lens 306a of the generic image capturing device 3a.

FIG. 49A illustrates the shape of the object ob1, which is a rectangular parallelepiped object. FIG. 49B illustrates how the object ob1 is viewed when viewed from the lens 306a of the generic image capturing device 3a. It is assumed that an image of the object ob1 is captured in a direction in which only a surface of the object ob1, which has a rectangular parallelepiped shape, is visible. FIG. 49C illustrates how the object ob1 is viewed when viewed from the lens 102a (102b) of the special image capturing device 1a. The vertical part represents the device-to-object distance L1, which is the distance between the generic image capturing device 3a and the object ob1, and the horizontal part represents the tilt angle $\theta$ for controlling tilting using the adapter 9a. The tilt angle θ is assumed to be a vertical angle relative to the optical axis of the generic image capturing device 3a (see FIG. 48).

When the device-to-object distance L1 is set to infinity (∞), that is, when the object ob1 is infinitely distant, the object ob1 is viewed from the lens 102a (102b) of the special image capturing device 1a in almost the same fashion as is viewed from the generic image capturing device 3a, specifically, only the side surface (the surface marked with "Y") of the rectangular parallelepiped object ob1, regardless of the tilt angle θ. In contrast, when the device-to-object distance L1 decreases (5 m or 1 m), that is, when the object ob1 approaches the generic image capturing device 3a, due to parallax caused by the generic image capturing device 3a and the special image capturing device 1a, not only the side surface but also an upper surface (the surface marked with "X") of the rectangular parallelepiped object ob1 is visible from the special image capturing device 1a in the case of the tilt angle θ equal to 0°. As the tilt angle decreases to θ=0°, the parallax caused by the generic image capturing device 3a and the special image capturing device 1a decreases, which results in a reduction in the proportion of a visible portion in the upper surface of the rectangular parallelepiped object ob1. Thus, the object ob1 is viewed from the special image capturing device 1a in a fashion more similar to that from the generic image capturing device 3a. Accordingly, the tilt angle (θ) for controlling tilting using the adapter 9a may be changed in accordance with the device-to-object distance L1 to control parallax caused by the generic image capturing device 3a and the special image capturing device 1a. In addition, as the device-to-object distance L1 increases, the influence of parallax caused by the generic image capturing device 3a and the special image capturing device 1a decreases. Thus, when the device-to-object distance L1 is large, the special image capturing device 1a is placed at a position away from the generic image capturing device 3a, which results in it being less likely that a portion of the generic image capturing device 3a will appear in an image captured using the special image capturing device 1a. It is thus desirable that the driving management table illustrated in FIG. 47 store control values (tilt angles) such that the smaller the value of the device-to-object distance, the closer the special image capturing device 1a is to the generic image capturing device 3a and the larger the value of the device-to-object distance, the farther the special image capturing device 1a is from the generic image capturing device 3a. Additionally, as the focal length increases, the size of the object ob1 in an image captured using the generic image capturing device 3a increases, with a tendency that the influence of parallax increases. It is thus desirable to set control values (tilt angles) such that the larger the focal length, the closer the special image capturing device 1a is to the generic image capturing device 3a.

<Parallax Caused by Panning Operation>

Referring now to FIGS. 50A to 50F, 51A to 51C, and 52A to 52D, a change in parallax caused by panning operation is described. FIGS. 50A to 50F are diagrams illustrating a relationship between a pan angle φ and the seam of lenses. FIGS. 52A to 52D are conceptual diagrams illustrating positions of a planar image in a full-view spherical image.

Figure 50A:
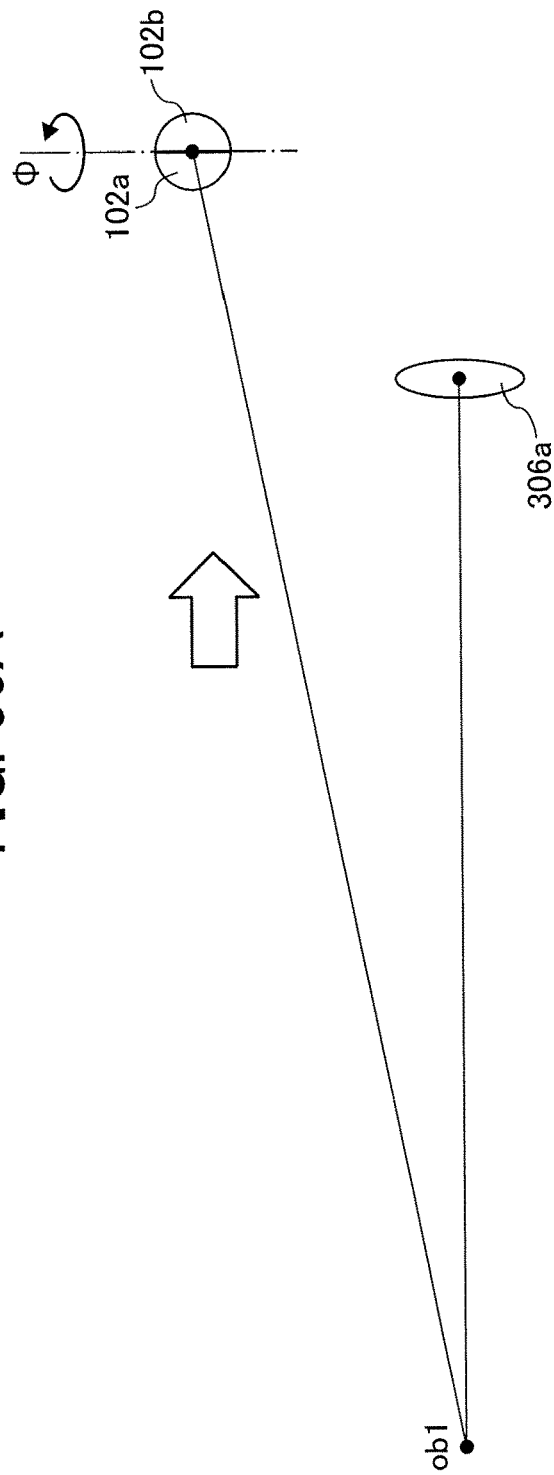
FIGS. 50A to 50F are diagrams illustrating a relationship between a pan angle and the seam of lenses.

The panning operation using the adapter 9a is controlled to rotate the special image capturing device 1a. As illustrated in FIG. 50A, the lens 102a (102b) of the special image capturing device 1a rotates in the direction (φ) indicated in FIG. 50A to perform panning. FIGS. 50B to 50F schematically illustrate five states of rotation of the lens 102a (102b) of the special image capturing device 1a, as viewed from the direction indicated by the arrow in FIG. 50A, namely, first to fifth states, respectively. In this embodiment, the special image capturing device 1a that includes the two lenses 102a and 102b is used, and a lens seam 102c is generated. The lens seam 102c is not a physical seam, or joint, of the lenses 102a and 102b but refers to an overlapping area of the respective image capturing ranges of the lenses 102a and 102b. The special image capturing device 1a typically includes a plurality of lenses to capture a full-view spherical (360-degree) image, and as the number of lenses used increases, the number of lens seams increases. In the first state (see FIG. 50B), the lens 102a is oriented toward the object ob1. In the first state, furthermore, the lens seam 102c is oriented approximately at a right angle relative to the object ob1. In accordance with displacement of the lens 102a (102b) of the special image capturing device 1a to the second state (φ=22.5°), the third state (φ=45°), the fourth state (φ=67.5°), and the fifth state (φ=90°, displacement of the lens seam 102c also occurs. In the fifth state, the lens seam 102c is directed toward the object ob1.

Figure 51A:
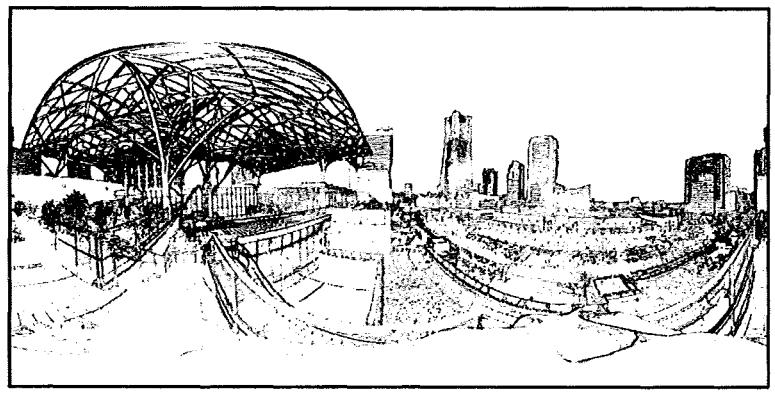
FIGS. 51A to 51C are diagrams illustrating how the position of the seam of lenses affects a spherical image.
Figure 51B:
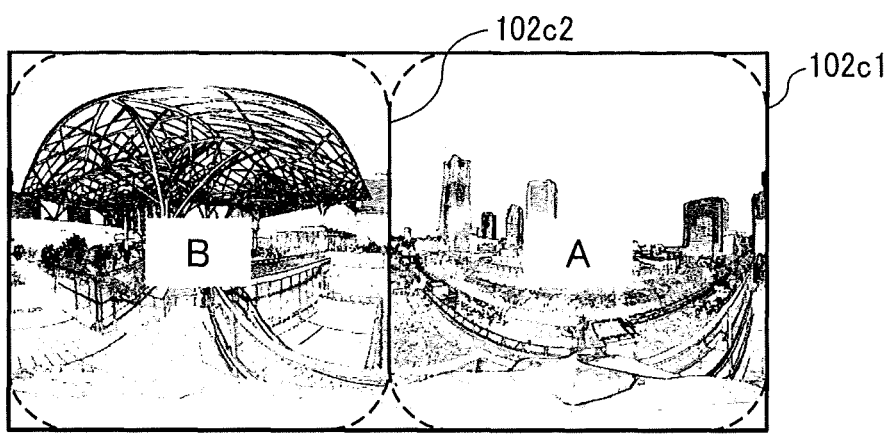
Figure 51C:
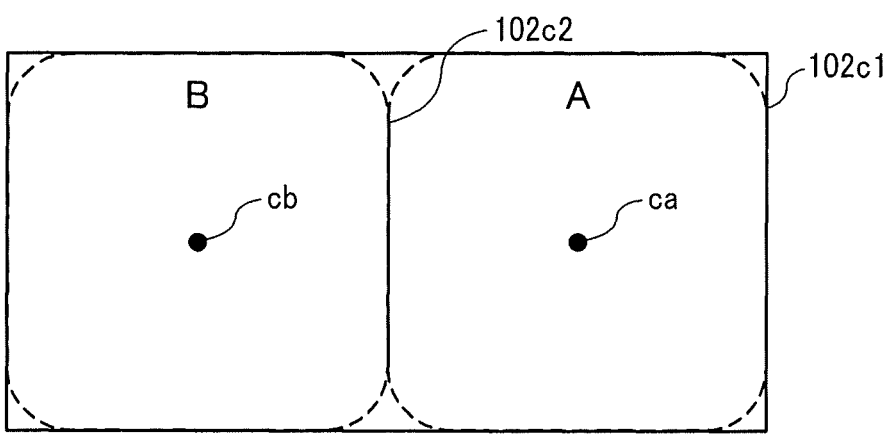

FIGS. 51A to 51C are diagrams illustrating how the position of the seam of lenses affects a full-view spherical image. FIG. 51A illustrates a full-view spherical image obtained by using the special image capturing device 1a capturing images, and FIG. 51B illustrates areas corresponding to images captured with the two lenses 102a and 102b. The area corresponding to the image captured with the lens 102a is referred to as plane A, and the area corresponding to the image captured with the lens 102b is referred to as plane B. Dotted lines indicate the positions of lens seams 102c1 and 102c2, which constitute the seam of the two lenses 102a and 102b. FIG. 51C illustrates respective optical axis centers ca and cb of the lenses 102a and 102b in the full-view spherical image. The lenses 102a and 102b of the special image capturing device 1a are each typically a fish-eye lens to obtain a wide image capturing range with a single lens. In a fish-eye lens, compared with a typical lens, image forming performance and aberration characteristics deteriorate as the distance from the position of an optical axis center increases, that is, as the distance to each of the lens seams 102c1 and 102c2 decreases. In addition, darkening (vignetting) is more likely to occur in the vicinity of the lens seams 102c1 and 102c2 than in the vicinity of the optical axis center, with a tendency that image quality deteriorates in the vicinity of the lens seams 102c1 and 102c2. Since a full-view spherical image is generated by stitching together images captured with the lenses 102a and 102b, a difference in stitching accuracy or image capturing condition (such as brightness or sensitivity) may make the boundary of the images noticeable, and image quality may deteriorate.

Figure 52A:
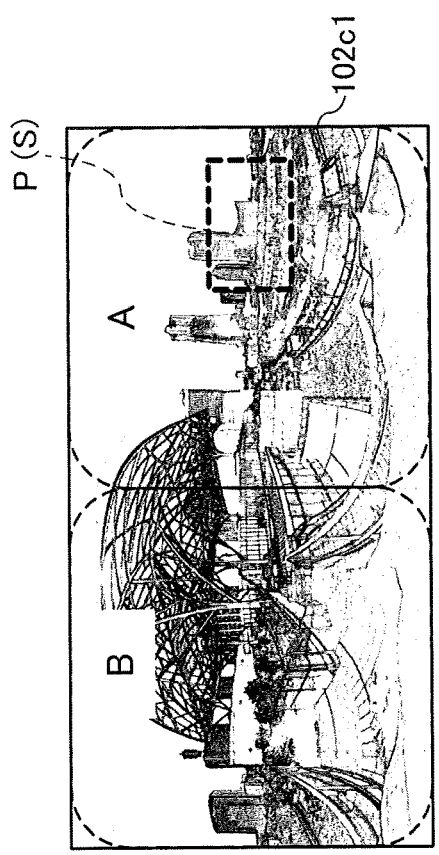
FIGS. 52A to 52D are conceptual diagrams illustrating positions of a planar image in a spherical image.

FIGS. 52A to 52D are conceptual diagrams illustrating positions of a planar image in a full-view spherical image. FIG. 52A illustrates images captured in the state illustrated in FIG. 50B, which are images captured with the lens 306a of the generic image capturing device 3a and the lens 102a of the special image capturing device 1a being oriented toward the object ob1. In this case, two images (the plane A and the plane B) obtained by the special image capturing device 1a and a planar image P (superimposed image S) obtained by the generic image capturing device 3a are illustrated. The planar image P is an image in a rectangular frame indicated by a dotted line. Since the image capturing range of the generic image capturing device 3a is positioned in the vicinity of the optical axis center of the lens 102a, the image capturing range of the generic image capturing device 3a corresponds to a high-quality area in the full-view spherical image.

Figure 50F:
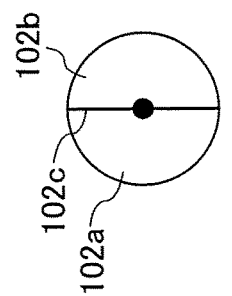
Figure 50E:
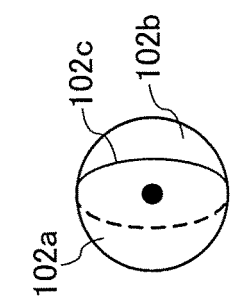
Figure 50D:
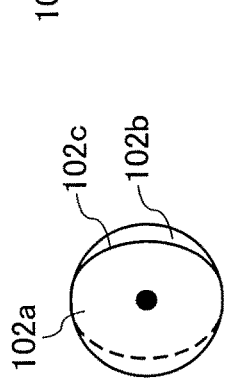
Figure 50C:
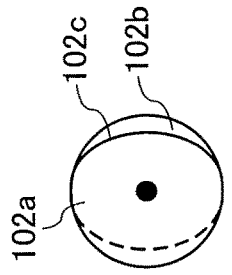
Figure 50B:
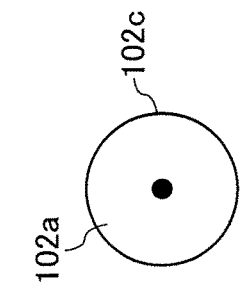
Figure 52B:
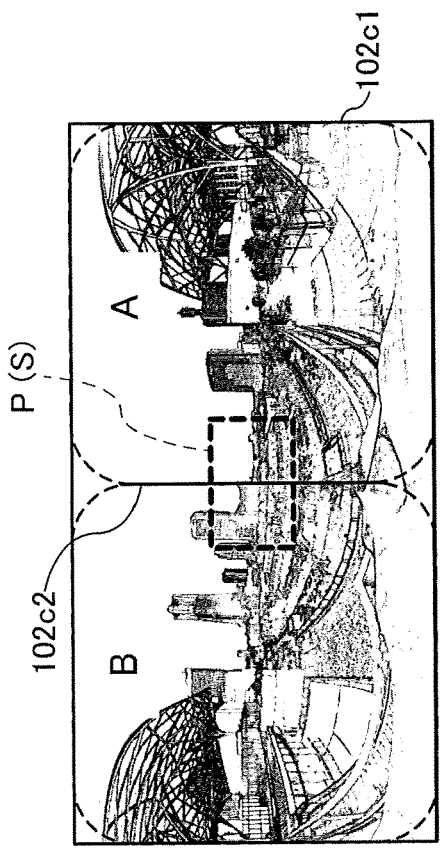

FIG. 52B illustrates images captured in the state illustrated in FIG. 50D, which are images obtained when the special image capturing device 1a is rotated by ϕ=45° with respect to the state illustrated in FIG. 52A. The image capturing range of the generic image capturing device 3 is positioned in the vicinity of the midpoint between the optical axis center of the lens 102a and the lens seam 102c1.

Figure 52C:
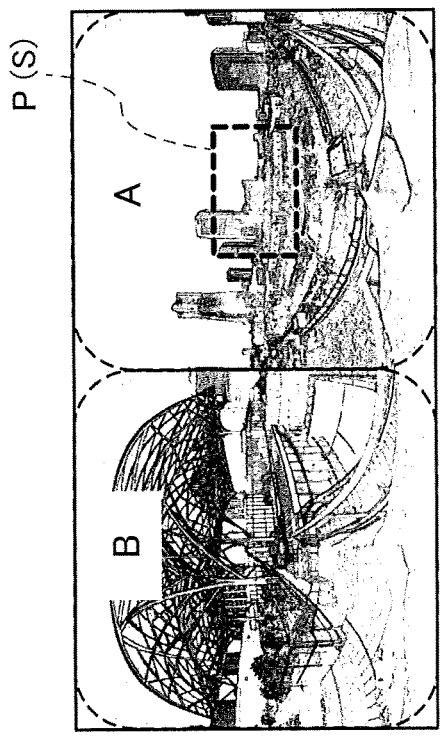

FIG. 52C illustrates images captured in the state illustrated in FIG. 50F, which are images obtained when the special image capturing device 1a is rotated by ϕ=90° with respect to the state illustrated in FIG. 52A. That is, FIG. 52C illustrates images obtained when the lens seam 102c1 of the special image capturing device 1a is directed toward the object ob1. In this case, as described above, image quality tends to deteriorate in the vicinity of the lens seam 102c1. However, superimposition of the planar image P obtained by the generic image capturing device 3a, which is a high-definition image, can compensate for deterioration of image quality.

Figure 52D:
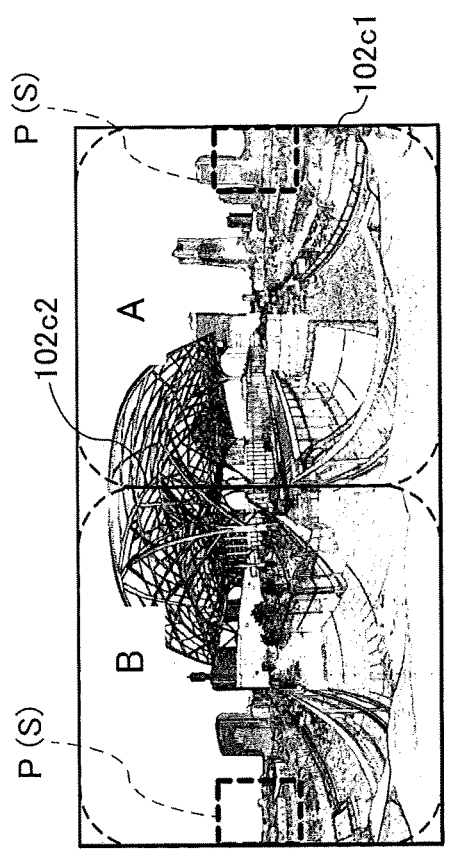

FIG. 52D illustrates images obtained when the special image capturing device 1a is rotated by ϕ=270° (ϕ=−90°) with respect to the state illustrated in FIG. 52A. That is, FIG. 52D illustrates images obtained when the lens seam 102c2 of the special image capturing device 1a is directed toward the object ob1. Also in this case, as described above, image quality tends to deteriorate in the vicinity of the lens seam 102c2. However, superimposition of the planar image P obtained by the generic image capturing device 3a, which is a high-definition image, can compensate for deterioration of image quality.

Accordingly, an area where a portion of the generic image capturing device 3a appears in an image obtained by using the special image capturing device 1a can be overlaid with and compensated for by a high-definition image obtained by using the generic image capturing device 3a. Image capturing is performed such that an area where an unwanted object may appear is positioned in the vicinity of the lens seam 102c in a captured image, which allows prioritization of a reduction in parallax caused by the generic image capturing device 3a and the special image capturing device 1a.

<<Processing or Operation of Image Capturing System>>

Figure 53:
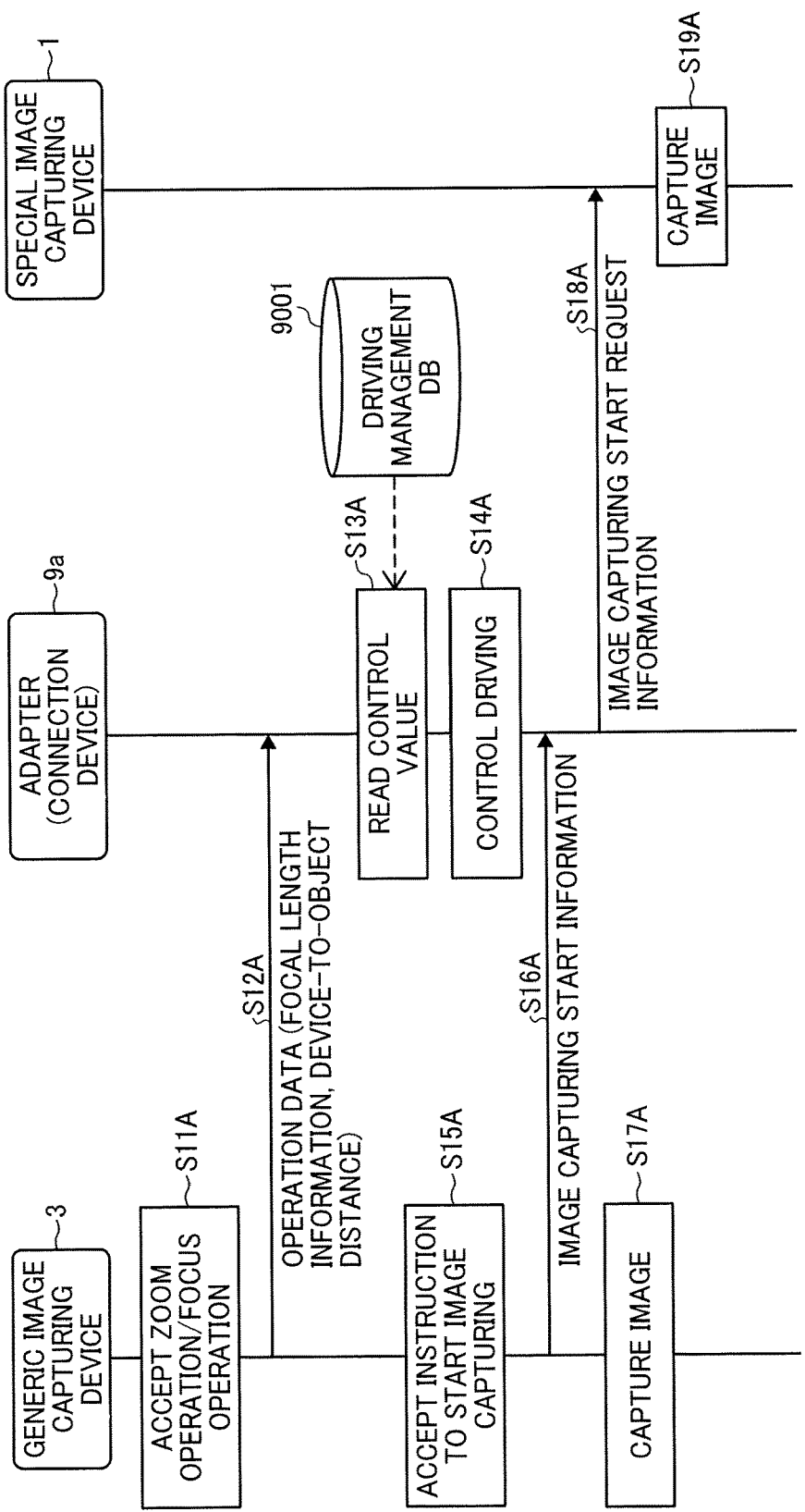
FIG. 53 is a data sequence diagram illustrating linked image capturing by the image capturing system according to the third embodiment.

Referring now to FIG. 53, an image capturing method performed by the image capturing system according to this embodiment is described. FIG. 53 is a data sequence diagram illustrating linked image capturing by the image capturing system. The following describes the example case in which the object and surroundings of the object are captured. However, in addition to capturing the object, audio may be recorded by the audio collection unit 14 as the captured image is being generated.

There are a plurality of routes for transmitting data from the generic image capturing device 3a to the special image capturing device 1a via the adapter 9a.

A first route is used for only communication using an electrical contact. For example, the first route is used for transmitting data from the contact communication unit 31 of the generic image capturing device 3a to the contact communication unit 11 of the special image capturing device 1a via the contact communication units 91a and 91b of the adapter 9a.

A second route is used for both communication using an electrical contact and wireless communication, namely, communication using an electrical contact followed by wireless communication. For example, the second route is used for transmitting data from the contact communication unit 31 of the generic image capturing device 3a to the contactless communication unit 18A of the special image capturing device 1a via the contact communication unit 91a and the contactless communication unit 98 of the adapter 9a.

A third route is used for both communication using an electrical contact and wireless communication, namely, wireless communication followed by communication using an electrical contact. For example, the third route is used for transmitting data from the contactless communication unit 38A of the generic image capturing device 3a to the contact communication unit 11 of the special image capturing device 1a via the contactless communication unit 98 and the contact communication unit 91b of the adapter 9a.

A fourth route is used for only wireless communication. For example, the fourth route is used for transmitting data from the contactless communication unit 38A of the generic image capturing device 3a to the contactless communication unit 18A of the special image capturing device 1a via the contactless communication unit 98 of the adapter 9a.

While the following describes the first route, any other route may be used.

First, when the user performs a zoom operation or focus operation on the generic image capturing device 3a while holding the image capturing system in the position as illustrated in FIG. 10, the acceptance unit 32 of the generic image capturing device 3a accepts the operation performed by the user (step S11A). In the focus operation, the user presses the shutter button 315a halfway to allow the generic image capturing device 3a to automatically focus on the object, the user manually adjust the focus, or the user directs the lens 306a of the generic image capturing device 3a to the object to allow the generic image capturing device 3a to automatically focus on the object without requiring the user to press the shutter button 315a halfway, for example.

Each time the acceptance unit 32 accepts an operation performed by the user, the contact communication unit 31 of the generic image capturing device 3a transmits operation data to the contact communication unit 91a of the adapter 9a (step S12A). The operation data is data based on the operation accepted in step S11A. For example, when a zoom operation is performed, the operation data includes focal length information indicating a changed focal length. When a focus operation is performed, the operation data includes device-to-object distance information indicating a changed device-to-object distance. Thus, the contact communication unit 91a of the adapter 9a receives the operation data.

Then, the storing and reading unit 99 of the adapter 9a searches the driving management DB 9001 (see FIG. 47) by using the operation data as a search key and reads a corresponding control value (step S13A).

Then, the control 96 controls driving of the drive unit 95A in accordance with the control value (step S14A). Thus, at least one of the tilt rotation unit 95a and the pan rotation unit 95b rotates, thereby allowing displacement of the special image capturing device 1a so as to enable displacement of the lenses 102a and 102b of the special image capturing device 1a relative to the lens 306a of the generic image capturing device 3a. This displacement of the special image capturing device 1a is at least one of the tilting and panning operations described above.

Then, when the user fully presses the shutter button 315a while holding the image capturing system in the position as illustrated in FIG. 10, the acceptance unit 32 of the generic image capturing device 3a accepts a user instruction to start image capturing (step S15A). Then, the contact communication unit 31 of the generic image capturing device 3a transmits image capturing start information indicating that image capturing has started to the contact communication unit 91a of the adapter 9a (step S16A). Thus, the contact communication unit 91*a* of the adapter 9*a* receives the image capturing start information. In the generic image capturing device 3*a*, the image capturing unit 33 starts capturing an image (step S17A).

The contact communication unit 91*b* of the adapter 9*a* transmits image capturing start request information indicating a request to start image capturing to the contact communication unit 11 of the special image capturing device 1*a* (step S18A) Thus, the contact communication unit 11 of the special image capturing device 1*a* receives the image capturing start request information.

Accordingly, the image capturing unit 33 of the generic image capturing device 3*a* starts capturing an image (step S17A), and, in association with the start of image capturing by the generic image capturing device 3*a*, the image capturing unit 13 of the special image capturing device 1*a* also starts capturing an image (step S19A). Thereafter, another communication terminal such as a PC can generate a full-view spherical image CE based on data of two hemispherical images captured using the special image capturing device 1*a*, and can further superimpose a high-definition planar image P (a superimposed image S) captured using the generic image capturing device 3*a* on the full-view spherical image CE.

After driving of the drive unit 95A is controlled in step S14A, a predetermined period of time is taken for the special image capturing device 1*a* to move to a set position. If step S15A occurs before the completion of the movement of the special image capturing device 1*a*, the generic image capturing device 3*a* performs the processing of steps S16A and S17A without waiting for the completion of the movement of the special image capturing device 1*a*. After the completion of the movement of the special image capturing device 1*a*, the special image capturing device 1*a* captures an image in accordance with the image capturing start request information obtained in step S18A. This enables the generic image capturing device 3*a* to preferentially start capturing a high-quality image at the timing desired by the user.

In this embodiment, accordingly, when both the generic image capturing device 3*a* and the special image capturing device 1*a* are used to capture images to display a wide-angle image and a narrow-angle image in such a manner that the narrow-angle image is embedded in an area that is a portion of the wide-angle image, even a single user may be able to adjust the timing of starting capturing an image using the generic image capturing device 3 and the timing of starting capturing images using the special image capturing device 1*a* so as to comfortably view an image obtained by embedding one of the images in the other image.

In addition, in accordance with a predetermined operation such as zoom operation or focus operation of the generic image capturing device 3*a*, the adapter 9*a* drives the special image capturing device 1*a* to move or rotate so as to enable displacement of the (objective) lenses 102*a* and 102*b* of the special image capturing device 1*a* relative to the objective lens 306*a* of the generic image capturing device 3*a*. Thus, as described above, reducing parallax can be prioritized (see FIG. 41A) or preventing a portion of the user's hand or arm from appearing in a high-quality area in an image obtained by using the special image capturing device 1*a* can be prioritized (see FIG. 41B). This can save the user from having to manually move or rotate the special image capturing device 1*a* each time the user is to perform a zoom operation or focus operation on the generic image capturing device 3.

Fourth Embodiment

Figure 54A:
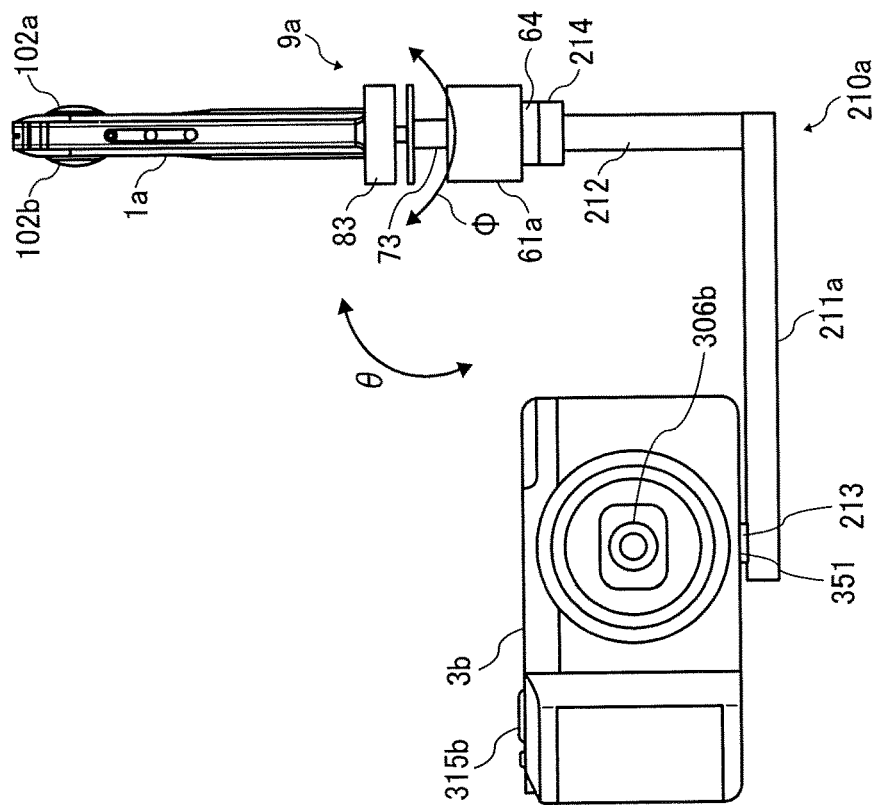
FIGS. 54A and 54B are schematic diagrams of an image capturing system according to a fourth embodiment.
Figure 54B:
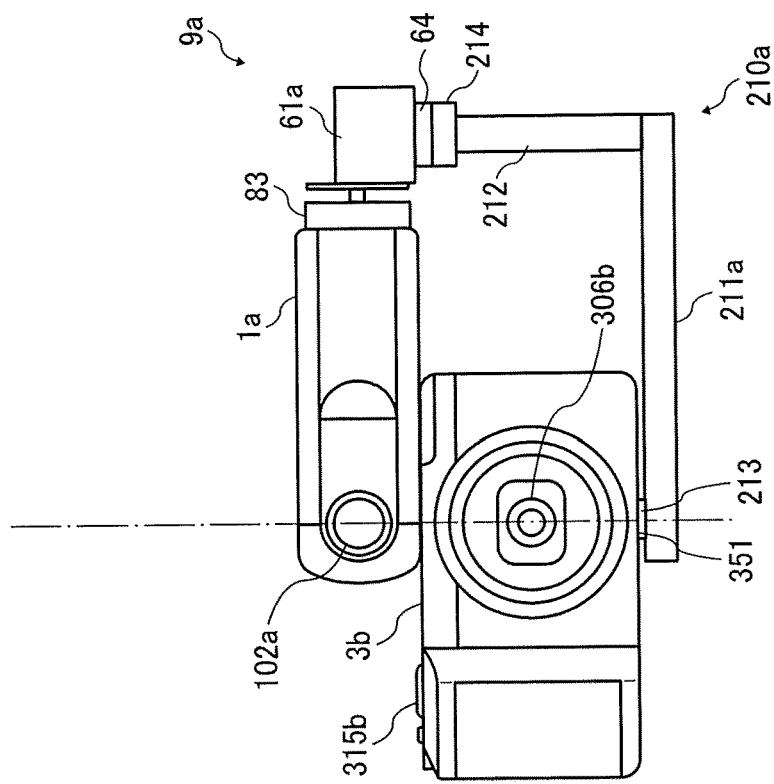

Referring now to FIGS. 54A and 54B, an image capturing system according to a fourth embodiment is described.

As illustrated in FIGS. 54A and 54B, the image capturing system according to this embodiment includes the special image capturing device 1*a*, a generic image capturing device 3*b*, the adapter 9*a*, and a bracket 210*a*.

The generic image capturing device 3*b* is a compact digital camera that does not include the accessory shoe 320. This embodiment uses the dedicated bracket 210*a*. Except for the differences described above, the image capturing system according to this embodiment remains substantially the same as that according to the third embodiment described above. Substantially the same elements and functions are identified with the same numerals, and description thereof is omitted, with only the differences being described.

The bracket 210*a* includes a main body 211*a*, a support bar 212, a tripod screw 213, and an accessory shoe 214. The main body 211*a* and the support bar 212 are metal or plastic bars. The main body 211*a* has a proximal end at which the tripod screw 213 is disposed. The main body 211*a* has a distal end to which a lower end of the support bar 212 is attached, and the support bar 212 extends upward from the main body 211*a*. The support bar 212 has an upper end at which the accessory shoe 214 is disposed. The accessory shoe connector 64 of the adapter 9*a* is connectable to the accessory shoe 214. It should be noted that the accessory shoe 214 illustrated in FIGS. 54A and 54B is a cold shoe having no electrical contact. The special image capturing device 1*a* is attached to the adapter 9*a*. As illustrated in FIG. 54A, when the special image capturing device 1*a* is tilted close to the generic image capturing device 3*b*, the center of the lens 102*a* of the special image capturing device 1*a* and the center of a lens 306*b* of the generic image capturing device 3*b* are exactly aligned vertically. As illustrated in FIG. 54B, when the special image capturing device 1*a* is tilted 90 degrees ($\theta$=90) to an upright position relative to the generic image capturing device 3*b*, as the rotating table 83 rotates, the lenses 102*a* and 102*b* of the special image capturing device 1*a* also rotate 90 degrees ($\phi$=90).

FIG. 54A illustrates an initial state, and FIG. 54B illustrates a state after displacement. In the initial state illustrated in FIG. 54A, the lens 306*b* of the generic image capturing device 3*b* and the lens 102*a* of the special image capturing device 1*a* are brought into close proximity to each other, which is suitable for capturing an image of an object located at a near distance with parallax reduction being prioritized. In contrast, the state after displacement illustrated in FIG. 54B is suitable for capturing an image of an object located at a medium or far distance with compensation for a low-quality area in an image obtained by using the special image capturing device 1*a*. Unlike a digital single-lens reflex camera, a compact digital camera has a short removable and replaceable lens portion. Thus, as illustrated in FIG. 54A, it is suitable to place the special image capturing device 1*a* and the generic image capturing device 3*b* in such a manner the optical axis of the lens 306*b* of the generic image capturing device 3*b* and the optical axis of the lens 102*a* (102*b*) of the special image capturing device 1*a* remain parallel to each other, so that a portion of the main body of the generic image capturing device 3*b*, a portion of the shutter button 315*a*, or a portion of the user's (photographer's) hand can appear in a low-quality area in an image obtained by using the special image capturing device 1*a*.

Since the generic image capturing device 3*b* according to this embodiment does not include the accessory shoe 320, data is communicated via either the third route or the fourth route described above.

The configuration described above enables the image capturing system according to this embodiment to perform operation or processing similar to that of the image capturing system according to the third embodiment. In addition, a compact digital camera of a type that includes no accessory shoe can also achieve advantages similar to those in the third embodiment.

Fifth Embodiment

Figure 55A:
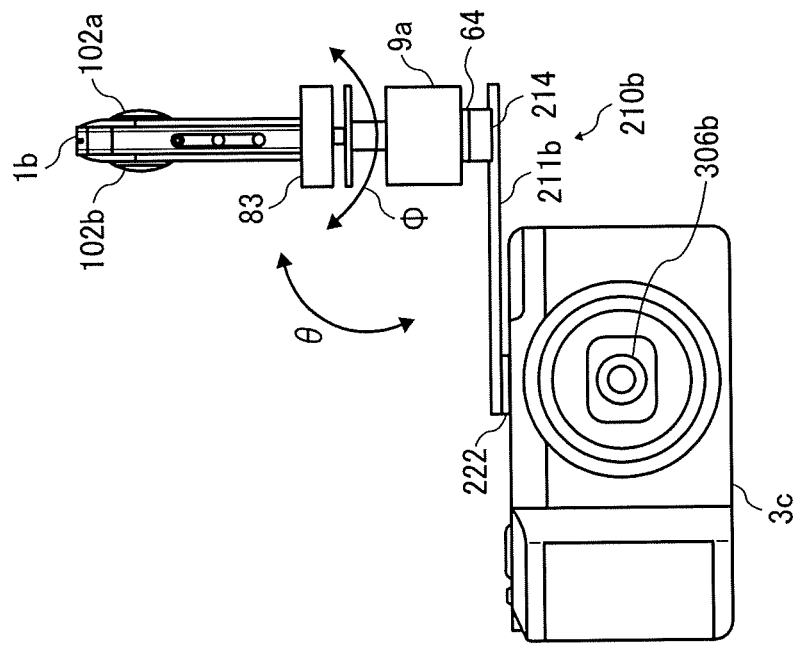
FIGS. 55A and 55B are schematic diagrams of an image capturing system according to a fifth embodiment.
Figure 55B:
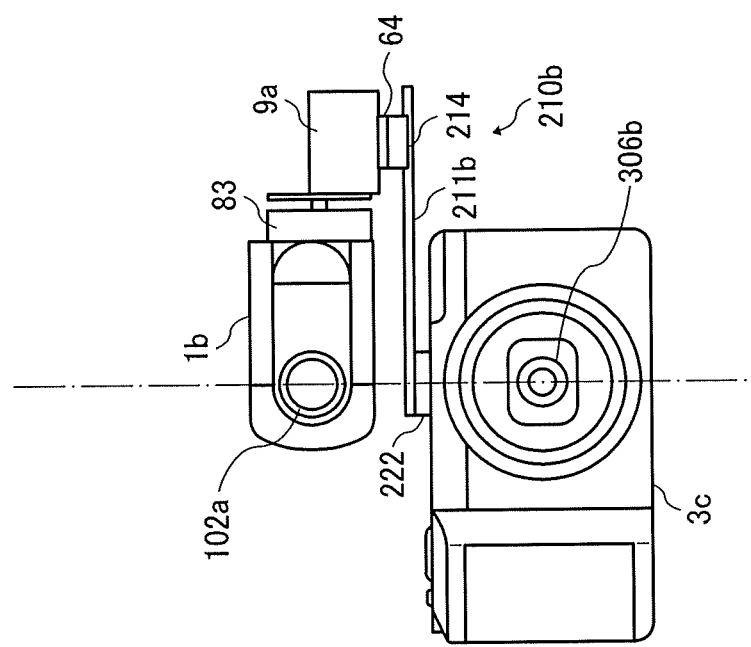

Referring now to FIGS. 55A and 55B, an image capturing system according to a fifth embodiment of the present invention is described. FIGS. 55A and 55B are schematic diagrams of the image capturing system according to the fifth embodiment. As illustrated in FIGS. 55A and 55B, the image capturing system according to this embodiment includes a special image capturing device 1b, a generic image capturing device 3c, the adapter 9a, and a bracket 210b. The special image capturing device 1b is shorter than the special image capturing device 1a according to the third and fourth embodiments. The generic image capturing device 3c is a compact digital camera of a type that includes the accessory shoe 320. In this embodiment, the dedicated bracket 210b is used. Except for the differences described above, the image capturing system according to this embodiment remains substantially the same as that according to the fourth embodiment. Substantially the same elements and functions are identified with the same numerals, and description thereof is omitted, with only the differences being described.

The bracket 210b includes a main body 211b, the accessory shoe 214, and an accessory shoe connecting member 222. The main body 211b is a metal or plastic bar. The main body 211b has a proximal end at which the accessory shoe connecting member 222 is disposed. The main body 211b has a distal end at which the accessory shoe 214 is disposed. The accessory shoe connecting member 222 and the accessory shoe 214 are electrically connected via an electrical cord or the like in the main body 211b, which is hollow. The accessory shoe connector 64 of the adapter 9a is connectable to the accessory shoe 214. In this case, the accessory shoe 214 is a hot shoe having an electrical contact. The special image capturing device 1b is attached to the adapter 9a. As illustrated in FIG. 55A, when the special image capturing device 1b is tilted close to the generic image capturing device 3c, the center of the lens 102a of the special image capturing device 1b and the center of the lens 306b of the generic image capturing device 3c are exactly aligned vertically. As illustrated in FIG. 55B, when the special image capturing device 1b is tilted 90 degrees (θ=90) to an upright position relative to the generic image capturing device 3c, as the rotating table 83 rotates, the lenses 102a and 102b of the special image capturing device 1b also rotate 90 degrees (φ=90).

FIG. 55A illustrates an initial state, and FIG. 55B illustrates a state after displacement. In the initial state illustrated in FIG. 55A, the lens 306b of the generic image capturing device 3c and the lens 102a of the special image capturing device 1b are brought into close proximity to each other, which is suitable for capturing an image of an object located at a near distance with parallax reduction being prioritized.

In contrast, the state after displacement illustrated in FIG. 55B is suitable for capturing an image of an object located at a medium or far distance with compensation for a low-quality area in an image obtained by using the special image capturing device 1b.

In this embodiment, data is communicated via any one of the first to fourth routes described above.

The configuration described above enables the image capturing system according to this embodiment to perform operation or processing similar to that of the image capturing system according to the third embodiment. In addition, the special image capturing device 1b, which is small, can also achieve advantages similar to those in the third embodiment.

Sixth Embodiment

Figure 56A:
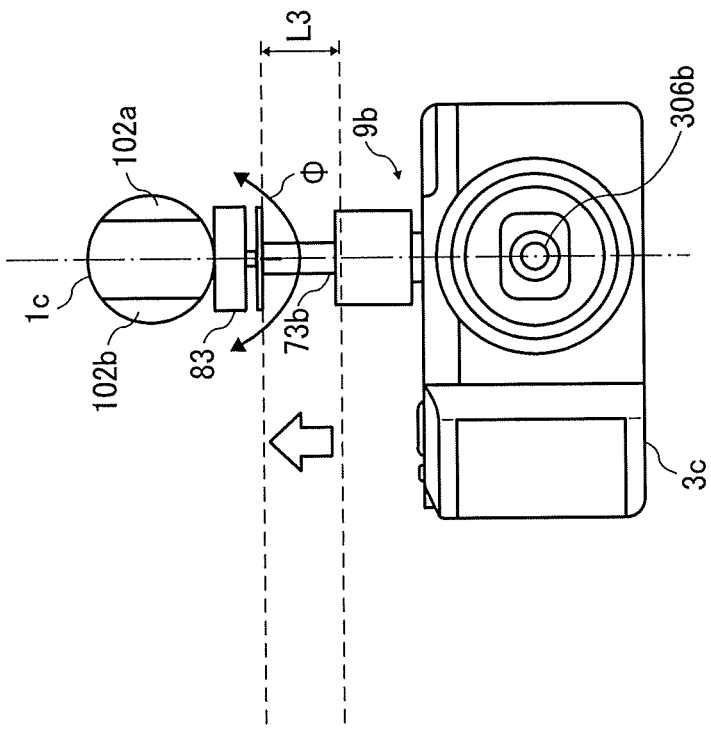
FIGS. 56A and 56B are schematic diagrams of an image capturing system according to a sixth embodiment.
Figure 56B:
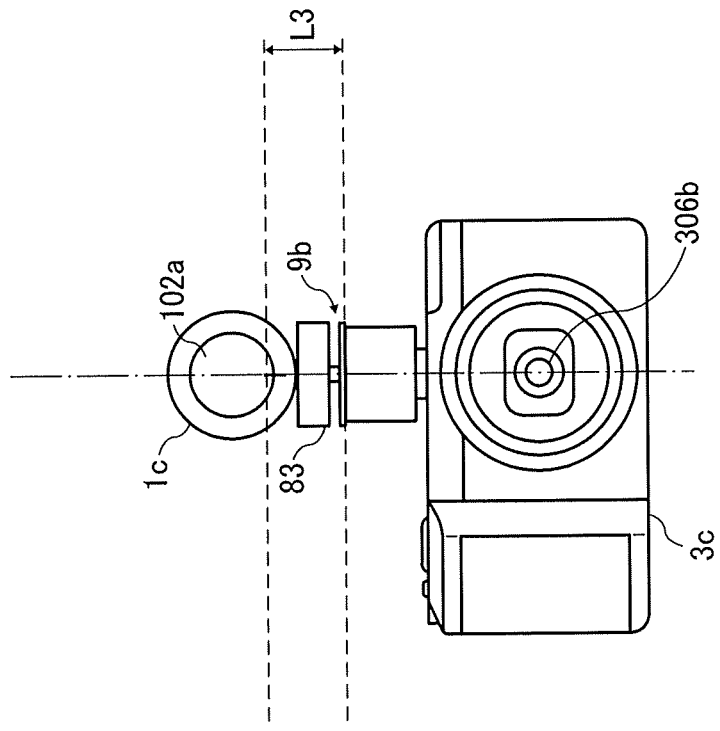

Referring now to FIGS. 56A, 56B, 57A to 57E, 58, and 59, an image capturing system according to a sixth embodiment of the present invention is described. FIGS. 56A and 56B are schematic diagrams of the image capturing system according to the sixth embodiment. As illustrated in FIGS. 56A and 56B, the image capturing system according to this embodiment includes a special image capturing device 1c, the generic image capturing device 3c, and an adapter 9b. The special image capturing device 1c has a shorter housing than the special image capturing device 1b according to the fifth embodiment. In the illustrated example, the special image capturing device 1c has a spherical shape. Except for the differences described above, the image capturing system according to this embodiment remains substantially the same as that according to the fifth embodiment. Substantially the same elements and functions are identified with the same numerals, and description thereof is omitted, with only the differences being described.

The adapter 9b is substantially the same as the adapter 9a in that the rotating table 83 is rotatable in the φ direction, but is different from the adapter 9a in that the rotating table 83 is movable up and down. FIG. 56A illustrates a case where parallax reduction is prioritized, and FIG. 56B illustrates a case where compensation for a low-quality area in an image obtained by using the special image capturing device 1c is prioritized.

FIG. 56A illustrates a state in which the adapter 9b is attached to the generic image capturing device 3c and the special image capturing device 1c is attached to the adapter 9b, which is an initial state. FIG. 56B illustrates a state in which the special image capturing device 1c is shifted so as to vertically move from the initial state by using the adapter 9b and is further panned to change its orientation to 90° (φ=90°) from the initial state (φ=0°). As in FIG. 56A, when the special image capturing device 1c is brought into close proximity to the generic image capturing device 3c, the center of the lens 102a of the special image capturing device 1c and the center of the lens 306b of the generic image capturing device 3c are exactly aligned vertically. As illustrated in FIG. 56B, when the special image capturing device 1c is brought away from the generic image capturing device 3c, as the rotating table 83 rotates, the lenses 102a and 102b of the special image capturing device 1c also rotate 90 degrees (φ=90).

<<Mechanical Hardware Configuration of Adapter>>

Referring to FIGS. 57A to 57E, the mechanical hardware of the adapter 9B according to this embodiment is described. FIGS. 57A to 57E illustrate a mechanical hardware configuration of an linking device according to the sixth embodiment. FIG. 57A is a plan view of the linking device, and FIG. 57B is a side sectional view of the linking device taken along line A2-B2 in FIG. 57A. FIG. 57C is a bottom view of the linking device, FIG. 57D is a side view of the linking device as viewed along arrow C2 in FIG. 57A, and FIG. 57E is a side view of the linking device having a terminal that projects from a rotating table in a direction indicated by arrow D2. The direction indicated by arrow D2 is substantially the same as the direction indicated by arrow D1 illustrated in FIG. 42E.

The adapter 9b includes a shift mechanism that provides stepwise vertical movement of the rotating table 83, and a pan mechanism that provides stepwise horizontal rotation of the rotating table 83 by ϕ degrees. The adapter 9b has substantially the same configuration as the adapter 9a illustrated in FIGS. 42A to 42E, except that the adapter 9b uses a shift mechanism instead of the tilt mechanism of the adapter 9a. The following describes the shift mechanism, and other elements are identified with the corresponding numerals, with description thereof being omitted.

A main body 61b is provided with a stepping motor 71b. A rack mechanism 78 is disposed at a proximal end of an arm 73b. The stepping motor 71b has a motor shaft 72b to which a pinion mechanism 79a is attached to transmit a rotating force of the stepping motor 71b to the rack mechanism 78 via the pinion mechanism 79a to convert the force to a vertical movement of the arm 73b.

As the stepping motor 71b rotates, the arm 73b moves vertically to the main body 61b stepwise, which enables shifting of a physical object attached to the tripod screw 63. The main body 61b is also provided with a photo interrupter 74b. The arm 73b is provided with a light-blocking member 75b1. This configuration allows detection of a reference position for shifting of the arm 73b. In FIGS. 57A to 57E, the position of the arm 73b that moves downward to the lowermost position in the main body 61b (see FIG. 56A) is used as the reference position for shifting.

FIG. 58 is a functional block diagram of a drive unit 95B in the adapter 9b of the image capturing system according to the sixth embodiment. Other functions are similar to those in the third embodiment, and description thereof is omitted. The drive unit 95B according to this embodiment includes the pan rotation unit 95b, which is substantially the same as that in the third embodiment, and description of the pan rotation unit 95b is omitted.

The drive unit 95B further includes a shift movement unit 95c. The shift movement unit 95c is implemented mainly by the shift mechanism (mainly, the main body 61b, the stepping motor 71b, and the arm 73b). The shift movement unit 95c allows the special image capturing device 1c to move up and down (L3). That is, the shift movement unit 95c allows shifting of objective lenses, namely, the lenses 102a and 102b, of the special image capturing device 1c.

Figure 59:
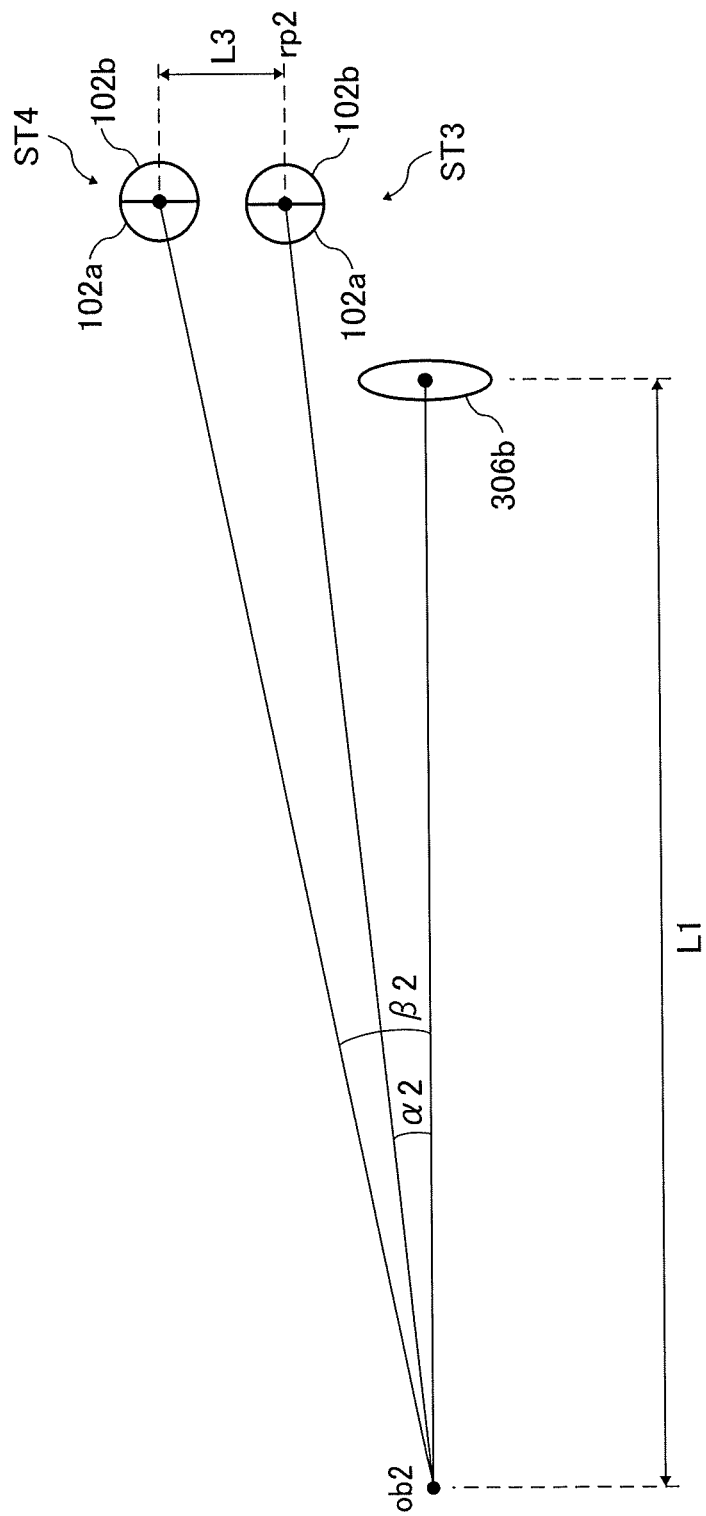
FIG. 59 is a diagram illustrating a relationship between parallax and a vertical movement of a special image capturing device in accordance with shift operation according to the sixth embodiment.

FIG. 59 illustrates a situation in which an object ob2 is located at a position that is the distance L1 away from the generic image capturing device 3c. In FIG. 59, it is assumed that the shift mechanism of the adapter 9b moves the special image capturing device 1c from a reference position rp2, which is used for shift operation, over a distance L3. When the position of the lens 102a (102b) of the special image capturing device 1c changes between a state ST3 and a state ST4, the difference between the positions of the lens 102a (102b) of the special image capturing device 1c in the two states ST3 and ST4 is equal to the distance L3 in the vertical direction. When the angle between the special image capturing device 1c and the generic image capturing device 3c in the state ST3 is represented by α2 and the angle between the special image capturing device 1c and the generic image capturing device 3c in the state ST4 is represented by β2, β2>α2 holds for parallax introduced by the special image capturing device 1c and the generic image capturing device 3c.

The parallax decreases as the distance between the position of the lens 306b of the generic image capturing device 3c and the position of the lens 102a (102b) of the special image capturing device 1c decreases. Thus, parallax can be reduced by controlling shift operation, specifically, by bringing the position of the lens 102a (102b) of the special image capturing device 1c into close proximity to the position of the lens 306b of the generic image capturing device 3c.

In this embodiment, data is communicated via any one of the first to fourth routes described above.

The configuration described above enables the image capturing system according to this embodiment to perform operation or processing similar to that of the image capturing system according to the third embodiment. In addition, the special image capturing device 1c, which is small and has a short housing, can also achieve advantages similar to those in the third embodiment.

Seventh Embodiment

Figure 60A:
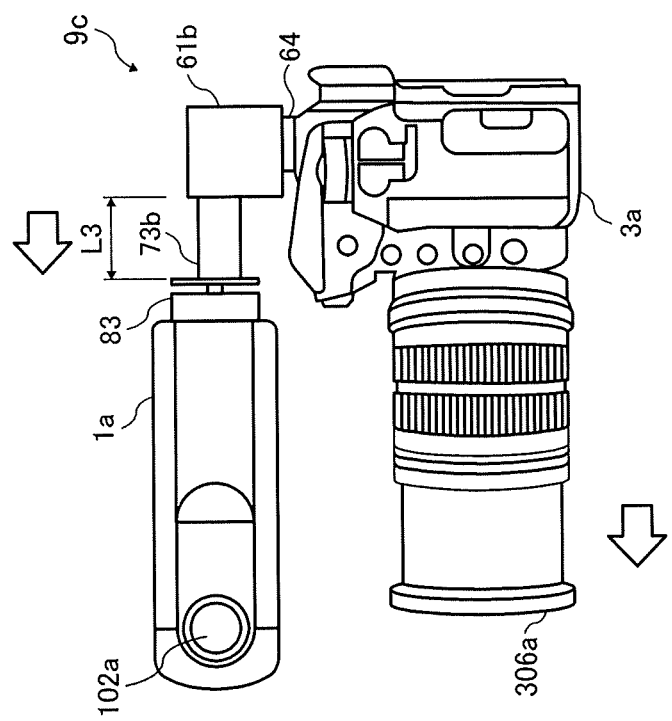
FIGS. 60A and 60B are schematic diagrams of an image capturing system according to a seventh embodiment.
Figure 60B:
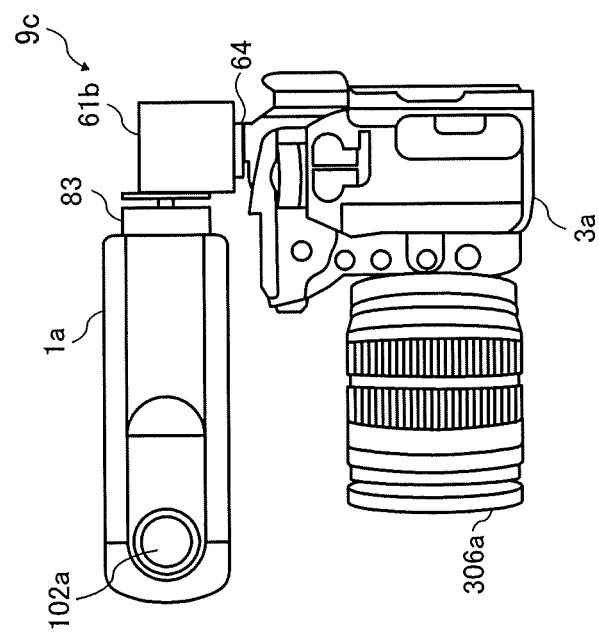

Referring now to FIGS. 60A and 60B, an image capturing system according to a seventh embodiment of the present invention is described. FIGS. 60A and 60B are schematic diagrams of the image capturing system according to the seventh embodiment. As illustrated in FIGS. 60A and 60B, the image capturing system according to this embodiment includes the special image capturing device 1a, the generic image capturing device 3a, and an adapter 9c. The adapter 9c fundamentally has a configuration similar to that of the adapter 9b illustrated in FIGS. 56A and 56B, except that the accessory shoe connector 64 is mounted at a different position. Except for the differences described above, the image capturing system according to this embodiment remains substantially the same as that according to the sixth embodiment. Substantially the same elements and functions are identified with the same numerals, and description thereof is omitted, with only the differences being described.

In the adapter 9c, as illustrated in FIG. 60A, the accessory shoe connector 64 is disposed on a surface corresponding to a side surface of the adapter 9b. In this embodiment, as illustrated in FIG. 60B, the adapter 9c extends or retracts the arm 73b in response to a zoom operation of the lens 306a of the generic image capturing device 3a. In this case, panning operation (ϕ) is not typically performed but may be performed.

As illustrated in FIG. 60A, when the lens 306a is at an initial position, the arm 73b is also at an initial position. As illustrated in FIG. 60B, when the lens 306a is extended, the arm 73b projects from the main body 61b, which allows the special image capturing device 1a to move in the same direction as that in which the lens 306a is extended. FIGS. 60A and 60B illustrate a case where parallax reduction is prioritized and also illustrate a case where the special image capturing device 1a moves in accordance with the extension or retraction of the lens 306a.

In this embodiment, data is communicated via any one of the first to fourth routes described above.

The configuration described above enables parallax reduction. In addition, the special image capturing device 1a moves in accordance with the extension or retraction of the lens 306a. This enables a reduction in areas within which a portion of the lens 306a appears in an equirectangular projection image captured using the special image capturing device 1a.

Eighth Embodiment

Referring now to FIGS. 61A to 61E, 62A to 62C, and 63 to 67, an image capturing system according to an eighth embodiment of the present invention is described. In the embodiments described above, the adapter 9a includes a mechanism for controlling the tilt angle and the pan angle in accordance with predetermined operation information (such as zoom operation or focus operation) in the generic image capturing device 3. In the eighth embodiment, unlike the embodiments described above, the user (photographer) manually changes the tilt angle and the pan angle of the adapter 9 in accordance with predetermined operation information or the like in the generic image capturing device 3. Substantially the same elements as those in the third embodiment are identified with the same numerals, and description thereof is omitted, with only the differences being described.

<<Mechanical Hardware Configuration of Adapter>>

Referring to FIGS. 61A to 61E, the mechanical hardware of an adapter 9d according to this embodiment is described. FIGS. 61A to 61E illustrate a mechanical hardware configuration of an linking device according to the eighth embodiment. FIG. 61A is a plan view of the linking device, and FIG. 61B is a side sectional view of the linking device taken along line A3-B3 in FIG. 61A. FIG. 61C is a bottom view of the linking device, FIG. 61D is a side view of the linking device as viewed along arrow C3 in FIG. 61A, and FIG. 61E is a side view of the linking device having a terminal that projects from a rotating table in a direction indicated by arrow D3.

The adapter 9d according to this embodiment includes a tilt mechanism that vertically rotates θ degrees, and a pan mechanism that horizontally rotates φ degrees. The tilt mechanism mainly includes a main body 61d, a tilt shaft 76a for tilt operation, and an arm 73d for tilt operation. The pan mechanism mainly includes the base plate 62, a pan shaft 68 for rotation, and the rotating table 83 for rotation. The main body 61d is provided with the accessory shoe connector 64 in a lower portion thereof. The rotating table 83 is provided with the tripod screw 63 on an upper surface thereof. The tripod screw 63 is screwed into the tripod mount hole 151 in the special image capturing device 1 to fix the special image capturing device 1 to the upper surface of the rotating table 83.

Subsequently, the tilt mechanism is described. The arm 73d rotates about the tilt shaft 76a in the θ direction with respect to the main body 61d, which enables tilting of a physical object attached to the tripod screw 63. In the tilt mechanism, it is desirable to make the position of the physical object attached to the tripod screw 63 changeable to any angle or in increments of a predetermined angle (for example, in increments of 15 degrees, etc.).

Next, the pan mechanism is described. The arm 73d has a distal end to which the base plate 62 is fixed, and the rotating table 83 is disposed above the base plate 62. The rotating table 83 has a cylindrical shape, and the pan shaft 68 is fixed at the center of a lower surface of the rotating table 83. The rotating table 83 rotates about the pan shaft 68, which enables panning of a physical object attached to the tripod screw 63. In the pan mechanism, it is desirable to make the position of the physical object attached to the tripod screw 63 changeable to any angle or in increments of a predetermined angle (for example, in increments of 15 degrees, etc.). The tilt mechanism and the pan mechanism are configured such that the respective angles can be separately changed by a manual operation and changed positions can be fixed. Alternatively, each of the tilt mechanism and the pan mechanism may have angle scales to identify an angle when a change is made, so that an angle from the reference position can be identified. The position of the arm 73d that bows down to the left with respect to the main body 61d from the state illustrated in FIG. 61B and is held horizontal is used as the reference position for tilting, and the position of the rotating table 83 illustrated in FIG. 61D is used as the reference position for panning.

Referring now to FIGS. 62A to 62C, an example of driving of the adapter 9d is described. FIGS. 62A to 62C are views illustrating an example of driving of the adapter 9d. FIG. 62A illustrates a state in which the arm 73d is positioned at the reference position (θ=0°) of the tilt mechanism. FIG. 62B illustrates a state in which the arm 73d tilts to θ=45° from the reference position. FIG. 62C illustrates a state in which the arm 73d tilts to θ=90° from the reference position.

<Electrical Hardware Configuration of Adapter>

Figure 63:
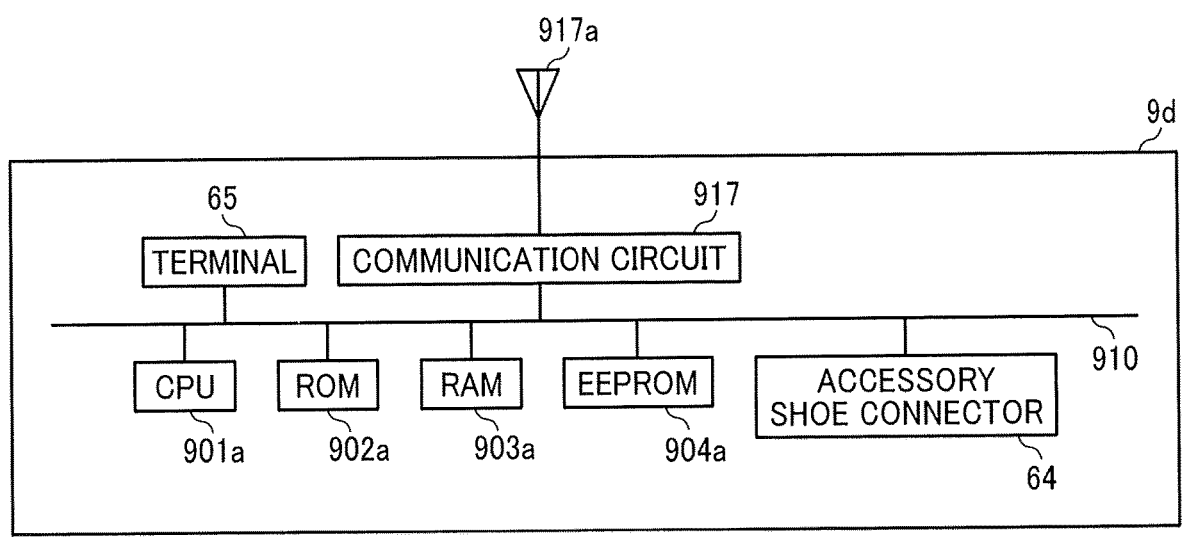
FIG. 63 is a schematic diagram illustrating an electrical hardware configuration of the linking device according to the eighth embodiment.

Referring now to FIG. 63, the electrical hardware of the adapter 9d is described. FIG. 63 illustrates an electrical hardware configuration of the adapter 9d. In FIG. 63, a configuration used for automatic control (namely, the stepping motors 71a or 71b and 81 and the photo interrupters 74a or 74b and 84) is not included.

<Functional Configuration of Adapter>

Figure 64:
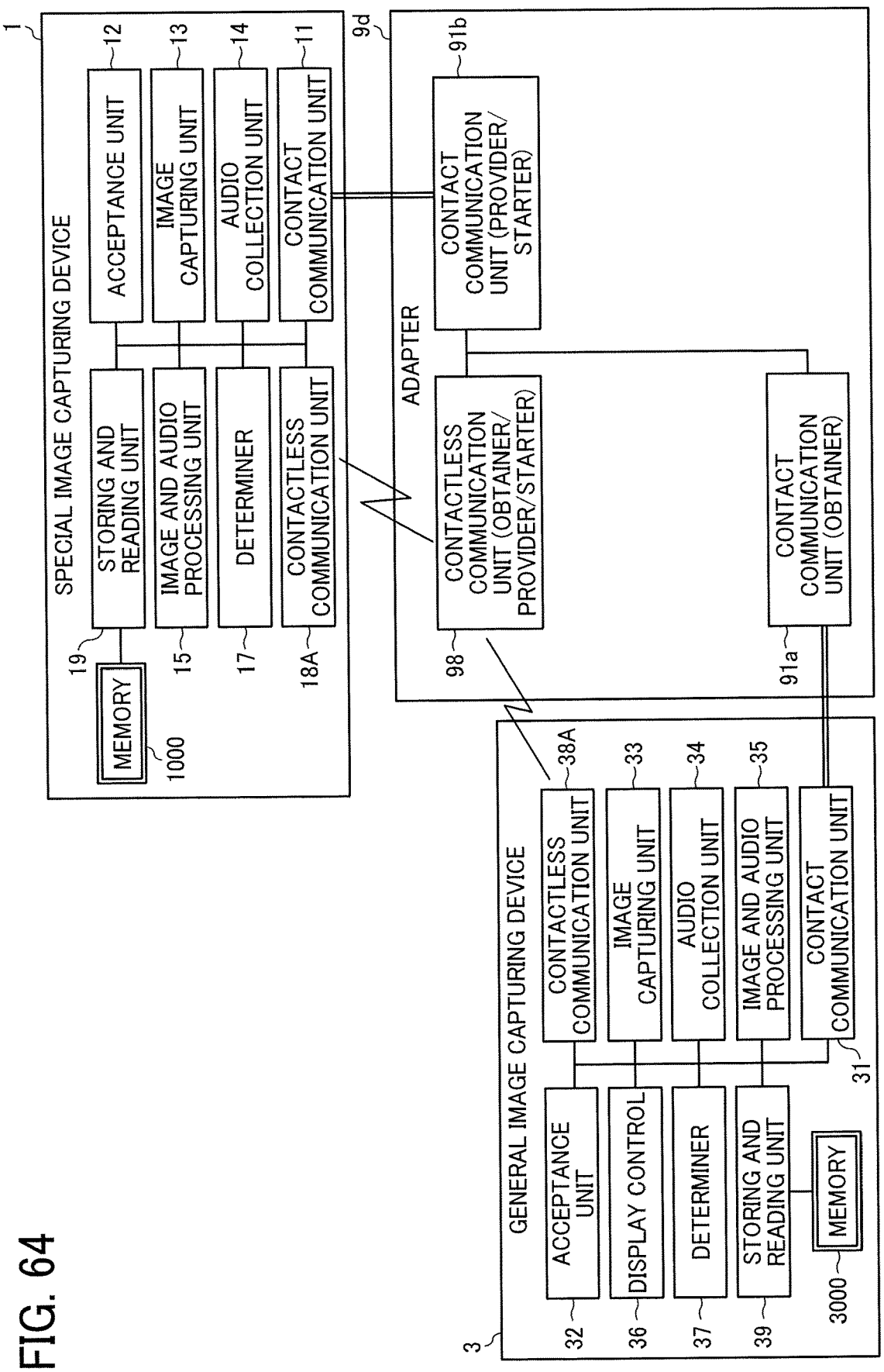
FIG. 64 is a schematic block diagram illustrating a functional configuration of an image capturing system according to the eighth embodiment.

Referring now to FIGS. 63 and 64, a functional configuration of the adapter 9d is described in detail. As illustrated in FIG. 64, the adapter 9d includes the contact communication units 91a and 91b and the contactless communication unit 98. In FIG. 64, a configuration used for automatic control (namely, the control 96, the drive unit 95A, the storing and reading unit 99, and the memory 9000) is not included.

<Example Installations of Special Image Capturing Device 1>

Referring now to FIGS. 65A to 65C and 66A to 66C, example installations of the special image capturing device 1 according to this embodiment are described.

First Example Installation

Figure 65A:
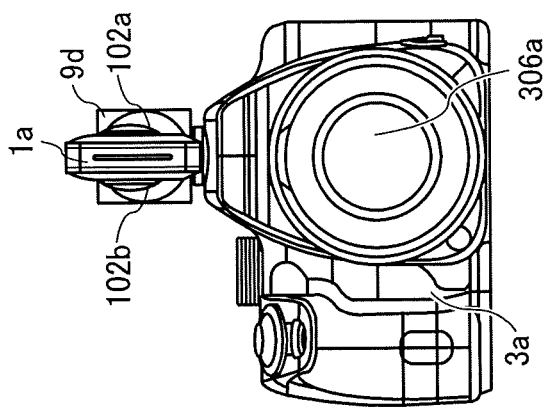
FIGS. 65A to 65C are schematic diagrams of the image capturing system according to the eighth embodiment and illustrate an example installation to capture images of an object located at a near distance.
Figure 65B:
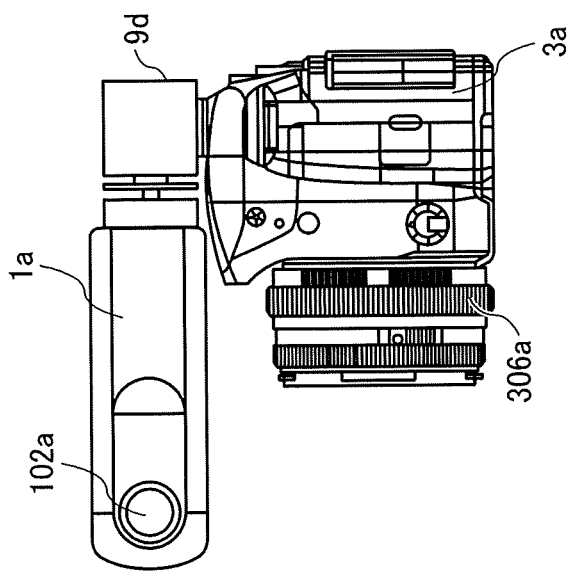
Figure 65C:
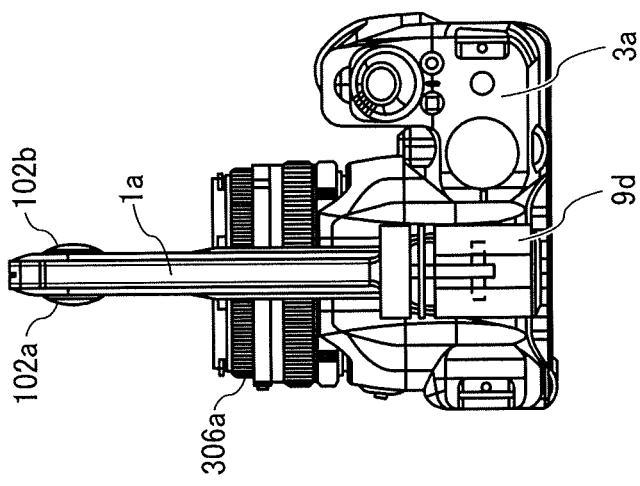

FIGS. 65A to 65C illustrate a first example installation of the special image capturing device 1a. In the example installation illustrated in FIGS. 65A to 65C, the adapter 9d is tilted to an angle θ of 0° from the reference position such that a lens seam of the special image capturing device 1a is directed in the direction of the optical axis of the generic image capturing device 3a to allow a low-quality area in an image obtained by using the special image capturing device 1a to be overlaid with and compensated for by a high-definition image obtained by using the generic image capturing device 3a. In addition, the special image capturing device 1a is positioned so that a lens seam of the special image capturing device 1a on the side opposite the direction of the optical axis of the generic image capturing device 3a faces the user (photographer) who presses the shutter button 315a to capture an image. This can remove an area where a portion of the user (photographer) appears from a captured image during post-processing without affecting a high-quality area in the captured image. The objective lens 306a of the generic image capturing device 3a and the lenses 102a and 102b of the special image capturing device 1a are brought in close proximity to each other, which enables a reduction in parallax between captured images. Further, the special image capturing device 1a is panned at an angle of 0° (φ=0°) from the reference position so that an area where a portion of the objective lens 306a of the generic image capturing device 3a appears in a captured image can match an area corresponding to the lens seam of the special image capturing device 1a. This can prevent an unwanted object from appearing in a high-quality area. Accordingly, the example installation illustrated in FIGS. 65A to 65C enables a reduction in parallax and is thus suitable for capturing an image of an object located at a near distance.

Second Example Installation

Figure 66C:
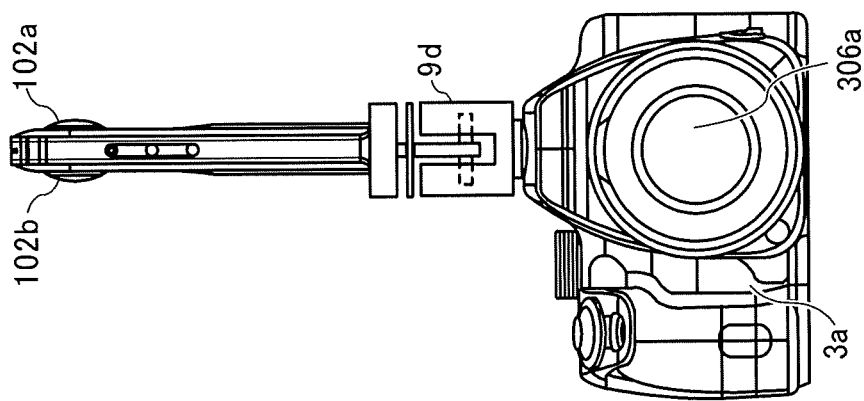
FIGS. 66A to 66C are schematic diagrams of the image capturing system according to the eighth embodiment and illustrate an example installation to capture images of an object located at a medium or far distance.
Figure 66B:
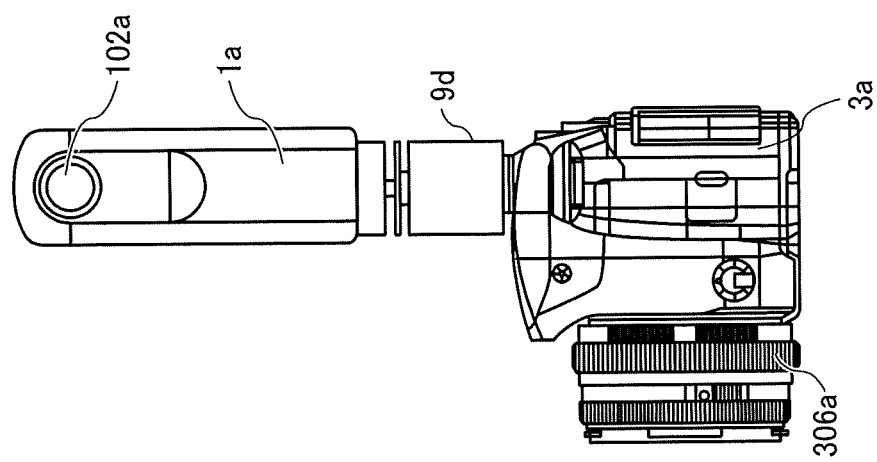
Figure 66A:
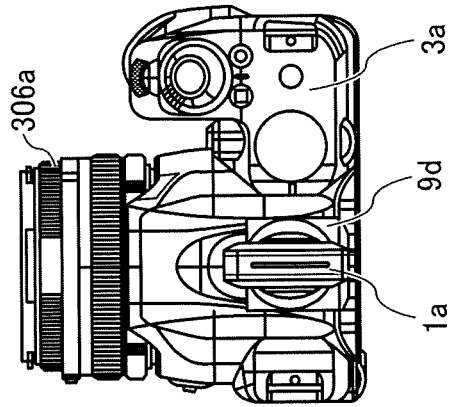

FIGS. 66A to 66C illustrate a second example installation of the special image capturing device 1a. In the example installation illustrated in FIGS. 66A to 66C, the special image capturing device 1a is panned at an angle of 0° (φ=0°) from the reference position so that the lens seam of the special image capturing device 1a is directed in the direction of the optical axis of the generic image capturing device 3a to allow a low-quality area in an image obtained by using the special image capturing device 1a to be overlaid with and compensated for by a high-definition image obtained by using the generic image capturing device 3a. The special image capturing device 1a is further tilted to an angle of 90° (θ=90°) from the reference position to bring the lenses 102a and 102b of the special image capturing device 1a away from the objective lens 306a of the generic image capturing device 3a. This enables a reduction in the proportion of an area where a portion of the objective lens 306a of the generic image capturing device 3a appears in an image obtained by using the special image capturing device 1a. Accordingly, the example installation illustrated in FIGS. 66A to 66C is suitable for capturing an image of an object located at a medium or far distance, which is less affected by parallax caused by a difference in lens position between the special image capturing device 1a and the generic image capturing device 3a.

<<Processing or Operation of Image Capturing System>>

Figure 67:
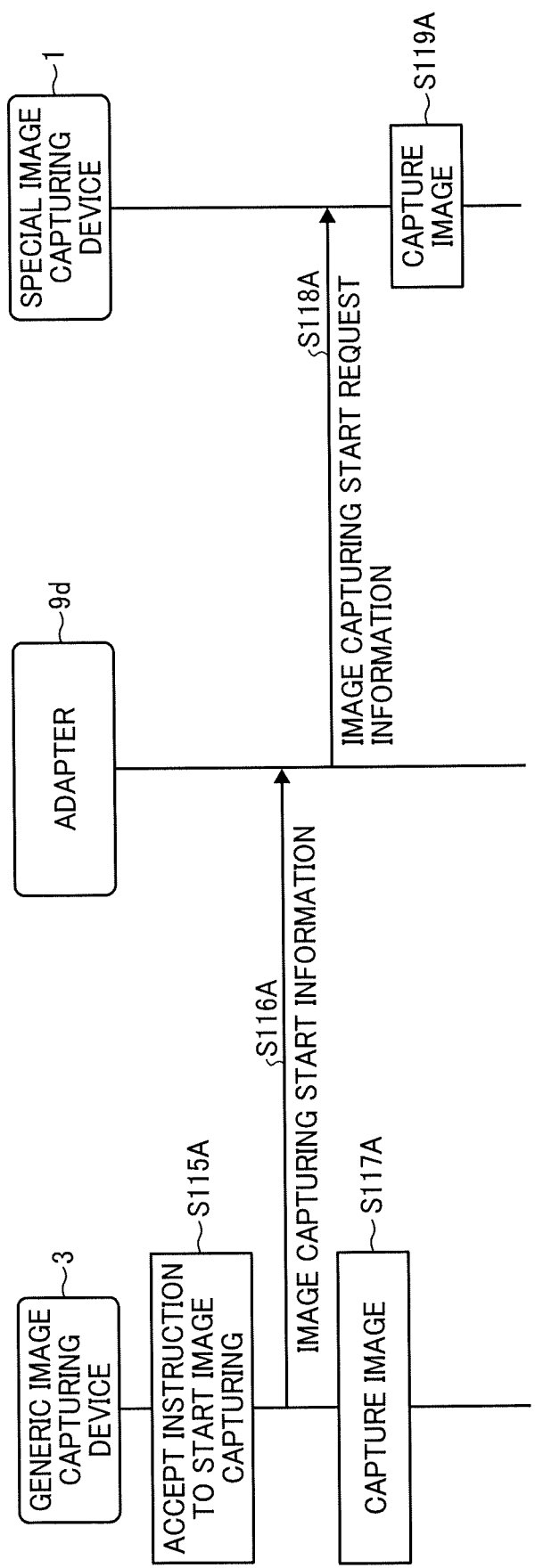
FIG. 67 is a data sequence diagram illustrating linked image capturing by the image capturing system according to the eighth embodiment.

Referring now to FIG. 67, an image capturing method performed by the image capturing system according to this embodiment is described. FIG. 67 is a data sequence diagram illustrating linked image capturing by the image capturing system. The following describes the example case in which the object and surroundings of the object are captured. However, in addition to capturing the object, audio may be recorded by the audio collection unit 14 as the captured image is being generated.

When the user (photographer) fully presses the shutter button 315a while holding the image capturing system in the position as illustrated in FIG. 10, the acceptance unit 32 of the generic image capturing device 3a accepts a user instruction to start image capturing (step S115A). Then, the contact communication unit 31 of the generic image capturing device 3a transmits image capturing start information indicating that image capturing has started to the contact communication unit 91a of the adapter 9d (step S116A). Thus, the contact communication unit 91a of the adapter 9d receives the image capturing start information. In the generic image capturing device 3a, the image capturing unit 33 starts capturing an image (step S117A).

The contact communication unit 91b of the adapter 9d transmits image capturing start request information indicating a request to start image capturing to the contact communication unit 11 of the special image capturing device 1a (step S118A). Thus, the contact communication unit 11 of the special image capturing device 1a receives the image capturing start request information.

Accordingly, the image capturing unit 33 of the generic image capturing device 3a starts capturing an image (step S117A), and, in association with the start of image capturing by the generic image capturing device 3a, the image capturing unit 13 of the special image capturing device 1a also starts capturing an image (step S119A). Thereafter, another communication terminal such as a PC can generate a full-view spherical image CE based on data of two hemispherical images captured using the special image capturing device 1a, and can further superimpose a high-definition planar image P (a superimposed image S) captured using the generic image capturing device 3a on the full-view spherical image CE.

In this embodiment, accordingly, in a system including a combination of the generic image capturing device 3a and the special image capturing device 1a, the special image capturing device 1a is moved or rotated by using the adapter 9d so as to allow displacement of the lenses 102a and 102b of the special image capturing device 1a, and is placed at an appropriate position (see FIGS. 65A to 65C or FIGS. 66A to 66C). This can reduce parallax between images or can prevent an unwanted object from appearing in a high-quality area in an image obtained by using the special image capturing device 1a. In addition, when both the generic image capturing device 3a and the special image capturing device 1a are used to capture images to display a wide-angle image and a narrow-angle image in such a manner that the narrow-angle image is embedded in an area in the wide-angle image, the timing of starting capturing an image using the generic image capturing device 3a and the timing of starting capturing images using the special image capturing device 1a can be adjusted so that the user can comfortably view an image obtained by embedding one of the images in the other image. Furthermore, unlike the first embodiment, the user (photographer) manually rotates the special image capturing device 1a to an appropriate position. This eliminates the need for the adapter 9 to include driving parts for rotation and enables the adapter 9 to be manufactured at low costs.

Ninth Embodiment

Figure 68A:
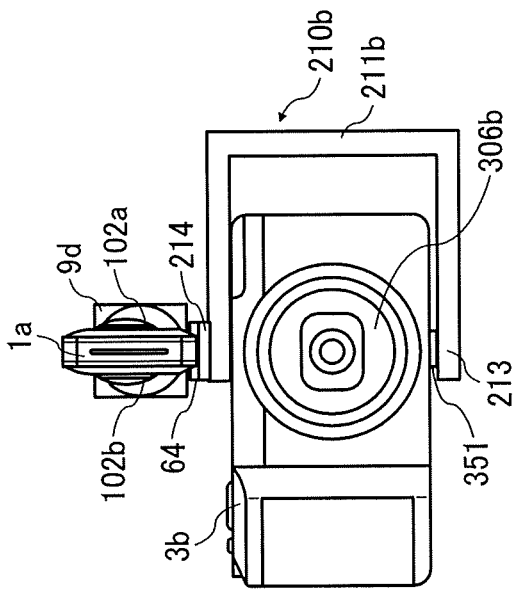
FIGS. 68A and 68B are schematic diagrams of an image capturing system according to a ninth embodiment.
Figure 68B:
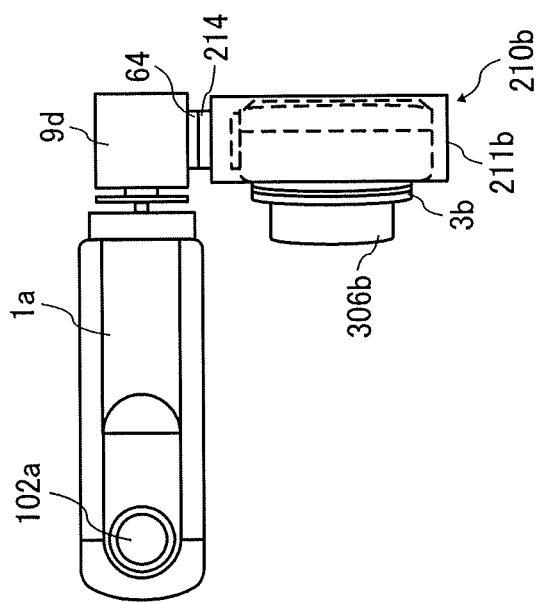

Referring now to FIGS. 68A and 68B, an image capturing system according to a ninth embodiment of the present invention is described.

As illustrated in FIGS. 68A and 68B, the image capturing system according to this embodiment includes the special image capturing device 1a, the generic image capturing device 3b, the adapter 9d, and the bracket 210b.

The generic image capturing device 3b is a compact digital camera that does not include the accessory shoe 320. In this embodiment, the dedicated bracket 210b is used. Except for the differences described above, the image capturing system according to this embodiment remains substantially the same as that according to the eighth embodiment. Substantially the same elements and functions are identified with the same numerals, and description thereof is omitted, with only the differences being described.

The bracket 210b includes the main body 211b, the tripod screw 213, and the accessory shoe 214. The main body 211b is a substantially U-shaped metal or plastic bar. The main body 211b has a lower end at which the tripod screw 213 is disposed, and an upper end at which the accessory shoe 214 is disposed. The accessory shoe connector 64 of the adapter 9d is connectable to the accessory shoe 214. It should be noted that the accessory shoe 214 illustrated in FIGS. 68A and 68B is a cold shoe having no electrical contact. The special image capturing device 1a is attached to the adapter 9d. While the main body 211b is illustrated as a single component in FIGS. 68A and 68B, the main body 211b may be separated into a plurality of components to adjust the width of the main body 211b in accordance with the size of the generic image capturing device 3*b*. FIGS. 68A and 68B depicts an example arrangement suitable for capturing an image of an object located at a near distance.

Since the generic image capturing device 3*b* according to this embodiment does not include the accessory shoe 320, data is communicated via either the third route or the fourth route described above.

The configuration described above enables the image capturing system according to this embodiment to perform operation or processing similar to that of the image capturing system according to the eighth embodiment. In addition, a compact digital camera of a type that includes no accessory shoe can also achieve advantages similar to those in the eighth embodiment.

Tenth Embodiment

Figure 69C:
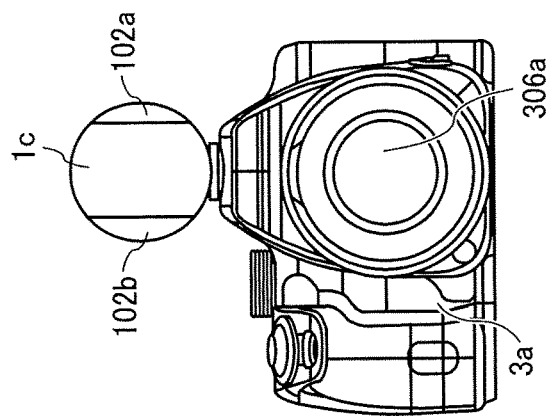
FIGS. 69A to 69C are schematic diagrams of an image capturing system according to a tenth embodiment.
Figure 69B:
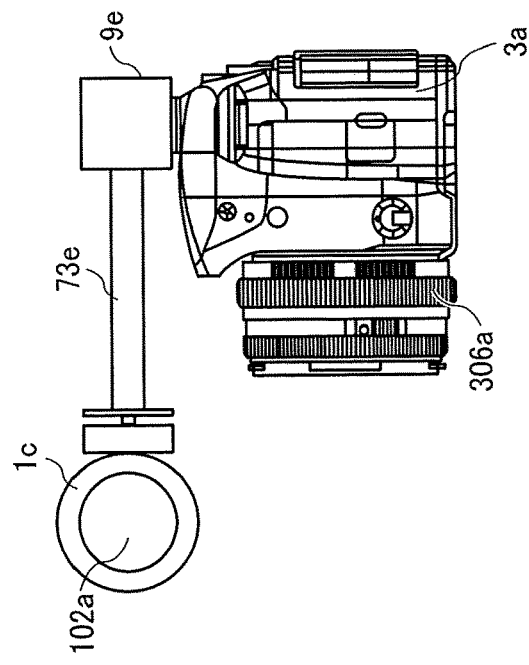
Figure 69A:
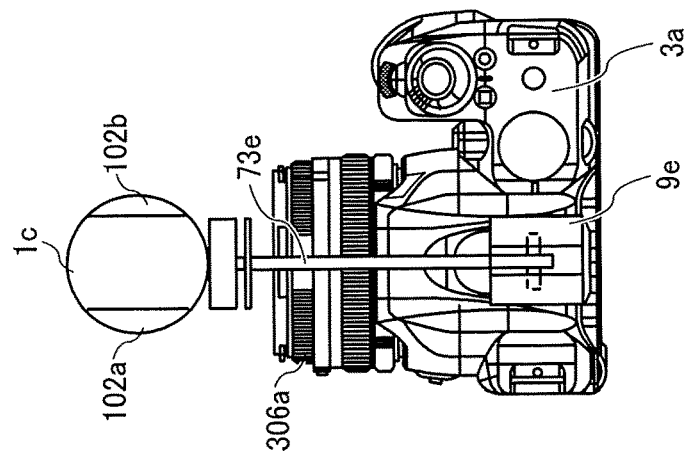

Referring now to FIGS. 69A to 69C, an image capturing system according to a tenth embodiment of the present invention is described. FIGS. 69A to 69C are schematic diagrams of the image capturing system according to the tenth embodiment. As illustrated in FIGS. 69A to 69C, the image capturing system according to this embodiment includes the special image capturing device 1*c*, the generic image capturing device 3*a*, and an adapter 9*e*. The special image capturing device 1*c* has a shorter housing than the special image capturing devices 1*a* and 1*b* and has a spherical shape. Except for the differences described above, the image capturing system according to this embodiment remains substantially the same as that according to the eighth embodiment. Substantially the same elements and functions are identified with the same numerals, and description thereof is omitted, with only the differences being described. If the special image capturing device 1*c* is positioned by using the adapter 9*d* according to the eighth embodiment, due to the short housing of the special image capturing device 1*c*, the example installation illustrated in FIGS. 65A to 65C may cause the housing of the special image capturing device 1*c* and the housing of the generic image capturing device 3*a* to interfere with each other, or the example installation illustrated in FIGS. 66A to 66C may cause a portion of the generic image capturing device 3*a* or a portion of the objective lens 306*a* of the generic image capturing device 3*a* to appear in a large area in an image obtained by using the special image capturing device 1*c*. To address the issues described above, in the tenth embodiment, the adapter 9*e* includes an arm 73*e* that is extendable and retractable such that a length of the arm 73*e* can be adjusted as desired and the arm 73*e* can be fixed after the length of the arm 73*e* is changed. The extending and retracting structure of the arm 73*e* is known in the art, and description thereof is omitted. It is desirable that the arm 73*e* have high load carrying capacity and resistance to bending when the special image capturing device 1*c* is attached to the arm 73*e*. The extending and retracting structure of the arm 73*e* of the adapter 9*e* allows the special image capturing device 1*c*, which is small and has a short housing, to be placed at a position similar to that when the special image capturing device 1*a*, which has a long housing, is used.

The configuration described above enables the image capturing system according to this embodiment to perform operation or processing similar to that of the image capturing system according to the third embodiment. In addition, the special image capturing device 1*c*, which is small and has a short housing, can also achieve advantages similar to those in the third embodiment.

In the embodiments described above, the special image capturing device 1 starts capturing an image in association with the start of image capturing by the generic image capturing device 3. Alternatively, the generic image capturing device 3 may start capturing an image in association with the start of image capturing by the special image capturing device 1.

In the embodiments described above, furthermore, the special image capturing device 1 captures images of objects around the user (photographer) to obtain two hemispherical images from which a spherical image is generated; however, this is not required. That is, if the special image capturing device 1 is capable of capturing wide-angle images than the generic image capturing device 3, there is no need to obtain two hemispherical images from which a spherical image is generated. For example, the special image capturing device 1 may be a digital camera configured to capture a wider-angle image than the generic image capturing device 3 to obtain a single planar image.

In the embodiments described above, furthermore, the adapter 9 includes a tilt mechanism and a pan mechanism, or a shift mechanism. Alternatively, the adapter 9 may include any one of these mechanisms or may include all of the three mechanisms.

As described above, in some embodiments, with any one of the above-described mechanisms, relative positions between the optical axis of the lens of the first image capturing device and the optical axis of the lens of the second image capturing device can be controlled. For example, the optical axis of the lens of the first image capturing device and the optical axis of the lens of the second image capturing device may be positioned so as to be twisted from each other. That is, the optical axis of the lens of the first image capturing device and the optical axis of the lens of the second image capturing device do not intersect and are not parallel, but in the relation of skew lines in different planes.

Alternatively, the adapter 9 may include none of the tilt mechanism, the pan mechanism, and the shift mechanism. For example, the accessory shoe connector 64 of the adapter 9 is assumed to be a hot shoe. In this case, when the shutter button 315*a* of the generic image capturing device 3 is fully pressed, an electrical signal indicating that image capturing has started is transmitted from the generic image capturing device 3 to the adapter 9, and then an electrical signal indicating that image capturing has started is transmitted from the adapter 9 to the special image capturing device 1 by using an electrical contact, or data of instructions to start image capturing is transmitted from the adapter 9 to the special image capturing device 1 via wireless communication. This enables linked image capturing between the generic image capturing device 3 and the special image capturing device 1 once the special image capturing device 1 has started capturing an image. In contrast, the accessory shoe connector 64 of the adapter 9 is assumed to be a cold shoe. In this case, when the shutter button 315*a* of the generic image capturing device 3 is fully pressed, data of instructions to start image capturing is transmitted from the generic image capturing device 3 to the adapter 9 via wireless communication, and then an electrical signal indicating that image capturing has started is transmitted from the adapter 9 to the special image capturing device 1 by using an electrical contact, or data of instructions to start image capturing is transmitted from the adapter 9 to the special image capturing device 1 via wireless communication. Furthermore, the generic image capturing device 3 may be provided with the communication function of the adapter 9 (communication using an electrical contact or wireless communication). This enables the adapter 9 to serve as a relay device between the special image capturing device 1 and the generic image capturing device 3 or as a device that connects the special image capturing device 1 and the generic image capturing device 3.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, as illustrated in FIG. 14, the equirectangular projection image data, planar image data, and superimposed display metadata, may not be stored in a memory of the smart phone 5. For example, any of the equirectangular projection image data, planar image data, and superimposed display metadata may be stored in any server on the network.

In any of the above-described embodiments, the planar image P is superimposed on the spherical image CE. Alternatively, the planar image P to be superimposed may be replaced by a part of the spherical image CE. In another example, after deleting a part of the spherical image CE, the planar image P may be embedded in that part having no image.

Furthermore, in the second embodiment, the image processing server 7 performs superimposition of images (S45). For example, the image processing server 7 may transmit the superimposed display metadata to the smart phone 5, to instruct the smart phone 5 to perform superimposition of images and display the superimposed images. In such case, at the image processing server 7, the metadata generator 75a illustrated in FIG. 34 generates superimposed display metadata. At the smart phone 5, the superimposing unit 75b illustrated in FIG. 34 superimposes one image on other image, in a substantially similar manner in the case of the superimposing unit 55b in FIG. 16. The display control 56 illustrated in FIG. 14 processes display of the superimposed images.

In another example, the generic image capturing device 3 may be provided with a function of displaying. In such case, the special image capturing device 1 and the generic image capturing device 3 communicate with each other using USB, Bluetooth, wireless LAN, etc. The special image capturing device 1 transmits the spherical image CE of surroundings of a target object, to the generic image capturing device 3. The generic image capturing device 3 captures the planar image of the target object. The generic image capturing device 3 superimposes the planar image P on the spherical image CE for display.

In this disclosure, examples of superimposition of images include, but not limited to, placement of one image on top of other image entirely or partly, laying one image over other image entirely or partly, mapping one image on other image entirely or partly, pasting one image on other image entirely or partly, combining one image with other image, and integrating one image with other image. That is, as long as the user can perceive a plurality of images (such as the spherical image and the planar image) being displayed on a display as they were one image, processing to be performed on those images for display is not limited to the above-described examples.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An apparatus for controlling image capturing, the apparatus comprising:
   circuitry configured to control an image capturing operation of each one of a first image capturing device and a second image capturing device to cause the first image capturing device and the second image capturing device to cooperate with each other to perform linked image capturing, the first image capturing device being configured to capture an image with an angle of view wider than an angle of view of an image captured by the second image capturing device; and
   a connector configured to physically and electrically connect the first image capturing device to the second image capturing device, wherein
   the circuitry controls one of the first image capturing device and the second image capturing device to start image capturing, in response to starting of image capturing by another one of the first image capturing device and the second image capturing device, by transmitting a control signal over the connector to the one of the first image capturing device and the second image capturing device.

2. The apparatus of claim 1, wherein the circuitry transmits a request for starting image capturing to the one of the first image capturing device and the second image capturing device, in response to receiving information indicating starting of image capturing by the other one of the first image capturing device and the second image capturing device.

3. The apparatus of claim 2, further comprising a communication circuit configured to communicate with the first image capturing device and the second image capturing device through a network.

4. The apparatus of claim 1, further comprising a drive configured to change a position of the first image capturing device relative to the second image capturing device, such that the position of an objective lens of the first image capturing device relative to an objective lens of the second image capturing device changes.

5. The apparatus of claim 4, wherein the drive includes:
   a first rotator configured to rotate the first image capturing device in a first rotational axis; and
   a second rotator configured to rotate the first image capturing device in a second rotational axis different from the first rotational axis.

6. The apparatus of claim 4, wherein the drive changes the position of the first image capturing device so as to displace the position of an objective lens of the first image capturing device relative to the position of an objective lens of the second image capturing device.

7. The apparatus of claim 5, wherein when the first rotator rotates the first image capturing device to shorten a distance between the objective lens of the first image capturing device and the objective lens of the second image capturing device, the second rotator rotates the first image capturing device such that an optical axis of the objective lens of the first image capturing device and an optical axis of the objective lens of the second image capturing device are positioned to be twisted from each other.

8. The apparatus of claim 4, wherein the drive includes:
a rotator configured to rotate the first image capturing device relative to the second image capturing device; and
a shift mechanism configured to move the first image capturing device in at least one direction relative to the second image capturing device.

9. The apparatus of claim 8, wherein when the shift mechanism moves the first image capturing device to shorten a distance between the objective lens of the first image capturing device and the objective lens of the second image capturing device, the rotator rotates the first image capturing device such that an optical axis of the objective lens of the first image capturing device and an optical axis of the objective lens of the second image capturing device are positioned to be twisted from each other.

10. The apparatus of claim 4, wherein
the circuitry controls the drive to change the position of the first image capturing device relative to the second image capturing device, by rotating or moving the first image capturing device based on operation data.

11. The apparatus of claim 10, wherein the operation data indicates at least one of a zoom operation and a focus operation performed on the second image capturing device.

12. An image capturing system, comprising:
the apparatus of claim 1;
the first image capturing device configured to capture surroundings of a target object to obtain the first image in the first projection; and
the second image capturing device configured to capture the target object to obtain the second image in the second projection.

13. A method for controlling an image capturing operation of each one of a first image capturing device and a second image capturing device, the first image capturing device being configured to capture an image with an angle of view wider than an angle of view of an image captured by the second image capturing device, and the first image capturing device and the second image capturing device being physically and electrically connected together by a connector, the method comprising:
controlling one of the first image capturing device and the second image capturing device to start image capturing, in response to starting of image capturing by other one of the first image capturing device and the second image capturing device, by transmitting a control signal over the connector to the one of the first image capturing device and the second image capturing device; and
controlling, via signals transmitted over the connector, the first image capturing device and the second image capturing device to cooperate with each other to perform linked image capturing.

14. A system, comprising:
a connector configured to physically and electrically connect a first image capturing device to a second image capturing device; and
a control apparatus including circuitry configured to
receive an indication that one of the first image capturing device and the second image capturing device has started a first image capturing operation; and
control, in response to the indication, another one of the first image capturing device and the second image capturing device to start a second image capturing operation, wherein
the circuitry controls the first image capturing device and the second image capturing device to cooperate with each other to perform a linked image capturing, and
the first image capturing device is configured to capture an image with an angle of view wider than an angle of view of an image captured by the second image capturing device.

15. The system of claim 2, wherein
the control apparatus further includes a communication circuit configured to communicate with the first image capturing device and the second image capturing device through a network, and
the circuitry receives first image data captured by the first image capturing device and second image data captured by the second image capturing device, via the communication circuit, and stores the first image data and the second image data in association with each other.

16. The system of claim 15, wherein the circuitry stores the first image data and the second image data in a same electronic folder.

17. The system of claim 15, wherein the circuitry stores a first storage area where the first image data is stored and a second storage area where the second image data is stored in association with each other.

18. The system of claim 15, wherein the circuitry is further configured to display, on a display, the first image data being superimposed with the second image data, the first image data and the second image data being associated with each other.

19. The system of claim 14, further comprising:
a memory configured to store first destination information of the first image capturing device, and second destination information of the second image capturing device, in association with each other, wherein
the circuitry transmits, via the communication circuit, information to the first image capturing device using the first destination information, and to the second image capturing device using the second destination information.

20. The system of claim 14, wherein the circuitry receives a user input that specifies the first image capturing device and the second image capturing device to perform the linked image capturing in cooperation with each other.

* * * * *